US012571808B2

(12) United States Patent
Bodell et al.

(10) Patent No.: US 12,571,808 B2
(45) Date of Patent: Mar. 10, 2026

(54) SYSTEMS AND METHODS FOR AUTOMATED GROSSING OF TISSUE SAMPLES

(71) Applicants: Mayo Foundation for Medical Education and Research, Rochester, MN (US); FormaPath Inc., Ithaca, NY (US)

(72) Inventors: Alexander Bodell, Ithaca, NY (US); Katelin Brandegee, Pittsburgh, PA (US); Zahra Badey, Los Altos, CA (US); Ian Perkins, Hood River, OR (US); Joaquin Jesus Garcia, Rochester, MN (US); David Scott McClintock, Woodbury, MN (US); Nathan Olson, Hood River, OR (US); Kameron Chan, San Francisco, CA (US); Daniel Snelgrove, Burlingame, CA (US); Emmanuel Dengler, Ithaca, NY (US); James Garbagnati, Union City, CA (US)

(73) Assignees: Mayo Foundation for Medical Education and Research, Rochester, MN (US); FormaPath Inc., Ithaca, NY (US)

( * ) Notice: Subject to any disclaimer, the term of this patent is extended or adjusted under 35 U.S.C. 154(b) by 0 days.

(21) Appl. No.: 19/086,842

(22) Filed: Mar. 21, 2025

(65) Prior Publication Data

US 2025/0298043 A1 Sep. 25, 2025

Related U.S. Application Data

(60) Provisional application No. 63/709,443, filed on Oct. 19, 2024, provisional application No. 63/568,522, (Continued)

(51) Int. Cl.
*G01N 35/00* (2006.01)
*G01N 1/28* (2006.01)
*G01N 35/02* (2006.01)

(52) U.S. Cl.
CPC ....... *G01N 35/00029* (2013.01); *G01N 1/286* (2013.01); *G01N 35/00594* (2013.01); (Continued)

(58) Field of Classification Search
CPC ............. G01N 35/00029; G01N 1/286; G01N 35/00594; G01N 35/0099; G01N 35/025; (Continued)

(56) References Cited

U.S. PATENT DOCUMENTS 7,541,161 B2 * 6/2009 Fischer .................... G01N 1/36 435/40.52
2003/0224395 A1 12/2003 Jovanovich et al.
(Continued)

FOREIGN PATENT DOCUMENTS

WO WO 2024/151761 A2 7/2024

OTHER PUBLICATIONS

International Search Report and Written Opinion in International Appln. No. PCT/US2025/020933, mailed on May 19, 2025, 10 pages.

*Primary Examiner* — Benjamin R Whatley
(74) *Attorney, Agent, or Firm* — Fish & Richardson P.C.

(57) ABSTRACT

This document provides devices and methods for an automated tissue grossing system. For example, an automatic tissue grossing system can include an intake system configured to receive a specimen jar containing a tissue sample; a robotic arm comprising a gripper configured to grip the specimen jar; a decapping module comprising a stationary gripper configured to grip the specimen jar and a rotary gripper configured to rotate on a vertical axis and grip a lid
(Continued)

of the specimen jar; and a vacuum module comprising an integrated grossing platform, wherein the grossing platform includes a slot sized to receive a cassette from the robotic arm and provide negative pressure through the slot to facilitate tissue transfer from the specimen jar to the cassette.

22 Claims, 41 Drawing Sheets

Related U.S. Application Data filed on Mar. 22, 2024, provisional application No. 63/568,547, filed on Mar. 22, 2024, provisional application No. 63/568,577, filed on Mar. 22, 2024, provisional application No. 63/568,439, filed on Mar. 22, 2024, provisional application No. 63/568,539, filed on Mar. 22, 2024.

(52) U.S. Cl.
CPC ....... *G01N 35/0099* (2013.01); *G01N 35/025* (2013.01); *G01N 2001/2873* (2013.01); *G01N 2035/00059* (2013.01); *G01N 2035/00188* (2013.01)

(58) Field of Classification Search
CPC . G01N 2001/2873; G01N 2035/00059; G01N 2035/00188; G01N 1/147; G01N 1/24; G01N 2001/248; G01N 1/28; G01N 1/31; G01N 1/312; G01N 2001/315; G01N 1/36; G01N 2001/362; G01N 2001/366; G01N 2001/368
See application file for complete search history.

(56) References Cited

U.S. PATENT DOCUMENTS

| | | | | |
|---|---|---|---|---|
| 2007/0166834 | A1* | 7/2007 | Williamson ............. | G01N 1/36<br>436/174 |
| 2007/0189924 | A1* | 8/2007 | Knight ................. | G01N 35/026<br>422/63 |
| 2008/0247914 | A1 | 10/2008 | Edens et al. | |
| 2016/0318040 | A1 | 11/2016 | Bailey et al. | |
| 2017/0067925 | A1 | 3/2017 | Spence et al. | |
| 2021/0374382 | A1* | 12/2021 | Sievert ............. | G01N 35/00732 |
| 2022/0072541 | A1 | 3/2022 | Hart et al. | |
| 2022/0170951 | A1* | 6/2022 | Holmes ................. | B01L 3/5027 |
| 2024/0118297 | A1* | 4/2024 | Rapuano .......... | G01N 35/00732 |

* cited by examiner

1038

SYSTEMS AND METHODS FOR AUTOMATED GROSSING OF TISSUE SAMPLES

CROSS-REFERENCE TO RELATED APPLICATIONS

This application claims the benefit of U.S. Provisional Application Ser. No. 63/568,577, filed Mar. 22, 2024, U.S. Provisional Application Ser. No. 63/568,522, filed Mar. 22, 2024, U.S. Provisional Application Ser. No. 63/568,539, filed Mar. 22, 2024, U.S. Provisional Application Ser. No. 63/568,439, filed Mar. 22, 2024, U.S. Provisional Application Ser. No. 63/568,547, filed Mar. 22, 2024, and U.S. Provisional Application Ser. No. 63/709,443, filed Oct. 19, 2024. The disclosures of the prior applications are considered part of the disclosure of this application, and are incorporated in its entirety into this application.

TECHNICAL FIELD

This document relates to systems and methods for automated grossing of tissue samples. For example, this document relates to systems, devices, and methods to automate the process of transferring biological tissue from a preservation jar to a tissue cassette for diagnostic testing in a laboratory setting.

BACKGROUND INFORMATION

Tissue grossing is an important part of diagnostic testing. Tissue grossing is the technique of visually inspecting, measuring, and sectioning tissue specimens to ensure that representative sections are selected for microscopic evaluation. These tissue sections are then placed into labeled cassettes, which facilitate processing by allowing controlled exposure to fixatives and reagents. The cassettes are subsequently processed through dehydration and infiltration with paraffin wax, embedding the tissue in a stable medium that preserves cellular structures for further analysis.

Tissue grossing in preparation for histopathology is important in the evaluation of a wide range of tissues, including gastrointestinal biopsies, skin excisions, breast lumpectomies, prostate cores, and organ resections. The processed tissues undergo various histological and immunohistochemical tests to detect cellular abnormalities, infections, or malignancies. Diagnoses such as cancer, inflammatory diseases, and degenerative conditions are made from these tissue analyses. Advanced molecular testing can also be performed on fixed tissue to identify genetic mutations, guiding targeted therapies for conditions such as breast or lung cancer.

SUMMARY

This document describes systems and methods for automated grossing of tissue samples and cassette preparation for diagnostic testing. Paraffin-embedded tissue samples are widely used in diagnostic, research, and forensic settings for various histological, molecular, and biochemical tests. For example, histological and morphological analysis (e.g., hematoxylin and eosin (H&E) staining, Masson's trichrome staining, periodic acid-schiff (PAS), and congo red), immunohistochemistry (IHC), molecular and genetic testing of the embedded tissue (e.g., fluorescence in situ hybridization (FISH), PCR and next-generation sequencing (NGS), methylation analysis), proteomics and biochemical assays using the embedded tissue (e.g., mass spectrometry, proteomics, western blot), and forensic and archival testing (e.g., DNA analysis in forensic investigations, environmental and toxicology assessments).

A significant advantage of paraffin-embedded tissue is its archival benefit. Unlike fresh or frozen tissue, paraffin blocks require no special storage conditions, remaining stable at room temperature for years or even decades. This durability makes them valuable for long-term studies, retrospective research, epidemiological studies, zoonotic studies, and pathogen detection in preserved specimens, providing an extensive resource for both medical and scientific advancements.

The process of obtaining a paraffin-embedded tissue is time and resource-intensive. When a biopsy or surgical specimen is obtained, it is typically placed in a formalin-filled jar to preserve cellular morphology and prevent degradation. Formalin fixation ensures that tissues remain structurally intact during processing. In the grossing stage, a trained technician (e.g., pathologist, grossing technologist, or histotechnologist, etc.) examines the specimen, selects representative sections, and trims them into appropriate sizes. These tissue sections are then placed into perforated plastic tissue cassettes, facilitating fluid exchange during fixation, dehydration, clearing, and paraffin embedding. The cassettes are immersed in formalin or other processing solutions before being embedded in paraffin, sectioned into ultra-thin slices using a microtome, and mounted on glass slides for staining and microscopic analysis.

Disclosed herein are systems and methods that integrate multiple modules, including one or more of, an intake system, robotic handling, jar decapping, cassette printing, and vacuum-assisted transfer of the tissue to a cassette. As disclosed herein, an example workflow begins with jar placement and user input at the Human-Machine Interface (HMI), followed by the controlled handling of specimen jars through various processing zones. The system ensures accurate tissue positioning, accurate processing data, accurate tracking, and handling of biopsy specimens, decreasing manual intervention, decreasing human-made errors, decreasing contamination, and improving efficiency.

The automated tissue grossing system and methods described herein address inefficiencies in the current methods of tissue grossing and histopathology specimen processing. Existing techniques require extensive human labor including skilled personnel to manage the intake, labeling, and grossing of biopsy specimens. The dependency on human intervention increases the likelihood of labeling errors, specimen misidentification, and contamination. Additionally, the lack of standardization across healthcare facilities complicates the tracking of specimens, as biopsy jars often contain multiple labels and handwriting accumulated throughout various points in the workflow from biopsy collection to tissue grossing. These challenges result in inefficiencies, delayed diagnostics, and an increased risk of compromised sample integrity (e.g., incorrect diagnosis or contamination). The disclosed system overcomes these obstacles by providing an automated solution that enhances precision, efficiency, and reliability in specimen processing.

Some embodiments of the automated tissue grossing system described herein can provide one or more of the following advantages. First, embodiments of the system and methods disclosed herein automate the grossing process, significantly reducing the need for highly skilled personnel. By integrating robotic handling and automated tracking, the system ensures accurate specimen positioning, reducing the risk of human error and freeing up skilled personnel for more complex analytical tasks. This results in more efficient laboratory operations and improved allocation of workforce resources.

Second, the system and methods described herein include multiple integrated quality control mechanisms that enhance sample traceability and promotes the integrity of the biopsy specimen throughout processing. For example, the system can identify discrepancies in labeling, detect missing or improperly placed samples, and automatically isolate errors by diverting mislabeled or contaminated specimens to an exclusion area for manual review. This minimizes processing errors, improves workflow efficiency, and enhances the reliability of histopathology diagnostics.

Third, the system and methods described herein are designed to function across various laboratory environments and include robotics integrated with imaging technology capable of identifying and reading labels regardless of placement inconsistencies, label age, jar condition, or potential human errors. For example, a biopsy obtained during a surgical procedure or in the field can be placed in a jar that becomes stained or covered in blood due to the collection environment. As the sample moves through multiple facilities or personnel, additional labels can be applied, further complicating identification. The system accounts for these variables, ensuring accurate label recognition without the need for specific software, precise placement, or specific fiduciary marking.

Fourth, the system and methods described herein can enable continuous operation, allowing laboratories to process specimens overnight without significant manual oversight. The automation reduces downtime and increases throughput, making it adaptable to different laboratory environments. Automated imaging and machine learning capabilities further enhance adaptability by making the system compatible with various conventions and facility-specific workflows, thereby improving standardization across different healthcare institutions.

Fifth, the system and methods described herein improve contamination control by ensuring that tissue specimens are correctly transferred from jars into cassettes with minimal exposure to external contaminants. The system integrates vacuum-assisted transfer mechanisms and real-time imaging to confirm the complete extraction of biopsy material, reducing the risk of specimen loss and cross-contamination. This contributes to more reliable histopathological analysis and enhances overall laboratory efficiency.

Sixth, the system and methods described herein support scalability in diagnostic operations by reducing bottlenecks associated with manual tissue grossing. Traditional workflows can struggle to meet the growing demand for biopsy processing in diagnostic facilities. The disclosed system addresses this by implementing a streamlined, automated workflow that increases throughput while maintaining accuracy. By reducing human intervention and improved specimen tracking and identification, the system enhances diagnostic capabilities and efficiency.

Seventh, the automated tissue grossing system integrates seamlessly with existing laboratory information systems (LIS) to further enhance efficiency. The system can automatically record and log specimen data, print labels, and label cassettes minimizing administrative burden and improving compliance with regulatory requirements. This integration reduces reliance on manual data entry, decreasing transcription errors and ensuring consistency in records.

Eighth, the system's modular design allows for adaptability based on laboratory needs. Facilities can configure the system to include specific processing modules depending on their workflow requirements. For example, high-throughput laboratories can incorporate additional robotic arms or processing stations to increase capacity, while smaller facilities can implement a more compact version of the system without compromising efficiency or accuracy.

Ninth, the automated tissue grossing system reduces ergonomic strain on laboratory personnel. Manual tissue grossing requires repetitive motions that can contribute to fatigue and workplace injuries. By automating labor-intensive steps, the system improves workplace safety and reduces the risk of repetitive stress injuries among laboratory technicians.

In some example embodiments, devices can include, or consist essentially of, an automated tissue grossing system comprising an intake system configured to receive a specimen jar containing a tissue sample; a robotic arm comprising a gripper configured to grip the specimen jar; a decapping module comprising a stationary gripper configured to grip the specimen jar and a rotary gripper configured to rotate on a vertical axis and grip a lid of the specimen jar; and a vacuum module comprising an integrated grossing platform, wherein the grossing platform includes a slot sized to receive a cassette from the robotic arm and provide negative pressure through the slot to facilitate tissue transfer from the specimen jar to the cassette.

In some embodiments, the system includes a backlight module comprising a UV light integrated into a surface of the system; and a camera positioned above the UV light, wherein the gripper of the robotic arm transfers the specimen jar to a position over the UV light responsive to the rotary gripper removing the lid from the specimen jar. In some embodiments, the camera is configured to capture a first image of the contents of the specimen jar responsive to the UV light sufficiently illuminating the jar. In some embodiments, the robotic arm is configured to move the specimen jar from the backlight module to the vacuum module responsive to the system determining, based on the first image, that the tissue sample contained therein is suitable for processing. In some embodiments, the tissue sample is suitable for processing if the system determines that the tissue is sized to fit in a cassette. In some embodiments, the vacuum module further comprises a fine mesh insert positioned in the slot. In some embodiments, the system further includes a labeled cassette, wherein the robotic arm is configured to select the labeled cassette and position it in the slot of the vacuum module.

In some embodiments, the robotic arm is configured to position the specimen jar above the labeled cassette at the vacuum module and execute a controlled multi-axis pouring motion, wherein the robotic arm: tilts the specimen jar at a predetermined angle along its pitch axis, translates the specimen jar laterally along an X-axis while maintaining a consistent pour rate, and modulates the tilt angle and rotational acceleration to facilitate fluid flow while preventing tissue retention within the specimen jar, pour the fluid from the jar to the labeled cassette. In some embodiments, the system includes a rotary assembly coupled to a base and a top. In some embodiments, the rotary assembly is movable by a motor assembly housed in the base. In some embodiments, the motor assembly incrementally advances the rotary assembly such that the specimen jar is accessible from the intake system and the robotic arm.

In another example implementation, an automated tissue grossing system includes a computing device; and a computer-readable storage device coupled to the computing device and having instructions stored thereon which, when executed by the computing device, cause the computing device to perform operations, the operations comprising: receiving, at an intake system, a specimen jar containing a tissue sample; operating a robotic arm comprising a gripper to grip the specimen jar; operating a decapping module comprising a stationary gripper to grip the specimen jar and a rotary gripper to rotate on a vertical axis and grip a lid of the specimen jar; and positioning the specimen jar at a vacuum module comprising an integrated grossing platform, wherein the grossing platform includes a slot sized to receive a cassette from the robotic arm and provide negative pressure through the slot to facilitate tissue transfer from the specimen jar to the cassette. In some embodiments, the operations further comprise: activating a backlight module comprising a UV light integrated into a surface of the system; and operating a camera positioned above the UV light, wherein the robotic arm transfers the specimen jar to a position over the UV light responsive to the rotary gripper removing the lid from the specimen jar.

In some embodiments, the operations further comprise, capturing, using the camera, a first image of the contents of the specimen jar responsive to the UV light sufficiently illuminating the jar. In some embodiments, the operations further comprise: determining, based on the first image, whether the tissue sample contained within the specimen jar is suitable for processing; and responsive to determining that the tissue sample is suitable for processing, operating the robotic arm to move the specimen jar from the backlight module to the vacuum module. In some embodiments, the operations further comprise, determining that the tissue sample is suitable for processing if the system determines that the tissue is sized to fit in a cassette. In some embodiments, the operations further comprise: positioning a fine mesh insert within the slot of the vacuum module to prevent tissue from passing through the cassette. In some embodiments, the operations further comprise selecting, using the robotic arm, a labeled cassette; and positioning the labeled cassette in the slot of the vacuum module. In some embodiments, the operations further comprise: positioning the specimen jar above the labeled cassette at the vacuum module; executing a controlled multi-axis pouring motion using the robotic arm, wherein the robotic arm: tilts the specimen jar at a predetermined angle along its pitch axis, translates the specimen jar laterally along an X-axis while maintaining a consistent pour rate, and modulates the tilt angle and rotational acceleration to facilitate fluid flow while preventing tissue retention within the specimen jar; and pouring the fluid from the specimen jar into the labeled cassette.

In some embodiments, the operations further comprise: operating a rotary assembly coupled to a base and a top to store and position the specimen jar within the intake system. In some embodiments, the operations further comprise: operating a motor assembly housed in the base to move the rotary assembly and position the specimen jar for retrieval by the robotic arm. In some embodiments, the operations further comprise: incrementally advancing the rotary assembly using the motor assembly such that the specimen jar is accessible from the intake system and the robotic arm.

In another implementation, an automated tissue grossing system includes a rotary assembly including a plurality of pallets, wherein each pallet comprises one or more units configured to receive a specimen jar; a robotic arm including a gripper configured to select the specimen jar from the one or more units and transport the specimen jar throughout a processing workflow; a decapping module comprising a stationary gripper configured to grip the specimen jar and a rotary gripper configured to rotate on a vertical axis and grip a lid of the specimen jar; a backlight zone including a UV-spectrum backlight and a camera, the backlight zone configured to illuminate an interior portion of the specimen jar and capture images of the interior portion of the specimen jar for tissue detection verification; a vacuum module including a negative pressure system and a grossing platform, the grossing platform is configured to receive a cassette from the robotic arm and provide suction to the cassette to facilitate a transfer of tissue from the specimen jar.

In some embodiments, the rotary assembly is positioned between a top structure and a base structure. In some embodiments, a laser diode coupled to the top structure; and a receiver for the laser diode, wherein the laser diode and the receiver for the laser diode creates a laser curtain sensor. In some embodiments, the laser curtain sensor detects when the rotary assembly is being manipulated and/or detects when the specimen jar and/or a cassette are loaded or removed. In some embodiments, the system further includes a user interface communicatively coupled to the rotary assembly and the robotic arm. In some embodiments, the system further includes a washdown zone comprising a water nozzle, configured to spray an interior of the specimen jar at a predetermined angle. In some embodiments, each of the one or more units are coupled together in a circular fashion to generate each of the plurality of pallets. In some embodiments, the rotary assembly is movable by a motor assembly housed in the base. In some embodiments, the motor assembly incrementally advances the rotary assembly such that the specimen jar is accessible by the robotic arm.

In another example implementation, an automated tissue grossing system includes a computing device; and a computer-readable storage device coupled to the computing device and having instructions stored thereon which, when executed by the computing device, cause the computing device to perform operations, the operations comprising: receiving, at a rotary assembly, a specimen jar containing a tissue sample advancing the rotary assembly containing the specimen jar to a retrieval position; operating a robotic arm comprising a gripper to retrieve the specimen jar from the retrieval position; transporting the specimen jar to a decapping module; releasing the gripper from the specimen jar responsive to arriving at the decapping module; securing the specimen jar at the decapping module using a stationary gripper; operating a rotary gripper grip a lid of the specimen jar; operating the rotary gripper on a vertical axis to remove a lid from the specimen jar resulting in an uncapped specimen jar; releasing the stationary gripper from the specimen jar; transferring the uncapped specimen jar to a backlight module using the robotic arm responsive to the stationary gripper releasing the specimen jar; activating a UV light at the backlight module to illuminate the specimen jar and capturing, using a camera positioned above the UV light, an image of the specimen jar's contents; processing the image to determine whether the specimen jar contains a tissue sample suitable for processing; responsive to determining that the specimen jar contains a tissue sample suitable for processing, moving the specimen jar from the backlight module to a vacuum module using the robotic arm; positioning a cassette within a slot in a grossing platform of the vacuum module using the robotic arm, wherein the vacuum module applies negative pressure through the slot to facilitate transfer of the tissue sample from the specimen jar into the cassette; and positioning the specimen jar above the cassette using the robotic arm and executing a controlled multi-axis pouring motion to transfer the contents of the specimen jar to the cassette.

In some embodiments, the multi-axis pouring motion comprises: the robotic arm tilting the specimen jar at a predetermined angle along a pitch axis, translating the specimen jar laterally along an X-axis while maintaining a consistent pour rate, and modulating the tilt angle and rotational acceleration to facilitate fluid flow while preventing tissue retention within the specimen jar. In some embodiments, the operations further comprise: applying suction through the cassette using the vacuum module to assist in tissue transfer and capturing. In some embodiments, the operations further comprise: moving the specimen jar to a washdown module using the robotic arm. In some embodiments, the operations further comprise: directing, using a nozzle at the washdown module, a spray into the specimen jar at a predetermined angle to dislodge any remaining tissue. In some embodiments, the operations further comprise: returning the specimen jar to the vacuum module using the robotic arm and performing a second controlled pouring motion; and moving the empty specimen jar to the backlight module using the robotic arm and capturing, using a camera, an image of the specimen jar to confirm that no residual tissue remains. In some embodiments, the operations further comprise: responsive to detecting residual tissue in the specimen jar, moving the specimen jar back to the decapping module using the robotic arm and reattaching the lid using the rotary gripper. In some embodiments, the operations further comprise transporting the specimen jar to an exclusion zone using the robotic arm for manual inspection.

In some embodiments, the operations further include responsive to confirming that the specimen jar is empty, retrieving the cassette from the vacuum module using the robotic arm and transferring the cassette to a cassette closing station; maneuvering the cassette against a static feature at the cassette closing station using the robotic arm to engage and close the lid of the cassette; and transporting the closed cassette to a processing rack using the robotic arm and positioning the closed cassette in an available slot in the processing rack.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The details of one or more embodiments of the invention are set forth in the accompanying drawings and the description below. Other features, objects, and advantages of the invention will be apparent from the description and drawings, and from the claims.

DETAILED DESCRIPTION

In various embodiments, the automated tissue grossing workflow described herein can be implemented as a method, a system, or a computer-readable medium storing instructions that, when executed by a computing device, perform the described operations. The following description provides an example workflow of the automated tissue grossing system with reference to the figures. It should be understood that the operations described herein can be carried out by one or more computing devices executing instructions stored in a non-transitory computer-readable medium, such that the workflow can be performed as a method (e.g., a computer-executed method) and/or controlled via automated software and hardware components.

Figure 1:
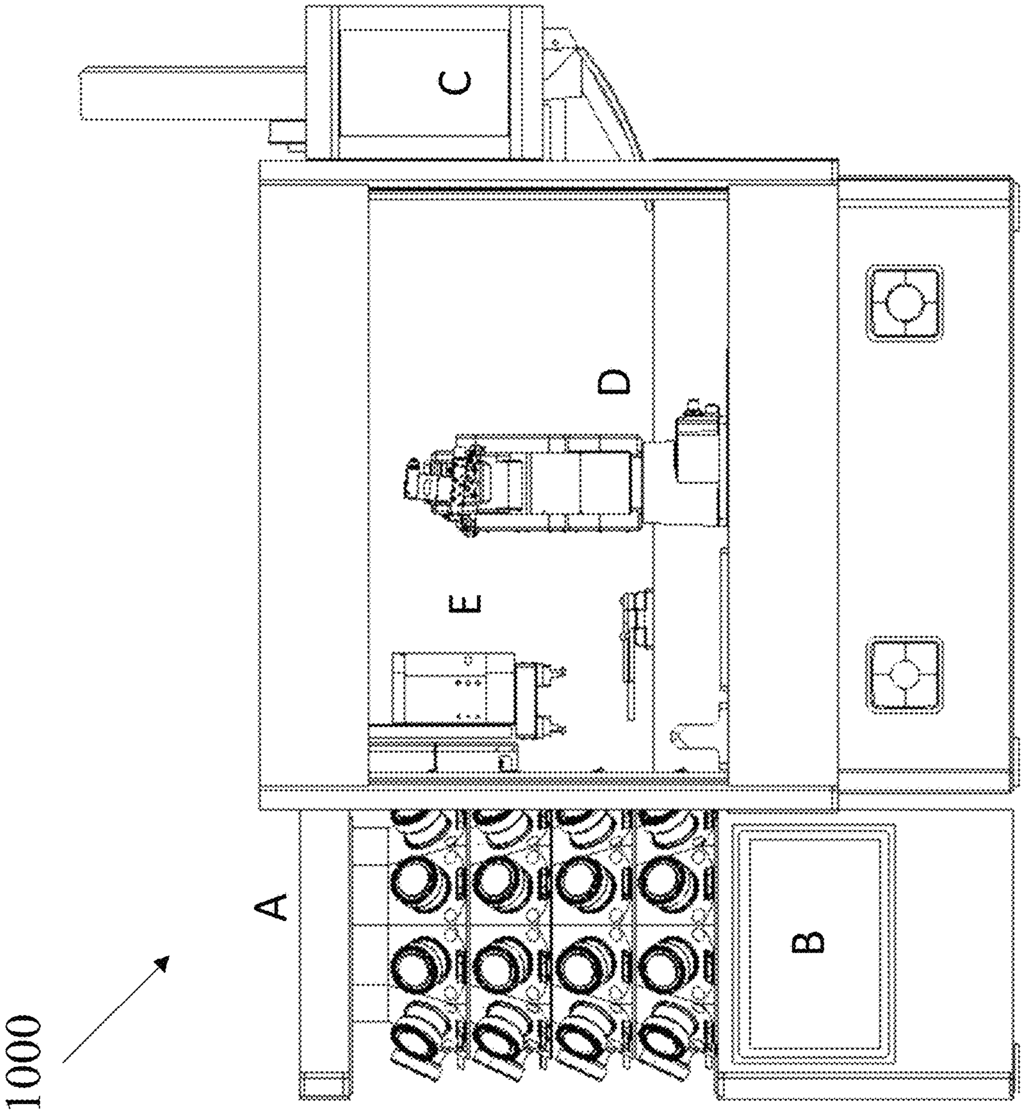
FIG. 1 depicts a front assembly view of an example automated tissue grossing system.
Figure 2:
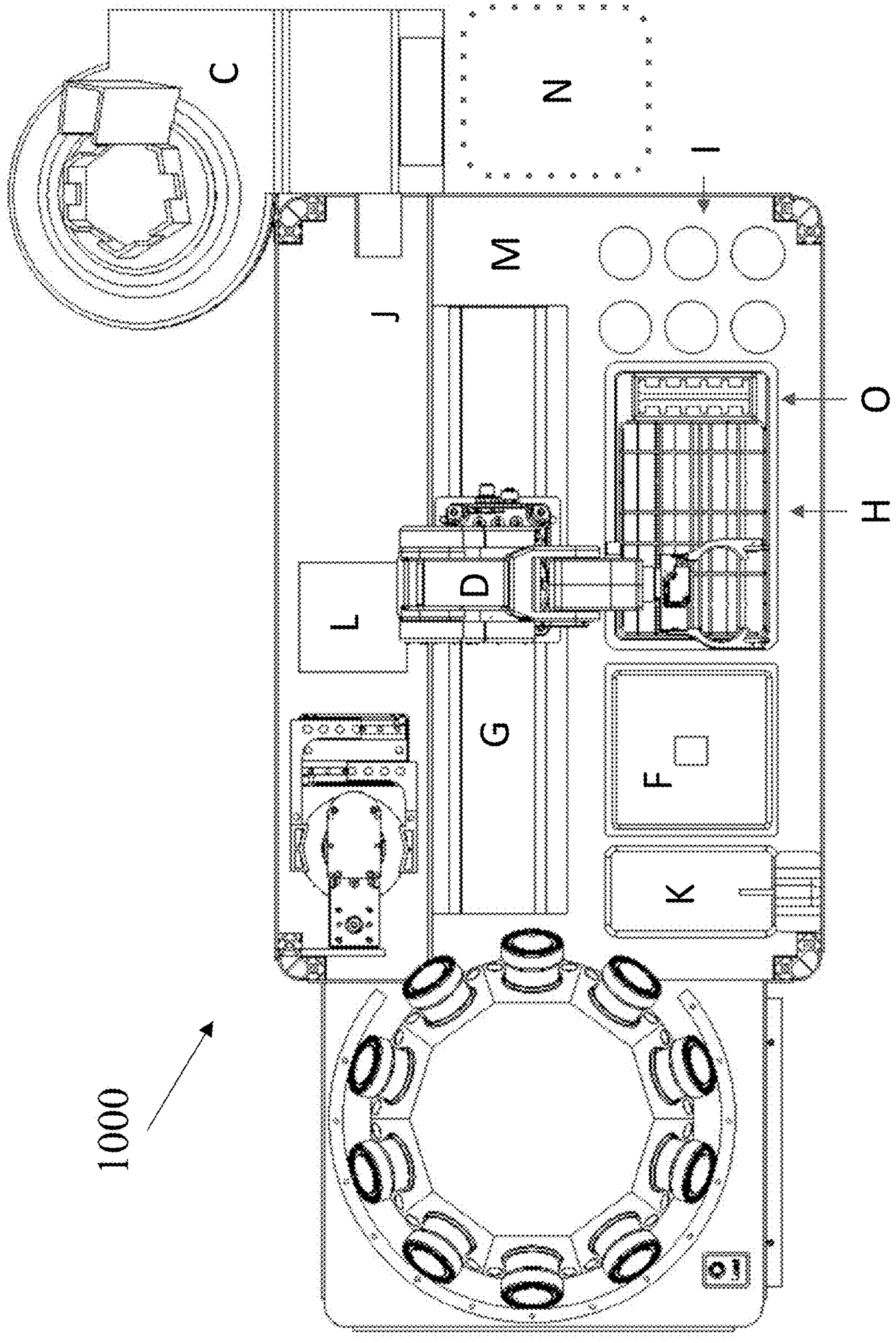
FIG. 2 depicts a top assembly view of the automated tissue grossing system.

FIGS. 1 and 2 provide an overview of an example automated tissue grossing system 1000, depicting various subsystems that facilitate automation from sample intake to cassette preparation. FIG. 1 presents a front assembly view of system 1000, while FIG. 2 provides a top assembly view.

System 1000 can integrate multiple automated subsystems. To enhance clarity, the subsystems within FIGS. 1 and 2 are labeled using letters (e.g., A, B, C, etc.), which correspond to specific components, tasks, or areas of the larger system 1000, including, for example, (A) an intake system (A), a HMI (B), a cassette printer (C), robotic handling (e.g., a robotic arm) (D), a decapping module (E), a vacuum module (F), a linear track (G), a processing rack (H), an exclusion zone (I), a cassette pick-up zone (J), a wash down zone (K), a backlight zone (L), a cassette closing station (M), an output chute (N), and a cassette exclusion zone (O). FIGS. 1 and 2 introduce these subsystems and outline an example workflow for processing a tissue sample through system 1000.

Throughout the example workflow, the system 1000 integrates multiple quality checks to ensure accurate tracking, validation, and analysis of specimens and their associated data. For example, the quality checks leverage a combination of sensors, such as high-resolution cameras, QR readers, artificial intelligence, computer sensing technology, and RFID readers, to perform various operations that enhance the reliability of the process. For example, the system 1000 can sense markers or indicators, such as barcodes or RFID tags, on both specimen jars and cassettes, validating and cross-referencing information to confirm consistency. System 1000 can, for example, extract and interpret label data using Optical Character Recognition (OCR), allowing it to retrieve details such as unique identifiers, patient information, and collection dates. Additionally, the system 1000 can employ imaging techniques to assess multiple aspects of the sample containers, including the condition of labels, the presence of biopsies on container caps, and the contents within specimen jars and cassettes. In some embodiments, advanced image processing, including object detection and segmentation models aid in tasks such as biopsy counting and dimension measurement. The system can also supplement captured images with metadata or tags derived from label readings or analytical results. These images and associated data can be displayed on a user interface, stored locally, or transferred to external systems, such as laboratory databases or Laboratory Information Systems (LIS), to facilitate seamless data integration and access.

The automation capabilities of the system 1000 allow the workflow to progress dynamically based on the analysis of each sample at each stage in the workflow. For example, using the integrated imaging and validation steps in the quality checks, the system 1000 can determine whether a sample meets the necessary criteria to continue through the process. If the analysis confirms that the information (e.g., image) is consistent and/or the sample is properly contained or the condition of the same is appropriate, the workflow can advance without manual intervention. However, when discrepancies or irregularities are detected, the system 1000 can automatically flag or exclude a specimen jar. For instance, a sample can be excluded if the information collected from the specimen jar or cassette is invalid, if there is a mismatch between the two containers, if the sample is not as expected, if the sample has escaped containment, or if either container is missing. Additionally, the system 1000 can detect and respond to unexpected conditions, such as the presence of biopsies in unintended locations—including on the cap of the specimen jar, within the emptied vessel of a specimen jar, or outside the cassette (e.g., spilled into a work surface). When such issues arise, the system can prompt intervention by excluding the sample to designated areas, notifying users through the interface, and/or triggering corrective actions, ensuring that errors are addressed efficiently and sample integrity is maintained.

As the example workflow below is described, additional figures are introduced to provide detailed views of individual subsystems. The order of workflow steps disclosed herein represents an example and is not restrictive. The system 1000 is designed to be dynamic, allowing for adjustments and customization of a workflow based on factors such as quality control determinations, a sample type for grossing, laboratory workflow specifications, personnel availability, preferences, lab size, output goals, etc. Accordingly, variations in the sequence of workflow steps or subsystems included are within the scope of this disclosure.

Figure 3:
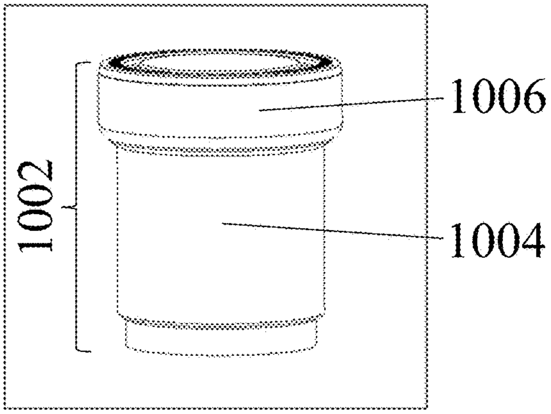
FIG. 3 depicts an example of a jar comprising a vessel with a compatible lid.

The example workflow can begin when a specimen jar is introduced into the intake system (A). FIG. 3 depicts an example of ajar 1002 comprising a vessel 1004 with a compatible lid 1006. The jar 1002 can be a fluid-tight container configured to store biological specimens in a preservative solution, such as formalin, to maintain tissue integrity for subsequent processing. The vessel 1004 is the body of the jar 1002 and can be a cylindrical or polygonal body defining an internal chamber sized to accommodate various tissue samples and volumes. The jar 1002 can be formed from a chemically resistant polymer, such as polypropylene or polyethylene, to prevent degradation upon exposure to formalin and other fixatives.

The tissue samples described herein can include any type of tissue suitable for diagnostic testing. The tissues can originate from any appropriate source mammal or insect having tissue to be tested and can include. Examples of mammals and insects, without limitation, include humans, non-human primates (e.g., monkeys), dogs, cats, horses, cows, pigs, sheep, mice, and rats.

The lid 1006 is removably securable to the vessel 1004. In some embodiments, the lid 1006 includes a threaded engagement to provide a leak-resistant seal. In some embodiments, the lid 1006 includes a snap engagement to provide a leak-resistant seal. In some embodiments, the lid 1006 can incorporate a tamper-evident feature to indicate unauthorized access before laboratory processing. In some implementations, the jar 1002 can include an integrated or attachable label area to support sample identification, barcoding, or RFID tracking. In some embodiments, the lid 1006 can include an integrated or attachable label area to support sample identification, barcoding, or RFID tracking.

The vessel 1004 can be provided in multiple volumetric capacities to accommodate different specimen types and collection protocols. In some embodiments, the volumetric capacity of a vessel 1004 can be about 30 mL to about 120 mL. For example, a volumetric capacity of a vessel 1004 can be about 30 mL, 60 mL, 90 mL, or 120 mL. The dimensions and proportions of the vessel 1004 can be varied to support different laboratory workflows while maintaining compatibility with automated processing systems.

Figure 4:
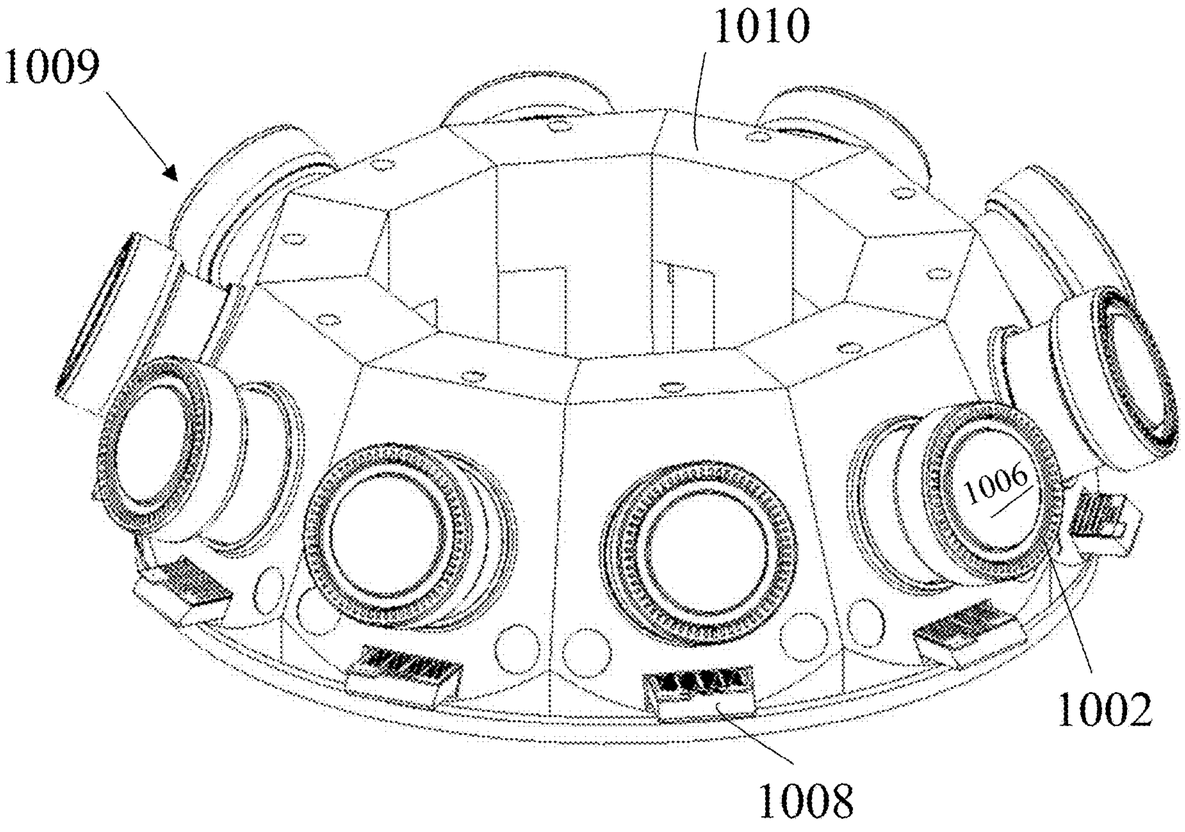
FIG. 4 depicts a close-up view of an example pallet, which includes multiple units arranged in a rotary carousel assembly.
Figure 5A:
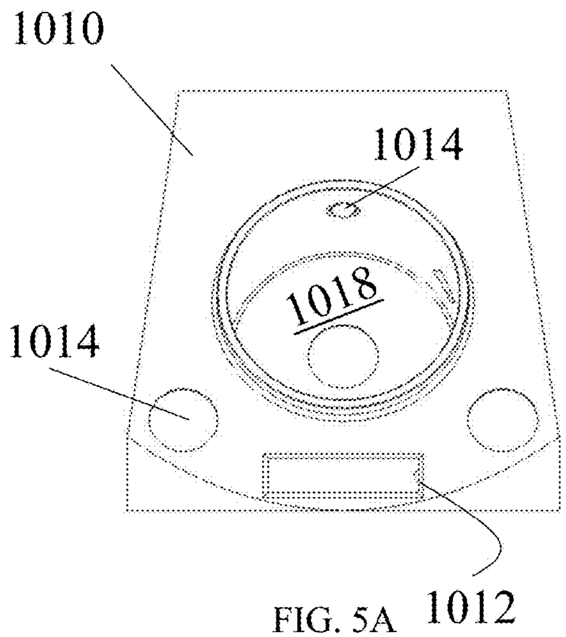
FIG. 5A illustrates a perspective view of a unit within a pallet, configured for holding jars and cassettes.
Figure 5B:
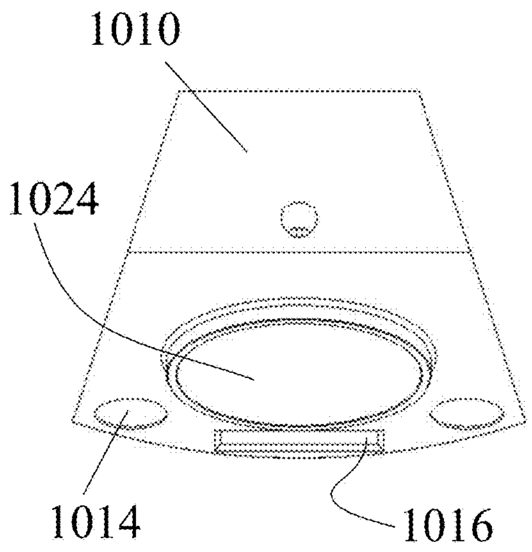
FIG. 5B illustrates another perspective view of a unit within the pallet, configured for holding jars and cassettes.
Figure 5C:
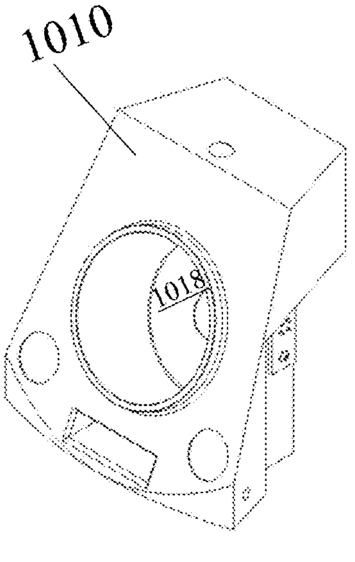
FIG. 5C illustrates another perspective view of a unit within the pallet, configured for holding jars and cassettes.
Figure 5D:
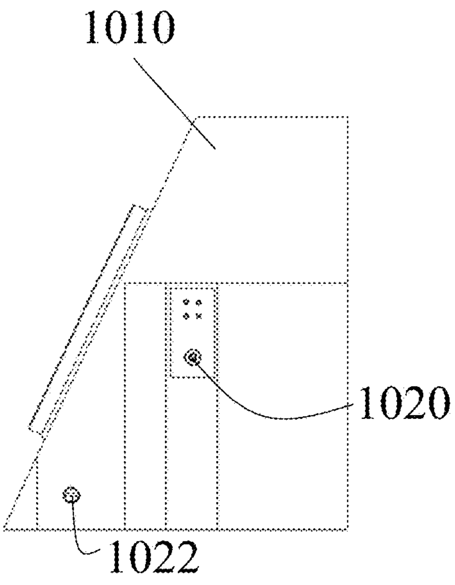
FIG. 5D illustrates another perspective view of a unit within the pallet, configured for holding jars and cassettes.

Specimen jars are typically used to contain a tissue sample and a volume of preservative. In some embodiments, the preservative is formalin. In some embodiments, the system 1000 is ventilated to remove fumes associated with the use of formalin. For example, the system 1000 can be enclosed with body panels and windows, creating a containment zone for formalin fumes. In such embodiments, the system 1000 includes a fitting on the top or side, allowing it to be plumbed to facility ventilation systems. This allows fluid (e.g., air or fumes) to be drawn up and out of the system 1000, evacuating formalin fumes. The system 1000 can include one or more sensors to read the levels of formalin in the machine, and/or its surroundings and alert when those levels exceed the safety limits As shown in FIG. 1, the intake system (A) is configured as a rotary assembly. The vertically stacked configuration of the rotary assembly can store multiple jars 1002 in a vertical stack providing efficient space utilization. In some embodiments, the rotary assembly can detect when the intake system (A) is being manipulated by a user. Turning now to FIGS. 4-7B, the structure of the rotary assembly of the intake system is described. FIG. 4 depicts a close-up view of an example pallet 1009, which includes multiple units 1010 arranged in a rotary. Each unit 1010 can be configured to receive and securely retain a jar 1002 with its corresponding lid 1006 accessible positioned externally to the unit 1010. In some embodiments, the unit 1010 can also include a slot that is appropriately sized for a cassette 1008. The pallet 1009 can be structured to facilitate automated handling, positioning, and retrieval of specimens during laboratory workflows. In some embodiments, the cassette 1008 is labeled with identifying information that associates the cassette with the sample contained in the jar 1002. For example, a user can load a unit 1010 with ajar 1002 and a cassette 1008 where the cassette is labeled with identifying information that matches the jar 1002.

In some embodiments, the pallet 1009 can be configured with a geometric shape that provides secure placement of jars 1002 and cassettes 1008 within units 1010 while maintaining stability during rotation. For example, the units 1010 are oriented to allow for efficient specimen access, enabling robotic or mechanical interaction for specimen selection. The pallet 1009 is designed for compatibility with additional stacked pallets, supporting high-throughput laboratory operations. Further structural details of the units 1010 and their integration with the rotary assembly are provided in FIGS. 5A-5D.

FIGS. 5A-5D illustrate various views of a unit 1010 within the pallet 1009, configured for holding jars 1002 and cassettes 1008. The pallet 1009 is formed from multiple units 1010, each containing an individual cup 1024 and/or slot 116 arranged in a circular pattern. A unit 1010 is adaptable to accommodate varying jar sizes and designs providing compatibility with various jars 1002.

In the embodiment depicted in FIGS. 5A-5D, a unit 1010 can include a spring detent 1012 within slot 1016 which engage upon insertion of a cassette 1008 within the slot 1016. In this embodiment, the unit 1010 can also include a spring detent 1014 within cup 1024, which engages upon insertion of a jar 1002, securing the jar 1002 while allowing for easy removal. In some embodiments, a unit 1010 can include ajar proximity sensor 1020 and/or a cassette proximity sensor 1022. For example, the jar proximity sensor 1020 and/or a cassette proximity sensor 1022 can be either mechanical or light-based and can be configured to detect the presence of a jar 1002 and/or a cassette 1008 when inserted. In some examples, the jar proximity sensor 1020 and/or a cassette proximity sensor 1022 can be integrated to provide automated tracking and verification of cassette 1008 and/or jar 1002.

In some embodiments, the label indent 1014 can serve as a designated area for identifying the position number and jar size that the unit 1010 is configured to hold, facilitating automated recognition and retrieval processes. In some embodiments, a silicone pad 1018 is positioned at the back of the cup 1024 to reduce noise and impact when a jar 1002 is inserted, minimizing vibrations that could interfere with sensitive operations.

In some embodiments, the unit 1010 is configured to hold jars 1002 at an angle that is less than 90 degrees relative to the base of the pallet 1009. For example, this angled placement improves accessibility and operational efficiency by reducing the vertical clearance required for insertion and retrieval. Additionally, the angled positioning allows for improved visibility and scanning of jar 1002 labels.

The structural configuration of the unit 1010 supports seamless integration with robotic handling systems and automated workflows, enhancing efficiency in laboratory processing. The modular and reconfigurable design allows for customization based on specific sample types, improving flexibility in high-throughput environments.

Figure 6:
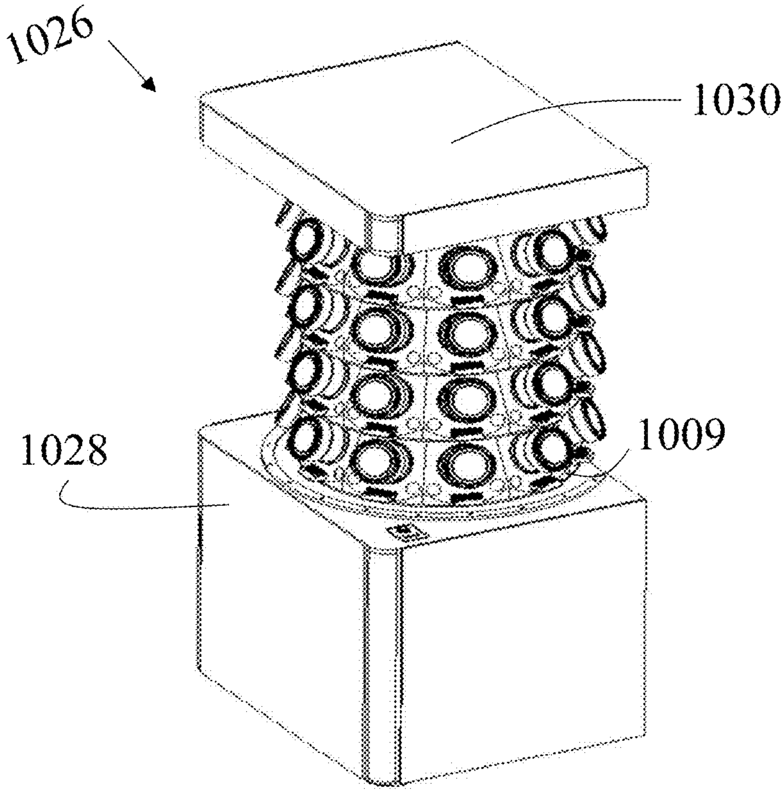
FIG. 6 depicts a rotary assembly including multiple pallets and laser diodes forming a laser curtain sensor.

FIG. 6 depicts a rotary assembly 1026 including multiple pallets 1009 and laser diodes forming a laser curtain sensor. The example rotary assembly 1026 includes a stack of pallets 1009 secured between a base 1028 and a top 1030. In some embodiments, the rotary assembly 1026 is driven by a motor assembly housed within the base 1028, which provides controlled rotational indexing of the pallets 1009. For example, the motor assembly incrementally advances the rotary assembly 1026 in predefined steps, aligning each unit 1010 with a designated retrieval or loading position. In some embodiments, a position sensor monitors the rotary movement and signals the system 1000 when the assembly has reached a correct orientation for jar 1002 placement or removal.

Figure 7A:
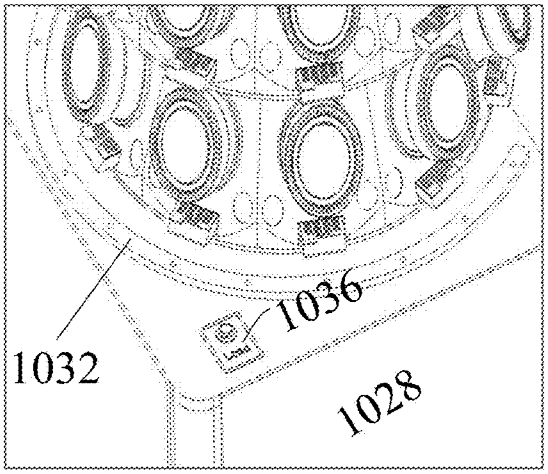
FIG. 7A depicts a close-up view of a lower portion of the rotary assembly of FIG. 6 positioned on the base.
Figure 7B:
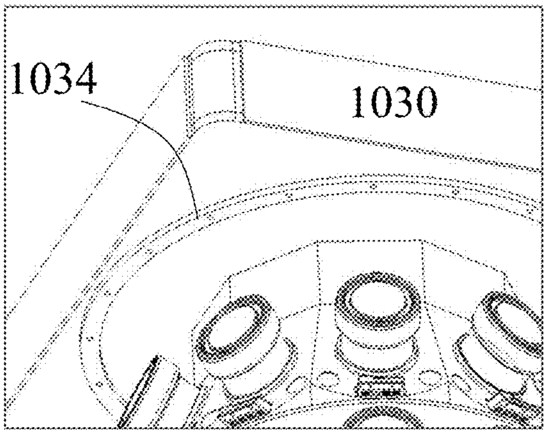
FIG. 7B depicts a close-up view of an upper portion of the rotary assembly of FIG. 6 positioned under the top.

FIG. 7A depicts a close-up view of a lower portion of the rotary assembly 1026 positioned on the base 1028. FIG. 7B depicts a close-up view of an upper portion of the rotary assembly 1026 positioned under the top 1030. FIG. 7A further depicts an example receiver for a laser diode 1032 positioned on the base 1028 and FIG. 7B further depicts a laser diode 1034 positioned on the top 1030. In some embodiments, the receiver for the laser diode 1032 and the upper laser diode 1034 can generate a laser curtain sensor. For example, the rotary assembly 1026 can include the laser curtain sensor that detects when the intake system (A) is being manipulated and/or detects when ajar 1002 and/or cassette 1008 are loaded or removed. In some embodiments, as further shown in FIG. 7A, the base 1028 includes a load button 1036. In an example operation, pressing the load button 1036 disengages the drive motor, allowing manual rotation of the rotary assembly 1026 for loading empty slots. The rotary assembly 1026 can resume automated operation when the load button 1036 is pressed again or after a predefined period of inactivity. Alternatively, the system 1000 can be incrementally advanced via a user prompt on a display screen of the HMI (B), allowing controlled placement of jars 1002 within the rotary intake system (A).

In the alternative or in addition to introducing a jar 1002 to the intake system (A), a workflow can begin when a user provides input to the HMI (B). The HMI (B) is a user interface that a user can operate to interact with the system 1000. In an example workflow, the user can provide input to the system via the HMI to transmit commands to the system 1000 starting and stopping the rotary assembly 1026 to add or remove a jar 1002 from the intake system (A). In some embodiments, the HMI (B) can include a screen with touch input technology and/or wireless communication technology. In some embodiments, the HMI can be accessed by a user to view real-time information. In one embodiment, the HMI can display images of the specimen and/or cassette being processed. Such images can be displayed one at a time or simultaneously and can include one or more of the following images of the specimen jar in the input system, images of labels on the specimen jar or cassette; images of the lid of the specimen jar images of the contents of the specimen jar; images of the biopsies once transferred from the specimen jar to the cassette and while the cassette is open.

Although not visible in FIGS. 1 and 2, the automated tissue grossing system 1000 can include computing infrastructure (e.g., one or more processors, memory devices, hardware, software, wireless communication infrastructure, and printed circuit boards) that integrate the subsystems described herein.

In some embodiments, the computing infrastructure controls the operation of the automated components through a central processing unit (CPU) or a distributed network of processors that execute memory-stored instructions to coordinate, for example, the movement of mechanical elements, regulate vacuum pressure, regulate mechanical grip pressure, regulate torque of the rotary gripper, and control the backlight zone (L) for UV-based and/or visible spectrum based imaging analysis. In some embodiments, the system 1000 processes data from multiple sensors, including proximity sensors (e.g., 1020, 1022) for specimen detection, pressure sensors (e.g., 1083) for vacuum regulation, and optical sensors for verifying correct cassette placement in the processing rack (H).

In some embodiments, the computing circuitry is also responsible for image processing and computer vision algorithms, which analyze real-time data from various cameras positioned at workflow quality checkpoints. For example, the algorithms can detect biopsy fragments, confirm label integrity, and ensure the accurate transfer of specimens. In such embodiments, the captured images and processed data are stored in system 1000 memory, where they can be retrieved for gross report generation, error handling, and quality control verification.

In some embodiments, in addition to hardware control, the computing circuitry manages the user interface 1038 (HMI), allowing laboratory personnel to monitor system status, receive alerts, and interact with workflow automation. For example, when anomalies are detected, the system 1000 can generate real-time notifications, prompting corrective actions such as re-pouring a specimen, re-threading a lid (1006) onto the jar (1002), or moving a sample to the exclusion zone I or O. The system 1000 also facilitates seamless electronic communication with the Laboratory Information System (LIS), ensuring that processed data and imaging records are integrated into patient pathology reports.

In some embodiments, the control circuitry further enables system 1000 adaptability by supporting programmable settings for tilt angles (e.g., 30-70 degrees for wash-down), pouring speeds, and vacuum intensities, optimizing performance across various specimen types and laboratory environments. Through stored executable instructions, the system 1000 can adjust operational parameters dynamically, improving efficiency, minimizing specimen loss, and enhancing overall workflow automation. The computing infrastructure is discussed in further detail in connection with FIG. 21.

In another embodiment, the HMI (B) can provide app-based control, enabling remote monitoring and operation via computing devices (e.g., smartphone, tablet, wearable smart device). For example, the HMI (B) can send one or more alerts to a user's computing device related to the operation of the automated tissue grossing system 1000. For instance, if ajar is flagged for exclusion the HMI (B) can generate an alert to the user to facilitate corrective action. In some embodiments, a user can be able to send commands to the automated tissue grossing system 1000 responsive to a received alert. In this way, a user can remotely intervene and/or take corrective action without manual intervention. In another embodiment, the HMI (B) can provide step-by-step corrective guidance to users (e.g., via a graphical user interface (GUI)), ensuring proper workflow adjustments when errors occur. In this example workflow, a user interacts with the HMI (B) inputting a command to process a specimen jar or customize an order of processing.

Figure 8:
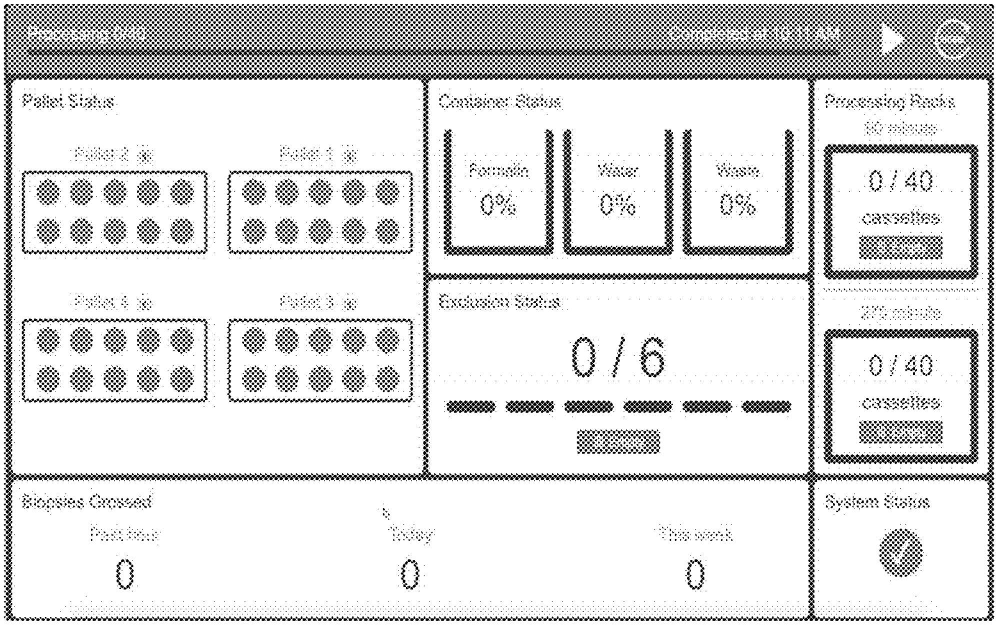
FIG. 8 depicts an example view of a graphical user interface of the HMI (B).

FIG. 8 depicts an example view of a graphical user interface 1038 of the HMI (B). In some embodiments, the graphical user interface 1038 provides real-time system monitoring and operational feedback, including capacity tracking, exclusion handling, output monitoring, and utility status. For example, the capacity display allows users to view the number of jars 1002 loaded into the rotary assembly 1026 and can output an estimated total run time based on the current workload. The exclusion process detects and isolates specimen jars 1002 and associated cassettes 1008 that fall outside the defined process parameters, alerting the user with an indication of the exclusion reason.

In some examples, the interface also provides an output capacity display, which shows the total number of cassettes 1008 in the output processing basket. In this implementation, if the basket reaches capacity, the system 1000 generates an alert and can pause operations until the basket is emptied. Additionally, the user interface 1038 can display the current status of lab utilities such as water supply, ventilation, and waste levels, depending on the system's connection to laboratory infrastructure. The real-time monitoring allows for improved workflow efficiency and minimizes potential disruptions during specimen processing.

Figure 9:
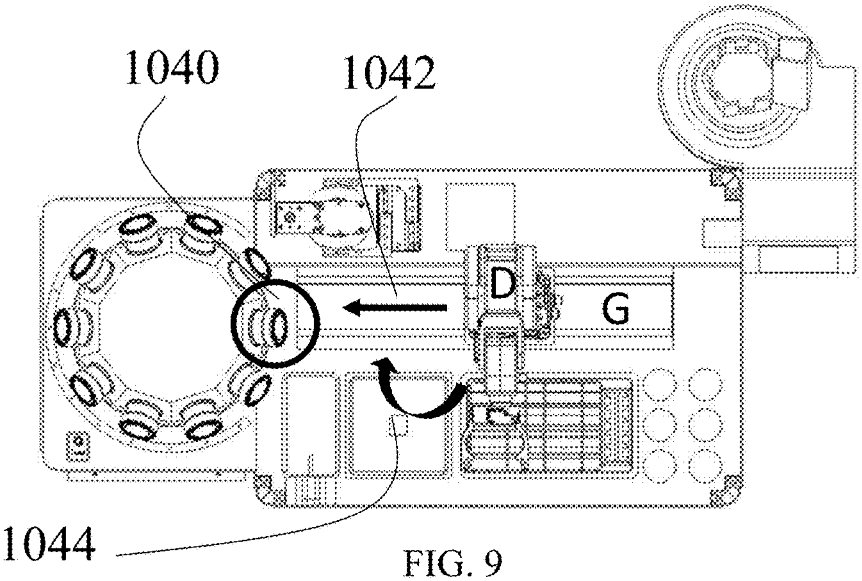
FIG. 9 depicts the top assembly view of the automated tissue grossing system with a retrieval point identified.

The example workflow progresses by moving ajar 1002 into place for selection. For example, a jar identified by the HMI (B) is rotated on the rotary assembly 1026 to a retrieval point that is accessible to the robotic arm (D). For example, FIG. 9 depicts the top assembly view of the automated tissue grossing system 1000 with a retrieval point identified. The retrieval point 1040 is accessible by the robotic arm (D). The robotic arm (D) is rotatable in any direction. In this instance, the robotic arm (D) rotates as indicated by arrow 1044 and can move linearly on linear track (G) to retrieve the jar 1002 from the retrieval point 1040. In some embodiments, sensors are capable of reporting if a specimen jar is present at the retrieval point 1040. If no jar is present, the robotic arm (D) can move to the next incremental pick location.

Figure 10A:
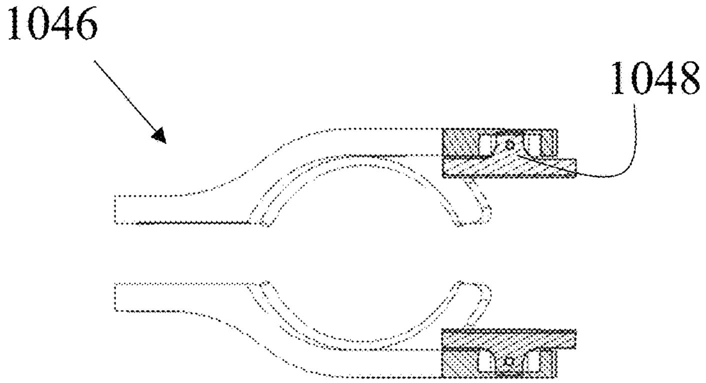
FIGS. 10A-10C depict a gripper that can move to securely grasp a jar.
Figure 10B:
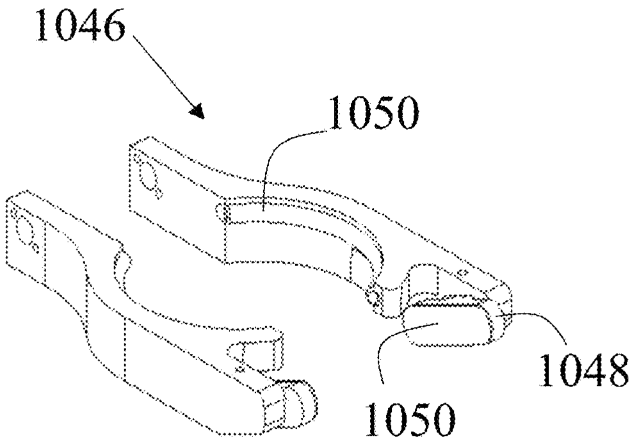
Figure 10C:
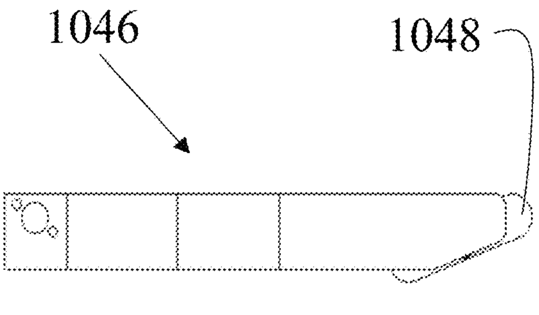
Figure 11A:
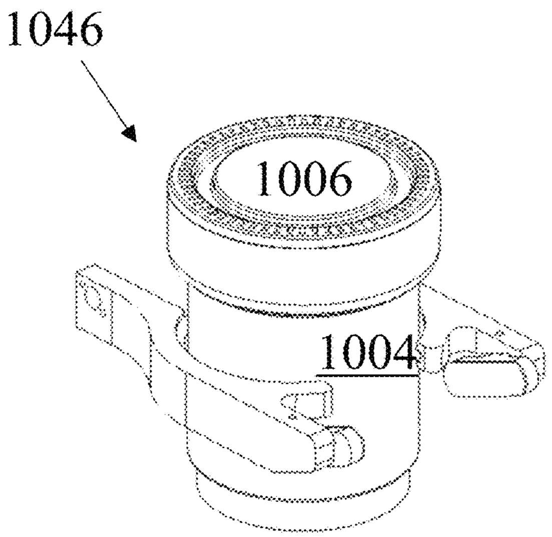
FIGS. 11A-11C depict a gripper holding the jar.
Figure 11B:
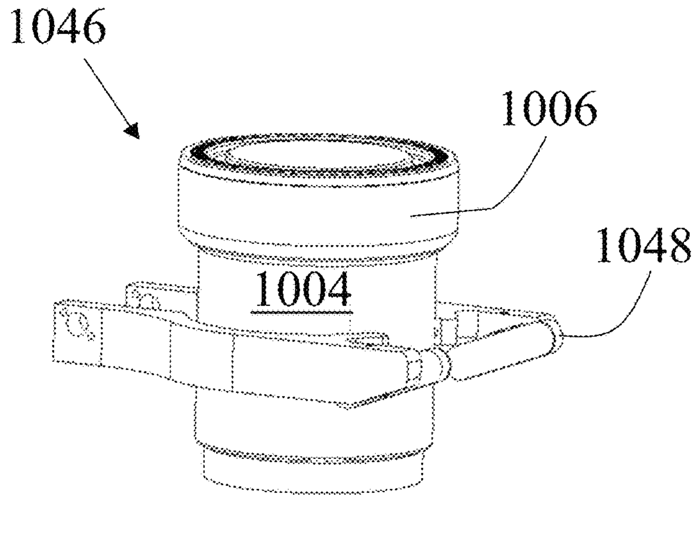
Figure 11C:
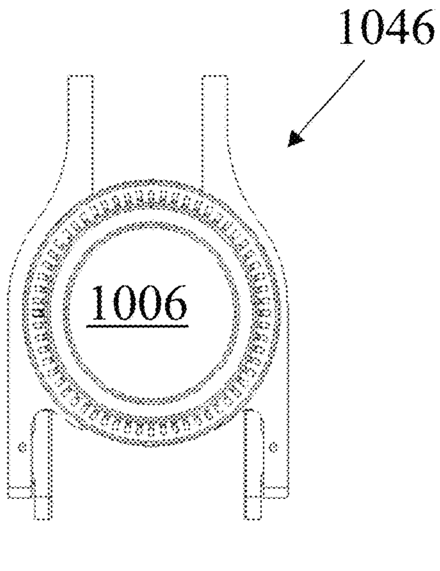
Figure 12A:
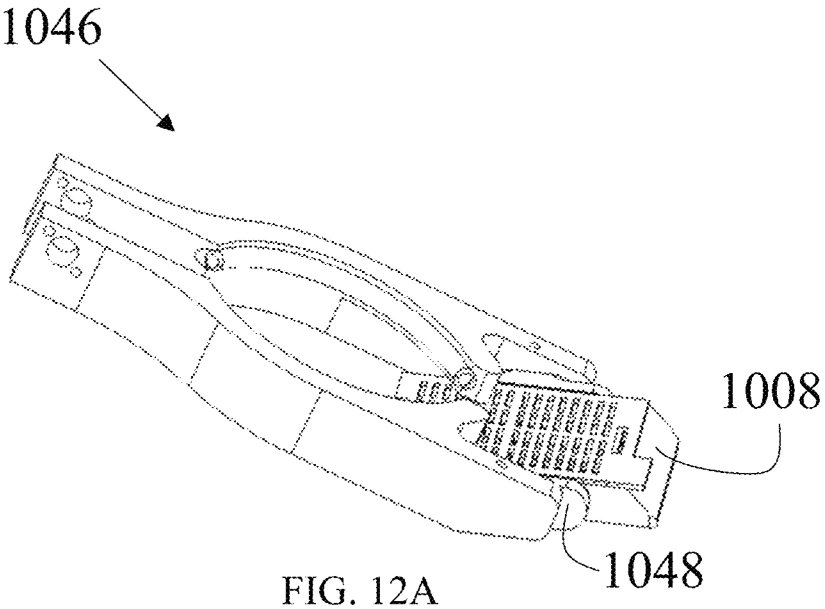
FIGS. 12A-12C depict a gripper holding a cassette with end effectors.
Figure 12B:
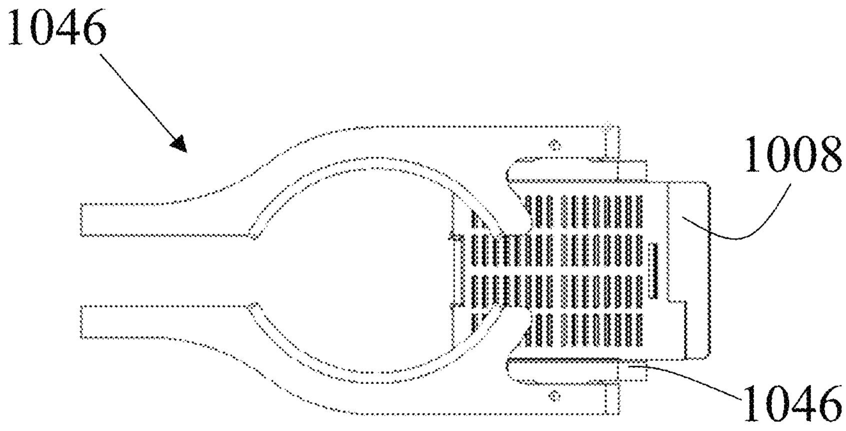
Figure 12C:
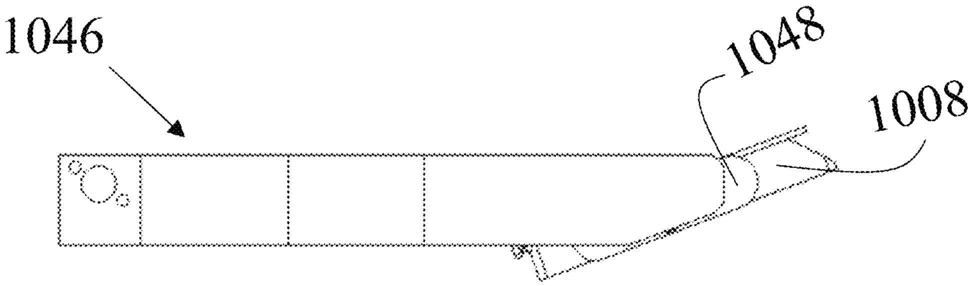

The robotic arm (D) comprises a gripper sized to securely grasp ajar and an end effector configured to grip an open or closed cassette 1008. In some embodiments, the gripper is configured to allow a single fixed pair of end effectors to perform movements such as picking, maneuvering, and placement operations for both jars 1002 and cassettes 1008 within the automated tissue grossing system 1000. For example, the end effectors are integrated into a 6-axis robotic arm, which moves consumables through various substations of the system 1000. For example, FIGS. 10A-10C depict a gripper 1046 that can move to securely grasp a jar 1002. FIGS. 11A-11C depict a gripper 1046 holding the jar. FIGS. 12A-12C depict a gripper 1046 holding a cassette 1008 with the end effectors 1048.

FIGS. 10A-10C depict the gripper 1046, which includes end effectors 1048 to facilitate secure handling of both jars 1002 and cassettes 1008. FIGS. 10A and 10B depict perspective views of the gripper 1046 while FIG. 10C depicts a side profile view of the gripper 1046. The end effectors 1048 can be centrally hinged, maintaining parallel contact with the cassette 1008 to ensure a firm grip. A pliable material 1050 is inlaid on both the end effectors 1048 and jar contact surfaces, providing a non-slip grip that enhances handling precision. In this example, the end effectors 1048 are designed to pick up cassettes without interfering with the space occupied by the jar grippers, providing unobstructed movement.

FIGS. 11A-11C illustrate the gripper 1046 securely holding a jar 1002 by its body (e.g., the vessel 1004) rather than the lid 1006. This configuration can facilitate controlled pouring motion while maintaining a secure grasp. The jar gripping design ensures a stable hold, preventing unintentional tilting or slipping during movement.

FIGS. 12A-12C depict the gripper 1046 handling a cassette 1008 using the end effectors 1048. The end effectors 1048 are angled to provide access to cassettes 1008 in hard-to-maneuver areas, such as flat decks surrounded by bumpers. The configuration ensures the robotic arm (D) can retrieve and transport cassettes efficiently.

The robotic arm (D) is positioned on a linear track (G), enabling linear motion throughout the automated tissue grossing system 1000 and facilitating the movement of jars 1002 and cassettes 1008 between substations. In this embodiment, the robotic arm (D) operates with six-axis motion, allowing movement along three linear axes (X, Y, and Z) and rotational movement around each axis (roll, pitch, and yaw). This multi-axis flexibility enables precise manipulation of consumables, ensuring seamless integration into the automated workflow.

In some embodiments, the robotic systems disclosed herein are monitored for failures. For example, robotic systems (e.g., the robotic arm (D), the decapping module (E), cassette printer (C), etc.) that handle specimen containing jars throughout the workflow of system 1000 can be monitored for failures and crashes. In such examples, a report can be sent to the HMI (B) or a user interface. For example, in the event of a crash the system 1000 can implement a method to correct the error that caused the crash. In some embodiments, the HMI can generate step by step instructions for a user to implement a fix.

Figure 13:
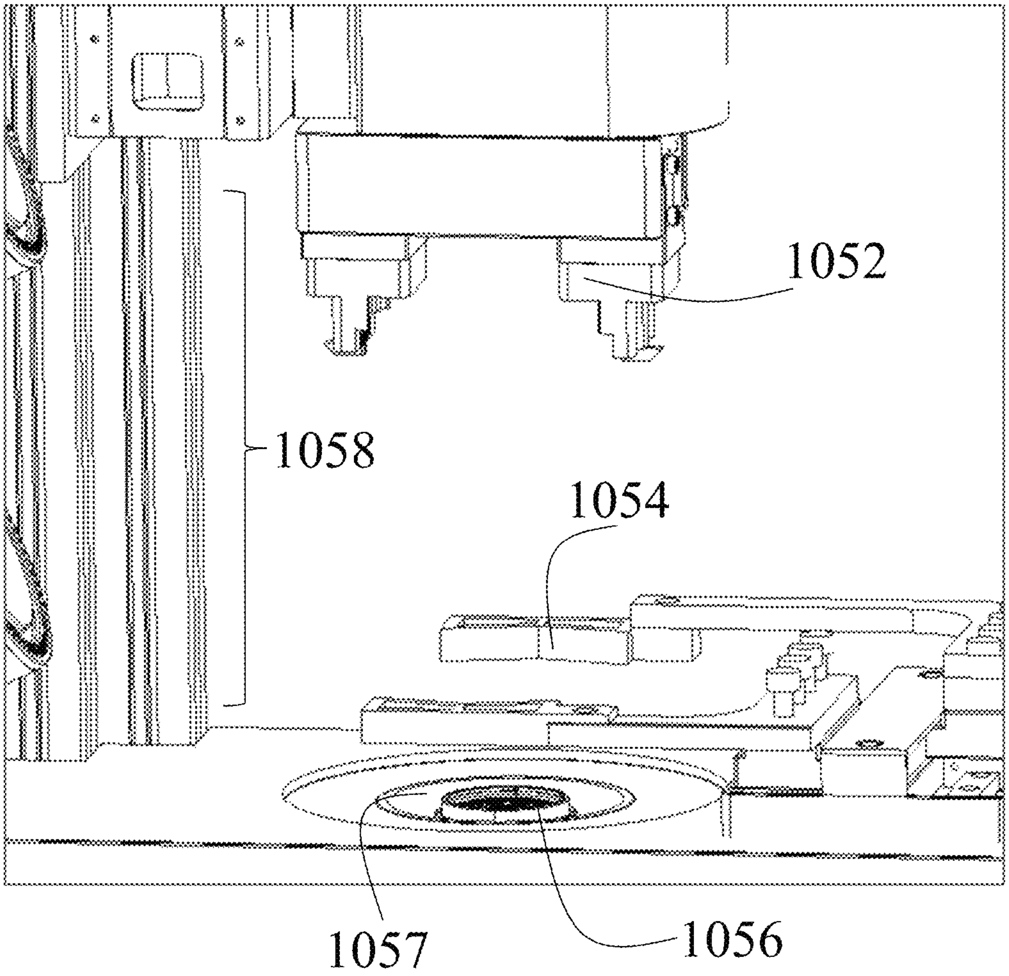
FIG. 13 depicts a close-up view of the decapping module (E) with a rotary gripper and a stationary gripper positioned over a ring of LED lights, and a camera.

After retrieval of the specimen jar 1002 the example workflow proceeds as the robotic arm (D) can transport the jar 1002 to the decapping module (E). FIG. 13 depicts a close-up view of the decapping module (E) with a rotary gripper 1052 and a stationary gripper 1054 positioned over a ring of LED lights 1057, and a camera 1056. In some embodiments, at the decapping module (E), the gripper 1046 of the robotic arm (D) aligns the jar 1002 beneath the overhead rotary gripper 1052. For example, the rotary gripper 1052 is configured to move along a vertical axis (as indicated by the arrow 1058) and grip the lid 1006 of the jar 1002. In this example, the gripper 1046 releases the body of the jar 1002, and the rotary gripper 1052 grips the lid 1006 and moves the jar 1002 vertically such that one or more labels attached to the jar 1002 can be imaged.

The imaging of the jar 1002 is an example of a first quality check by the system 1000. In some embodiments, the system 1000 verifies that the label of the jar 1002 is acceptable. For example, the decapping module (E) can include a high-resolution camera system that can capture multiple images of the jar 1002 label. For instance, when a first image is captured, the jar is rotated 45 degrees. Then a second image is captured, and the jar is again rotated 45 degrees. This is repeated until 8 images are taken, capturing the full extent of the surface of the jar. The multiple images are stitched together by the system 1000 (e.g., computing circuitry of the system 1000) allowing the system 1000 to extract relevant details related to the specimen and/or subject. For example, using software, these 8 images are stitched together, and using a detection tool, QR codes, barcodes, and/or handwritten text, can be read and printed.

Non-limiting examples of details include patient ID, specimen type, collection method, species of subject, and collection date. If the label is insufficient (e.g., unreadable or inconsistent), or the images are unable to generate a readable image, the system 1000 (e.g., computing circuitry of the system 1000) flags the jar, and the rotary gripper 1052 will move the jar down its vertical axis and release the jar. The robotic arm (D) grips the jar with the gripper 1046 and takes it to the exclusion zone (I) for manual review. In some embodiments, information related to the exclusion of the jar is transmitted (e.g., by computing circuitry of the system 1000) as a notification to the HMI. For example, details about the exclusion can appear on the screen that can contain information as to why the specimen jar was excluded. Additionally, this information is stored by the system 1000 for a gross report.

In some embodiments, the automated tissue grossing system 1000 (e.g., computing circuitry of the system 1000) can continuously monitor the pinching force applied by the stationary gripper 1054, the jar gripper 1046 of the robotic arm (D), and the rotary grippers 1052 to ensure secure handling of the jar 1002 and lid 1006 throughout the decapping and recapping processes. For example, the system 1000 maintains a balance of applying sufficient force to prevent slippage while avoiding excessive pressure that could deform the vessel 1004 or lid 1006, which could interfere with proper reattachment. In another embodiment, the system 1000 (e.g., computing circuitry of the system 1000) monitors the torque output of the rotary gripper 1052 during the re-threading process. For example, once the torque reaches a predefined threshold, indicating that the lid 1006 has been fully secured, the rotary gripper 1052 automatically releases, stopping the re-capping process to prevent over-tightening or damage. In some embodiments, the robotic arm (D) can return to the unit 1010 where the jar 1002 was selected from the retrieval point 1040 and pick up the cassette 1008. For example, a user can load the unit 1010 with the cassette 1008 that has already been labeled to associate it with the jar 1002.

In other embodiments, a cassette printer (C) is optionally included in the workflow. For example, when the label has been read and verified, the system 1000 can transmit a print command to the integrated cassette printer (C). The cassette printer (C) prints a cassette with identifying information that corresponds to the label of the jar. The labeled cassette is released by the cassette printer (C) to the cassette pick-up zone (J). The printed cassette is picked up by the end effector 1048 of the robotic arm (D) and moved to the vacuum module (F).

The system 1000 utilizes a fine mesh cassette 1008 capable of containing biopsies without the need for additional filter or screen surfaces. In some embodiments, the cassette 1008 is manufactured in a pre-closed position. In some embodiments, the cassettes 1008 include pre-attached lids, which can be automatically closed when the cassette is printed. In such embodiments, the robotic arm (D) picks up the cassette from the back deck location using the end effector 1048 of the gripper 1046. To open the pre-attached lid and/or pre-closed lid, the end effector 1048 the robotic arm (D) moves the cassette against a static hook feature located on the system 1000, lifting the lid before advancing the open cassette to the vacuum module (F). The cassette is then positioned on the vacuum module (F) for tissue placement. While the system 1000 is designed to handle cassettes with pre-attached lids, a separate lid attachment process is possible.

Continuing with the example workflow, after the label of the jar 1002 has been verified (e.g., by computing circuitry of the system 1000), the rotary gripper 1052 moves the jar 1002 to the stationary gripper 1054 of the decapping module (E) by descending on the vertical axis 1058. For instance, the stationary gripper 1054 holds the jar 1002 stationary by gripping the vessel 1004 portion, and the rotary gripper 1052 grips the lid 1006 and spins while ascending vertically on its axis 1058, unthreading the specimen jar lid 1006. With the lid 1006 removed and held by the rotary gripper 1052, the stationary gripper 1054 releases the vessel 1004 of the jar 1002 and the robotic arm (D) gripper 1046 picks up the jar 1002 by the vessel 1004 portion and moves it to the backlight zone (L) for internal specimen imaging.

Figure 14:
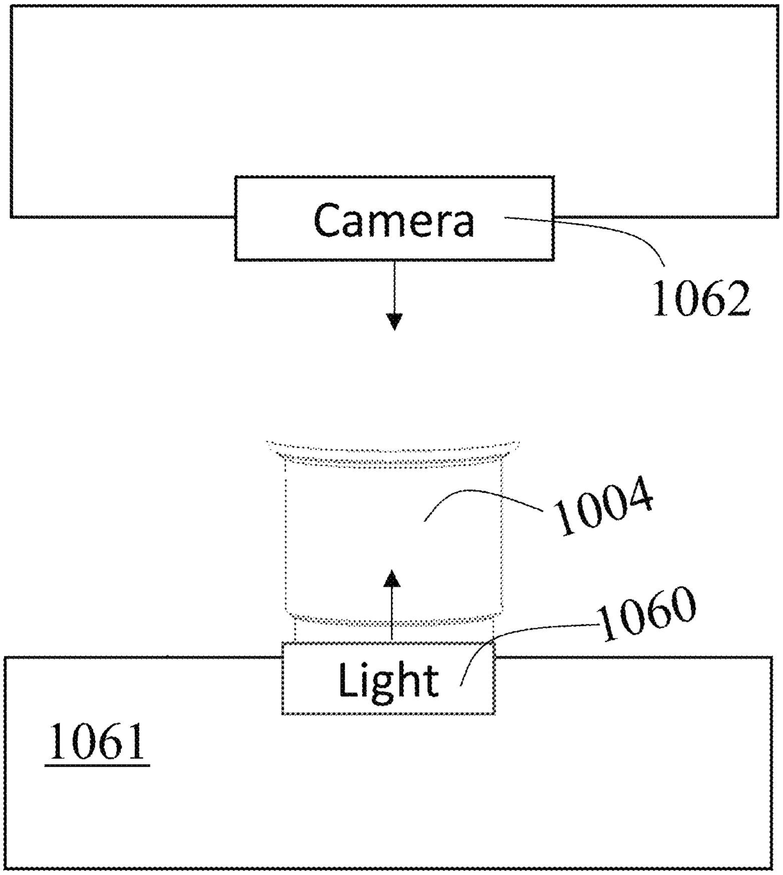
FIG. 14 depicts the backlight zone (L) having a light integrated into a surface of the system.

Continuing with the example workflow, the jar 1002 is prepped for a second quality check to verify the contents of the jar 1002 with internal specimen imaging at backlight zone (L). FIG. 14 depicts the backlight zone (L) having a light 1060 integrated into a surface 1061 of the system 1000. Before the uncapped jar 1002 is positioned in the backlight zone (L), the robotic arm (D) (holding jar 1002 by the vessel 1004 portion) agitates the jar 1002 in a circular fashion with the gripper 1046. For example, using coordinated movement along the roll and pitch axes while maintaining a stable hold on the vessel 1004 with the gripper 1046, the robotic arm (D) tilts the vessel 1004 slightly off its vertical axis and executes a controlled orbital motion. The controlled orbital motion combines a smooth rotational movement around the yaw axis with a gentle oscillation in the X-Y plane, ensuring even fluid displacement without excessive turbulence. The controlled orbital motion creates a swirl vortex in the liquid of the vessel 1004 which agitates settled bits of tissue, declumps tissue that might be struck together, and distributes the tissue across the bottom of the vessel 1004 of the specimen jar 1002. The agitation can be repeated as needed (e.g., if images of the contents of the vessel 1004 are taken more than once).

In some embodiments, the light 1060 of the backlight zone (L) comprises a 365 nm UV light. For example, the 365 nm wavelength creates a fluorescence effect on tissue which distinguishes tissue from water droplets in an image. In this implementation, the light 1060 illuminates the vessel 1004 interior by illuminating the bottom of the vessel 1004, and the camera 1062 positioned above the vessel 1004 captures high-contrast images. The high-contrast images are transmitted to the system 1000. The system 1000 (e.g., computing circuitry of the system 1000) can detect, count, and measure tissue fragments within the vessel 1004. The system 1000 (e.g., computing circuitry of the system 1000) performs a quality analysis to determine if the tissue within the vessel 1004 should proceed in the workflow.

In some embodiments, using software, the contents of the jar are interpreted (e.g., by computing circuitry of the system 1000). For example, pixel values from the resulting image are built into a data matrix, one or more digital filters are run to remove noise from the image, and a custom object detection algorithm is run on the image, identifying boundaries of specimens within the image and quantifying their count and size. In some examples, multiple pictures are taken and interpreted sequentially to confirm the contents of the vessel 1004. In this way, the system 1000 (e.g., computing circuitry of the system 1000) determines whether the sample is appropriately sized for the cassette and if the sample appears to be what is expected according to the label verification. All of this information can be stored for the grossing report (e.g., by computing circuitry of the system 1000). The system 1000 determines if the jar should proceed to be processed in the workflow.

Turning back to the decapping module (E), the system 1000 performs a third quality check by examining the underside of the lid 1006 to determine if tissue is present. In some embodiments, the light 1057 of the backlight zone (L) comprises a 365 nm UV light. The 365 nm wavelength creates a fluorescence effect on tissue which distinguishes tissue from water droplets in an image. For example, the LED lights 1057 are arranged to surround the camera 1056 to reduce shadowing and create an even illumination of the cracks, crevices, and threads of the lid. In this implementation, with the jar removed from the stationary grippers 1054 of the decapping module (E), and the lid 1006 of the vessel 1004 still held by the rotary grippers 1052, the camera 1056 that is mounted below the stationary gripper 1054 and pointed up toward the rotary grippers 1052 takes an image of the lid 1006 (e.g., an image of the underside internal portion of the lid 1006) illuminated by the lights 1057. In some embodiments, using software, pixel values from the resulting image are built into a data matrix, one or more digital filters are run to remove noise from the image and object detection is run on the image to identify is specimens are present in the image and quantifying their count and size.

In some embodiments, the jar 1002 is identified for exclusion based on the images of the interior of the vessel 1004, the images of the lid 1006, or both. For example, the jar 1002 can be identified for exclusion if the system 1000 (e.g., computing circuitry of the system 1000) determines that the images of the sample within the vessel 1004 are inappropriately sized for a cassette or if the sample within the vessel 1004 does not match with what the system 1000 expects to be in the jar 1002 based on the label verification. In another example, the jar 1002 can be identified for exclusion because the image of the under portion of the lid 1006 determined that a portion of the tissue sample is lodged in the lid 1006. In these instances, the system 1000 (e.g., computing circuitry of the system 1000) will send commands for a recapping procedure.

An example recapping procedure includes the gripper 1046 of the robotic arm (D) gripping the vessel 1004 portion and moving the lidless vessel 1004 from the backlight zone (L) to the decapping module (E). In this example, the gripper 1046 of the robotic arm (D) can position the vessel 1004 of the jar 1002 within range of the stationary gripper 1054 of the decapping module (E). The lid 1006 of the jar 1002, which is still held by the rotary gripper 1052 from the removal process, will be re-attached. To secure the lid 1006, the stationary gripper 1054 holds the jar 1002 in place by gripping the vessel 1004 portion, while the rotary gripper 1052 aligns the lid 1006 with the jar opening and descends along its axis 1058 while simultaneously rotating in the threading direction, ensuring a secure and properly sealed attachment. With the lid 1006 secured to the vessel 1004, the stationary gripper 1054 will release the jar 1002 and the robotic arm (D) will move the jar 1002 to the exclusion zone (I). Details regarding the exclusion (e.g., why the jar was excluded and relevant images) can be stored for the grossing report or transmitted to the HMI (B) (e.g., by computing circuitry of the system 1000) for user review and intervention. For example, a user can receive such information as an alert and manually retrieve the jar from the exclusion zone (I). In some cases, the user can correct the issue that caused the exclusion (e.g., cut the tissue to an appropriate size or dislodge the tissue stuck in the lid) and reintroduce the jar to the intake system (A). Although the second quality check and the third quality check are described in a particular order, these steps can occur in any order or substantially simultaneously.

Turning back to the example workflow, in an embodiment where the specimen jar 1002 is determined to be acceptable based on the second quality check of imaging interior of the vessel 1004 of the jar 1002 and the third quality check of imaging of the lid 1006 of the jar 1002, the robotic arm (D) will transfer the jar 1002 from the backlight zone (L) to the vacuum module (F) for tissue transfer to the labeled cassette.

Figure 15:
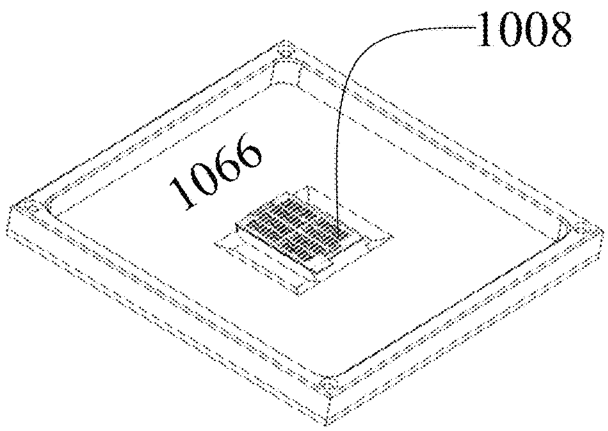
FIG. 15 depicts a perspective view of the vacuum module (F), including a grossing platform and a labeled cassette.

At the vacuum module (F), the system 1000 facilitates accurate automated tissue transfer from the vessel 1004 of the jar 1002 to a labeled cassette 1008 without contamination or loss of tissue sample. FIG. 15 depicts a perspective view of the vacuum module (F), including a grossing platform 1066 and a labeled cassette 1008. In some embodiments, the grossing platform 1066 is made of a consistently colored material to contrast against any missed tissue samples. In this example workflow, a labeled cassette 1008 with an open lid is positioned at the vacuum module (F) after the first quality check of the label.

Figure 16:
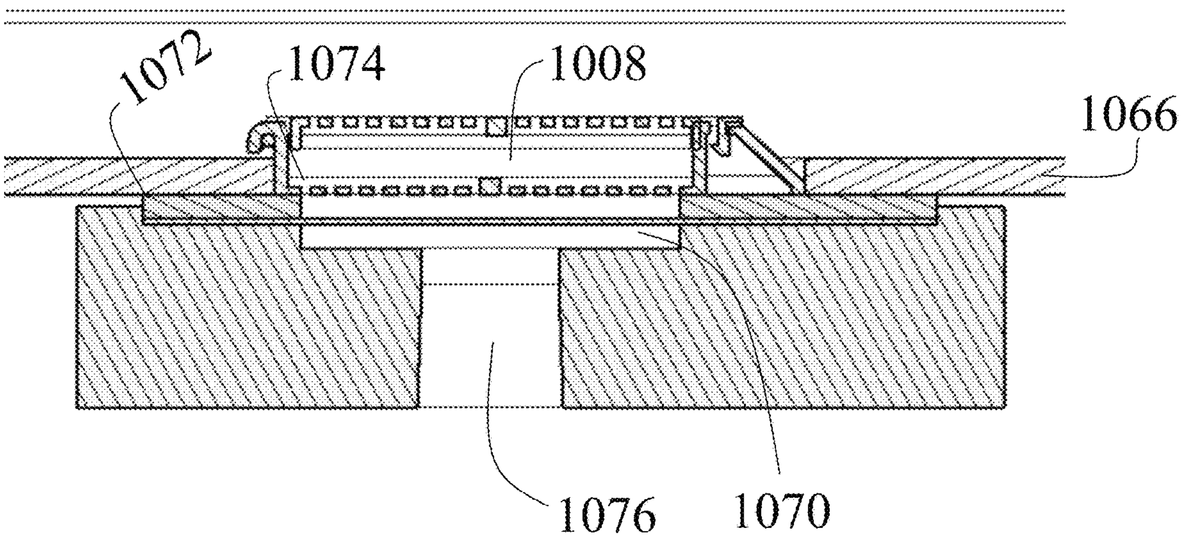
FIG. 16 depicts a cross-section of the grossing platform and vacuum system.

FIG. 16 depicts a cross-section of the grossing platform 1066 and vacuum system 1070. The cassette 1008 rests on a rubber gasket 1072, which creates an airtight seal and directs negative pressure through the perforations of the cassette 1008 to facilitate tissue transfer during the pour. In some embodiments, the vacuum system 1070 is plumbed directly to the grossing platform 1066, where it is activated at the time of the pour to generate significant negative pressure below the cassette 1008. Between the cassette 1008 and the plumbing system, a fine mesh insert is positioned within the cassette retention slot 1074. This insert captures any tissue fragments of clinically relevant size that can escape the cassette perforations in a fail case, preventing tissue loss and ensuring specimen integrity.

In this embodiment, the vacuum system 1070 further includes a threaded base 1076, which allows the vacuum system 1070 to attach below the mesh screen and cassette retention slot 1074, facilitating controlled pressurization and depressurization. In some embodiments, the grossing platform 1066 is removable and the plumbing for the negative pressure system of the vacuum system 1070 is configured with a quick disconnect fitting. This allows the user to quickly and easily remove the platform from the system 1000 for examination. In this instance, the grossing platform 1066 indexes itself so it will be located correctly upon next use.

Figure 17:
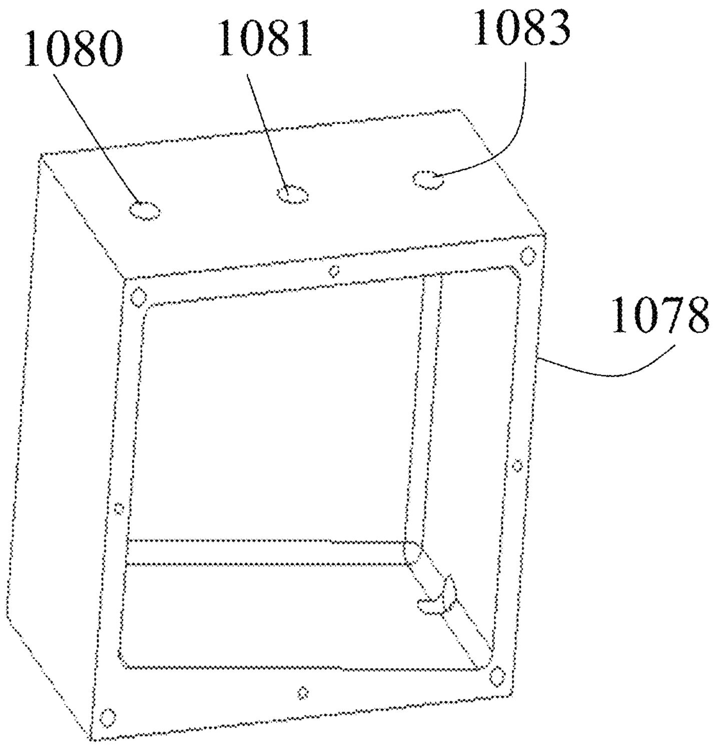
FIG. 17 depicts a view of the vacuum assembly, which integrates with the grossing platform and vacuum system.

FIG. 17 depicts a view of the vacuum assembly 1078, which integrates with the grossing platform 1066 and vacuum system 1070. The embodiment of the vacuum assembly 1078 is illustrated in FIG. 17 includes a vacuum-in port 1080 and a vacuum-out port 1081, which are designed for hose attachment to a laboratory vacuum system. In this example, a pressure sensor 1083 is included to monitor accumulated pressure and ensure consistent operation. The vacuum assembly 1078 is part of the vacuum system 1070 that creates a negative pressure environment underneath the cassette 1008 at the time of the pour, allowing for more efficient evacuation of formalin through the cassette perforations. Additionally, the vacuum assembly 1078 includes a sloped bottom, directing formalin toward a drain to facilitate rapid emptying of the chamber between uses, reducing fluid buildup, and maintaining system cleanliness.

Transferring the tissue sample from the jar 1002 to the cassette 1008 presents a challenge due to the small perforations in the cassette, which restrict fluid flow even with an applied vacuum. Pouring too quickly can cause overflow and potential tissue loss, while pouring too slowly can result in the sample adhering to the interior of the vessel 1004 instead of being transferred with the liquid. Here, the automated sample transfer is accomplished with the robotic arm (D) without the use of intermediary surfaces. For example, the robotic arm (D), using the gripper 1046, securely holds the vessel 1004 portion of the jar 1002, which contains a volume of formalin and a tissue sample. To facilitate an effective transfer of both the liquid and tissue to the waiting cassette 1008, the robotic arm (D) executes a controlled multi-axis pouring motion that balances fluid flow rate and tissue displacement while preventing overflow.

In this embodiment, the pouring process begins with the robotic arm (D) positioning the jar 1002 above the open cassette 1008, which is connected to a negative pressure vacuum assembly 1078 of the vacuum system 1070. The vacuum system 1070 is engaged to assist in the rapid evacuation of formalin through the cassette 1008, compensating for the small perforations that would otherwise impede fluid flow and to compensate for the surface tension of the formalin. The robotic arm (D) then initiates a smooth tilting motion along its pitch axis while simultaneously translating the jar 1002 in a lateral sweeping motion along the X-axis. This movement keeps the fluid stream dynamically aligned with the cassette 1008, ensuring even distribution of the liquid across its surface rather than concentrating flow in one area, which could lead to overflow.

In this example, to prevent the tissue sample from adhering to the interior walls of the vessel 1004, the robotic arm (D) modulates the pouring speed by adjusting both the tilt angle and rotational acceleration of the jar 1002. The arm starts with a slow initial tilt to break surface tension and initiate fluid flow, then smoothly increases the tilt rate while maintaining a constant linear movement over the cassette 1008. This combination of controlled rotation and lateral motion creates a steady, uninterrupted liquid stream, allowing the tissue to flow naturally with the liquid rather than remaining lodged inside the jar 1002.

The vacuum-assisted drainage beneath the cassette 1008 can allow for a faster pour without overwhelming the cassette's perforations, preventing liquid backup and overflow. By synchronizing the robotic arm's movement with the vacuum flow rate, the system ensures that the tissue sample is consistently delivered into the cassette 1008, minimizing the risk of specimen loss or retention in the jar 1002. Once the pour is complete, the robotic arm (D) performs an additional controlled tilt adjustment to allow any remaining liquid to exit while preventing residual tissue from sticking to the vessel 1004 interior.

The example workflow continues with a second washing procedure. Following the initial pour, the system 1000 performs a secondary washdown step at the washdown zone (K). For example, the robotic arm (D), using the gripper 1046, securely holds the vessel 1004 portion of the jar 1002 and moves the jar 1002 to the washdown zone (K). The robotic arm (D), using the gripper 1046, securely holds the vessel 1004 portion of the jar 1002 and tilts it to an angle, of about 55 degrees. The jar 1002 is then positioned in front of a water nozzle, which sprays the interior, washing down the upper half of the jar while allowing the liquid to pool in the lower half.

The washdown process effectively loosens and refloats any tissue that may have remained in the jar 1002 after the initial pour. For example, any tissue material still adhered to the jar 1002 can sometimes be found along the bottom rim on the side that was oriented upward during the pour. The washdown process directs water along this region with sufficient force to dislodge any remaining tissue while maintaining containment within the jar, preventing overflow. Promptly after washdown, the robotic arm (D) moves the jar 1002 back to the grossing platform 1066 and performs a second pour using the same controlled technique as the initial pour. Since the washdown occurred moments prior, it is likely that remaining tissue is suspended in the washdown liquid, preventing it from re-adhering to the vessel 1004 interior. Additionally, because the jar has remained at its 55-degree angle throughout the process, it is unlikely there was an opportunity for the tissue to settle back onto the bottom rim. This secondary pour significantly enhances tissue transfer efficiency, ensuring that remaining tissue fragments are delivered to the cassette 1008 without retention in the jar 1002.

A 55 degree angle is described in this embodiment, however, other angles (e.g., between 30 and 70 degrees) can be used for different jar sizes to achieve effective washdown and tissue transfer. The system 1000 (e.g., computing circuitry of the system 1000) can adjust the tilt angle based on the dimensions and fluid dynamics of various specimen jars, and this disclosure is not limited to a specific angle or jar size.

Continuing with the example workflow, after washdown, the robotic arm (D) returns the jar 1002 to the backlight zone (L) for an inspection of the jar (e.g., a fourth quality check). For example, at the backlight zone (L), the UV-spectrum backlight 365 nm illuminates the bottom of the jar 1002, while a camera positioned above captures high-contrast images of the interior of the vessel 1004 to determine whether the tissue fragments have been successfully transferred. The UV light enhances fluorescence, allowing any residual tissue inside the vessel 1004 of the jar 1002 to be identified. Multiple images can be taken and processed sequentially using software to confirm whether any tissue remains in the jar.

If no residual tissue is detected, the jar 1002 is processed as empty (e.g., by computing circuitry of the system 1000). However, if the system 1000 identifies remaining tissue, the robotic arm (D) moves the jar 1002 back to the decapping module (E), where it hands off the jar to the fixed stationary gripper 1054. For example, the rotary gripper 1052, which has retained the lid 1006 from the earlier de-capping process, re-attaches the lid by aligning it with the jar opening and threading it back onto the vessel 1004 while descending along its axis 1058. Once the lid 1006 is sealed to the vessel 1004, the robotic arm (D) moves the specimen jar 1002 to the exclusion zone (I) for manual inspection. In some examples, a notification is generated on the user interface 1038 (e.g., by computing circuitry of the system 1000), providing information regarding the exclusion event, which is logged for inclusion in the grossing report.

If ajar 1002 is excluded at this stage in the workflow, the corresponding cassette 1008 is also excluded to maintain specimen tracking integrity. For example, the robotic arm (D) retrieves the cassette 1008 from the vacuum module (F) using the end effectors 1048 and moves it to the cassette closing station (M). Similar to the previous cassette lidding process, the cassette 1008 is maneuvered against a static feature that catches the lid, and the robotic arm (D) rotates around this feature to guide the lid into a closed position. The robotic arm (D) then applies controlled upward pressure, engaging the latch to securely snap the lid closed. Instead of moving to the processing rack (H), the closed cassette 1008 is transferred to a cassette exclusion zone (O)

that contains a formalin bath, preserving the excluded sample for further evaluation.

Figure 18:
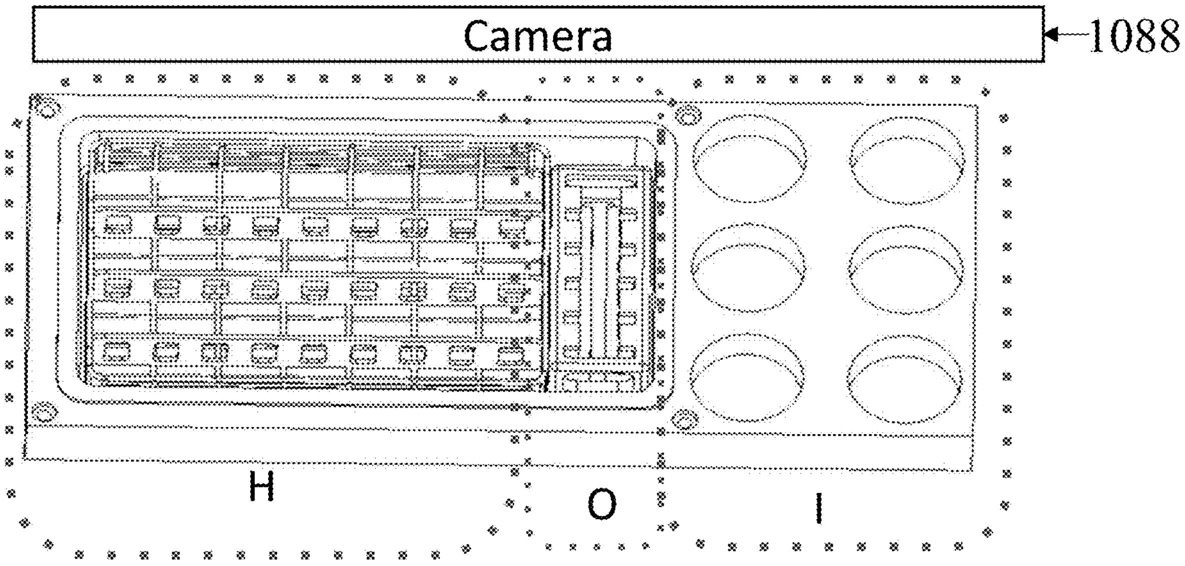
FIG. 18 depicts a detailed view of the processing rack, the cassette exclusion zone, and the exclusion zone used for jars.

FIG. 18 depicts a detailed view of the processing rack (H), the cassette exclusion zone (O), and the exclusion zone (I) used for jars. In this example embodiment, the processing rack (H), the cassette exclusion zone (O) both contain formalin to maintain sample integrity while in the cassettes. FIG. 18 also depicts a camera 1088 positioned above the processing rack (H), the cassette exclusion zone (O), and the exclusion zone (I) used for jars.

Continuing with the workflow, if after washdown and the fourth quality check the jar 1002 is suitably empty as determined by imaging taken at the backlight zone (L) (e.g., by computing circuitry of the system 1000), the robotic arm (D) moves the jar 1002 back to the decapping module (E), where it hands off the jar to the stationary gripper 1054. The rotary gripper 1052, which has retained the lid 1006 from the earlier de-capping process, re-attaches the lid 1006 by aligning it with the jar 1002 opening and threading it back onto the vessel 1004 while descending along its axis 1058. In some embodiments, a notification is generated (e.g., by computing circuitry of the system 1000) on the HMI (B) and/or the user interface 1038, providing information regarding the jar 1002 passing the fourth quality check.

Upon the jar 1002 passing the fourth quality check, the robotic arm (D) retrieves the cassette 1008 from the vacuum module (F) using the end effectors 1048 and moves it to the cassette closing station (M). Similar to the previous cassette lidding process, the cassette 1008 is maneuvered against a static feature that catches the lid, and the robotic arm (D) rotates around this feature to guide the lid into a closed position. The robotic arm (D) then applies controlled upward pressure, engaging the latch to securely snap the lid closed.

Once the cassette 1008 is closed, the robotic arm (D) using the end effectors 1048 pivots to orient the cassette vertically with the printed surface facing upward and moves it into an open slot on the processing rack (H). In some embodiments, after placing the cassette 1008 in the processing rack (H), the system 1000 captures an overhead image using the camera 1088 of the processing rack (H) rack to verify the correct placement. In some embodiments, if the system 1000 (e.g., by computing circuitry of the system 1000) detects an error in cassette positioning, a message can be displayed on the HMI (B) and/or a user interface 1038, alerting users to the issue. Depending on system 1000 constraints, the system 1000 will either continue placing subsequent cassettes in alternate slots within the processing rack (H) or, if no available slots remain, pause operations to allow manual user intervention. In this case, the system 1000 can generate an alert to the HMI (B) and/or to a user.

Figure 19:
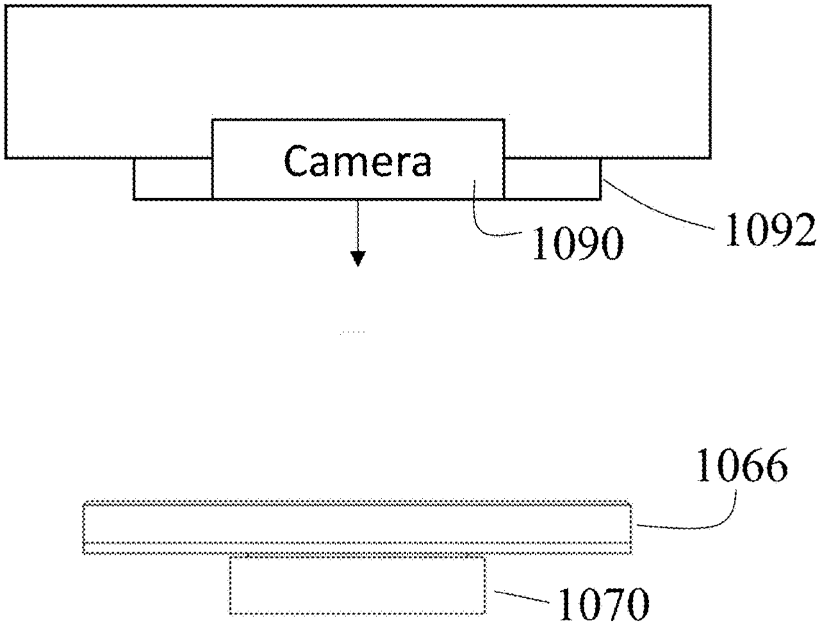
FIG. 19 depicts a side view of the grossing platform, the vacuum system, light, and a camera positioned above the grossing platform for post-transfer inspection.

The example workflow can proceed with a fifth quality check to confirm that tissue has not escaped the cassette 1008 and remained on the grossing platform 1066. FIG. 19 depicts a side view of the grossing platform 1066, the vacuum system 1070, light 1092, and a camera 1090 positioned above the grossing platform 1066 for post-transfer inspection.

To verify that all tissue material has been successfully transferred and contained within the cassette 1008, the system 1000 captures an image of the grossing platform 1066 of the vacuum module (F) using a UV-spectrum backlight (365 nm). For example, the UV illumination enhances the contrast of any residual tissue, allowing for accurate detection. The captured image encompasses the vacuum module (F) and the fine mesh insert positioned beneath the cassette 1008 within the cassette retention slot 1074. This slot served as a secondary containment measure, preventing any tissue fragments of clinically relevant size from entering the vacuum system.

The image is processed using a computer vision algorithm (e.g., by computing circuitry of the system 1000), similar to those used in prior quality checks, to identify any remaining tissue. If residual tissue is detected outside cassette 1008, the system 1000 (e.g., by computing circuitry of the system 1000) generates a notification on the user interface 1038 of HMI (B), alerting users to the containment failure. Based on system 1000 parameters, the system 1000 can either prompt the user for manual inspection or proceed with automated corrective actions, such as re-washing or re-pouring the specimen to ensure complete transfer. For example, the system 1000 (e.g., by computing circuitry of the system 1000) can send a message to a user interface, a mobile device, or the screen of the HMI (B). In this case, the system 1000 will not process any additional samples until the grossing platform has been manually inspected and the suspected tissue removed.

Continuing with the workflow, the empty and recapped jar 1002 can be picked from the decapping module (E) using the robotic arm (D) and dropped through a chute (N) to a storage container. In some embodiments, jars are stored for a period of time (e.g., 30 days) in the event personnel would like to review the containers or confirm information. For example, the jars are retained in case samples are lost, mislabeled, or an investigation into tissue degradation is ordered.

Figure 20:
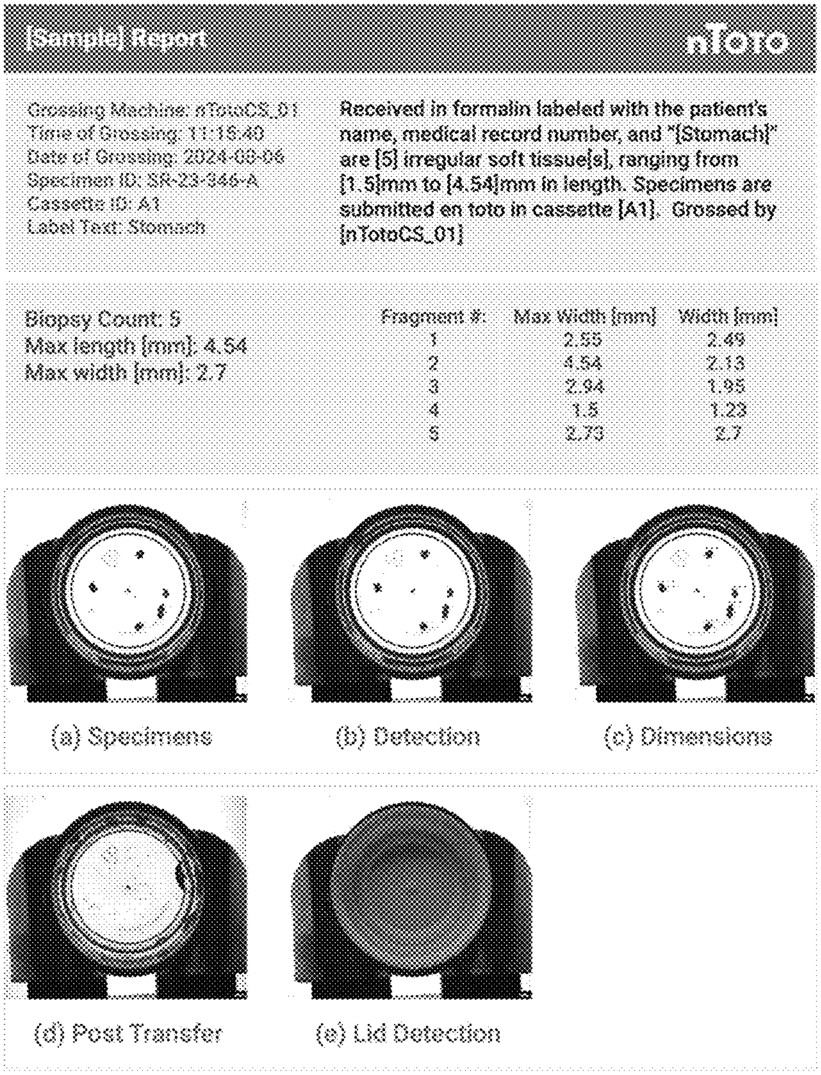
FIG. 20 illustrates an example gross report generated at the conclusion of the specimen processing workflow.

FIG. 20 illustrates an example gross report generated at the conclusion of the specimen processing workflow. For example, the system 1000 (e.g., by computing circuitry of the system 1000) can produce a gross report that incorporates structured data, images, and automated tissue analysis metrics. The gross report includes a generated text summary detailing the received specimen, including the number of biopsies, their dimensions, and the associated cassette information. In some embodiments, a table outlines the count and size of each individual tissue fragment that was present in the jar 1002, providing precise documentation of the sample contents.

In some embodiments, the gross report includes the high-resolution images taken throughout the workflow, offering a visual record of the sample handling. In some embodiments, these images can include pre-transfer tissue detection, automated measurement verification, post-transfer inspection, and lid closure confirmation. In some embodiments, the grossing report also highlights any exclusions such as residual tissue in the jar. In some embodiments, the gross report can be electronically transferred to a LIS, allowing seamless integration into the pathology workflow. In some embodiments, patient data is retained for a designated period before deletion for privacy compliance, with optional integration into existing hospital information systems for enhanced accessibility and traceability.

Figure 21:
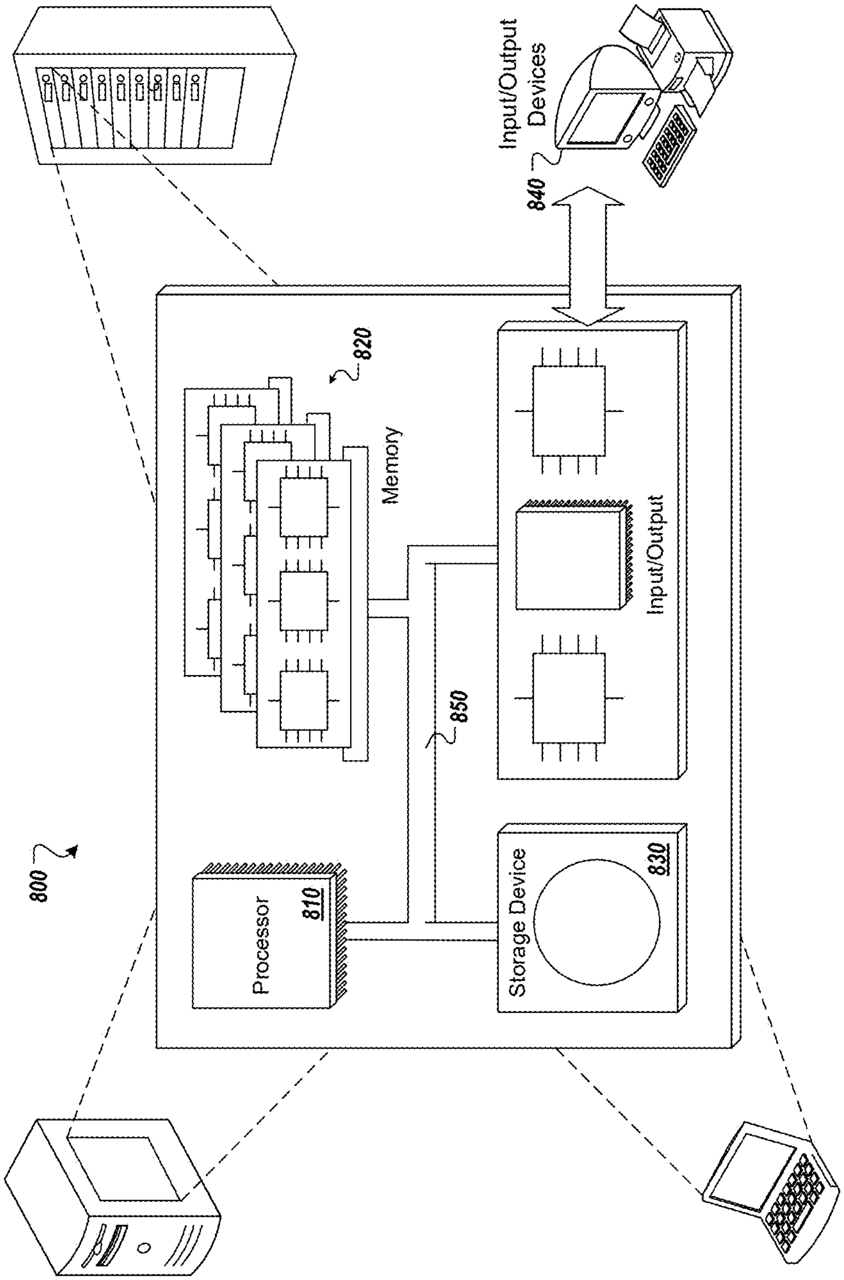
FIG. 21 depicts a schematic diagram of an example computing system 800 to execute the implementations of the present disclosure.

FIG. 21 depicts a schematic diagram of an example computing system 800 to execute the implementations of the present disclosure. For example, the system 800 is an example computing system (e.g., computing circuitry of the system 1000) that can execute systems, methods, and processes for automated tissue grossing as described in connection with FIGS. 1-20 and 22-53. As such, the system 800 can be used to perform the operations described with regard to one or more implementations of the present disclosure. For example, the system 800 can be included in any or all of the computer system(s), or other computing device(s), and all subsystems A-O as discussed herein. For example, system 800 can represent any of the subsystems and the HMI as disclosed herein.

The system 800 can include one or more processors 810, one or more memories 820, one or more storage devices 830, and one or more input/output (I/O) devices 840. The components 810, 820, 830, 840 can be interconnected using a system bus 850.

The processor 810 can be configured to execute instructions within the system 800. The processor 810 can include a single-threaded processor or a multi-threaded processor. The processor 810 can be configured to execute or otherwise process instructions stored in one or both of the memory 820 or the storage device 830. Execution of the instruction(s) can cause graphical information to be displayed or otherwise presented via a user interface on the I/O device 840.

The memory 820 can store information within the system 800. In some implementations, the memory 820 is a computer-readable medium. In some implementations, the memory 820 can include one or more volatile memory units. In some implementations, the memory 820 can include one or more non-volatile memory units.

The storage device 830 can be configured to provide mass storage for the system 800. In some implementations, the storage device 830 is a computer-readable medium. The storage device 830 can include a floppy disk device, a hard disk device, an optical disk device, a tape device, or other type of storage device. The I/O device 840 can provide I/O operations for the system 800. In some implementations, the I/O device 840 can include a keyboard, a pointing device, or other devices for data input. In some implementations, the I/O device 840 can include output devices such as a display unit for displaying graphical user interfaces or other types of user interfaces.

Figure 22:
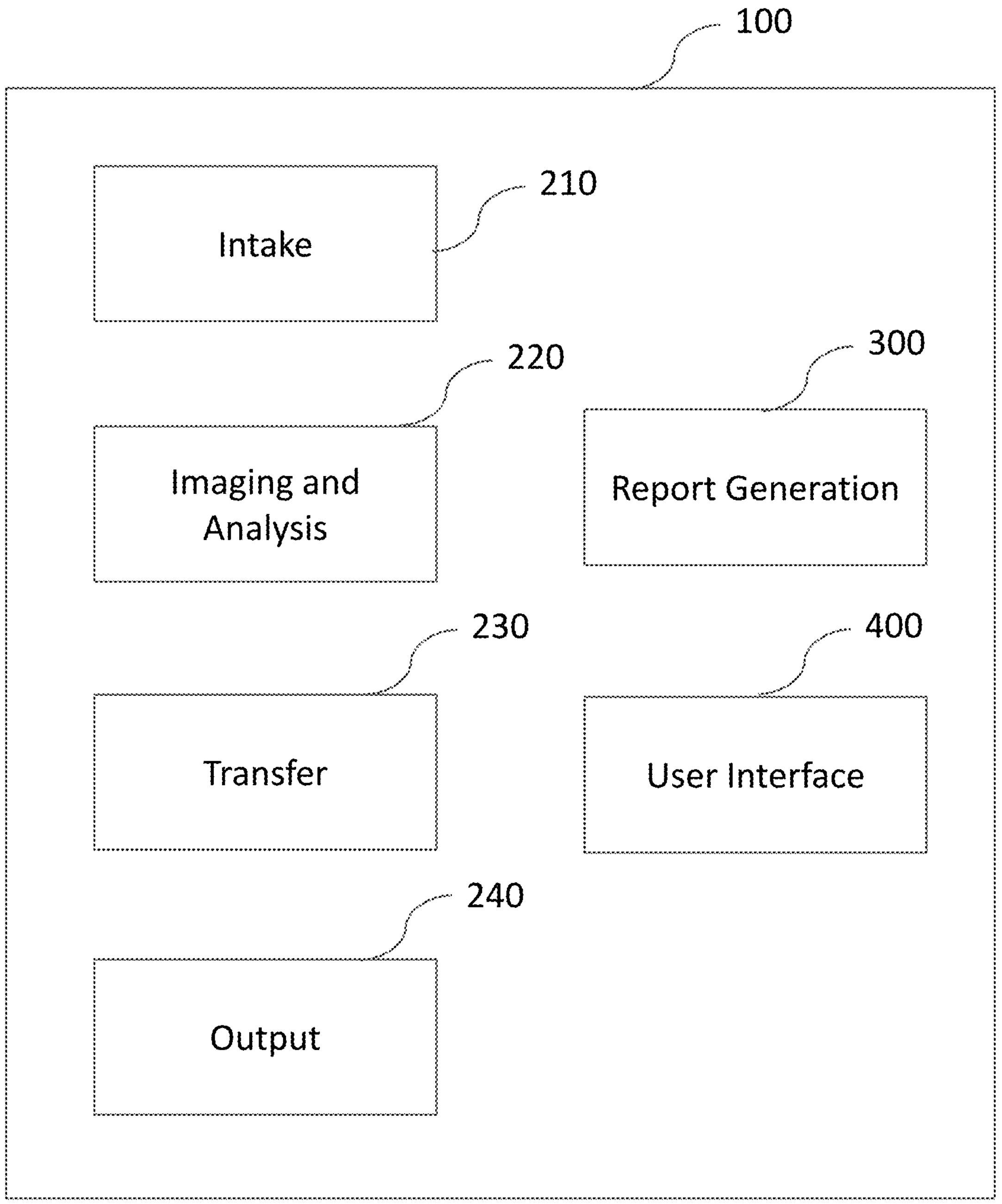
FIG. 22 illustrates a schematic of an alternative embodiments of the automated grossing system and example subsystems.

FIG. 22 illustrates a schematic of an example system 100 and example subsystems. The system 100 and subsystems depicted in FIG. 22 are analogous to the system 1000 and subsystems A-O including their components and processes discussed in connection with FIGS. 1-21. The system 100 includes hardware and software components and is capable of handling sample containers automatically to perform some or all of the steps involved in grossing. The system is capable of handling at least one type of tissue samples. In one embodiment, the system automatically prepares small gastrointestinal (GI) biopsies, replacing some or all of the manual steps involved in the grossing performed in an anatomical pathology workflow. Furthermore, the system 100 is capable of performing the necessary checks, based on one or more pre-defined or input criteria, and excluding samples that do not meet the criteria. Finally, the system is capable of automatically determining the appropriate next step or destination of each sample, and placing output samples in the correct area for collection by laboratory personnel or automatic transfer to the next stage in the workflow in the anatomical pathology laboratory.

The system is designed to automatically handle one or more samples, placed in an input area of the system. Such samples consist of one or more biological tissue biopsies in fluid in a closed labeled container such as labeled bottle (e.g., the specimen jar 1002). These biopsies can be of different types, shapes, forms and sizes. The samples can be grouped in batches for ease of loading and unloading by laboratory personnel. Each batch can be placed in its own tray. Multiple trays can be placed in the input area while physical capacity permits.

The system 100 is designed to store output samples (e.g., cassette 1008) in a dedicated output area (e.g., processing rack (H)) containing one or more target containers such as buckets or racks. Samples can be grouped based on information read from their labels (e.g. an identifier or the next destination for the sample), information extracted by the system during image analysis regarding their characteristics (e.g. count, size), information pre-defined or input to the system (e.g. a mapping between an identifier and the next destination for the sample), or any combination of these.

The system 100 can be equipped with additional sensors to ensure the safety of its operation and the personnel operating it. For instance, it can be equipped with a sensor to read the levels of formalin in the machine, and/or its surroundings and alert when those levels exceed the safety limits.

The system 100 is capable of executing an end-to-end automation process designed to replicate or elevate the process currently used to manually perform the grossing of tissue samples in anatomical pathology laboratories. Such manual processes are variable, error prone, time consuming, inefficient, are not digitized, may not offer sufficient data regarding the samples processed or the processes followed during their processing, may not be reproducible or traceable, and may not offer the best quality oversight. By using robotics, computer vision, other sensing technologies, combined with automation software, including but not limited to motion control, image processing, and traditional algorithms as well as Artificial Intelligence (AI) models, the system offers an efficient, reproducible, and traceable method to automatically process tissue samples while collecting new additional data pertaining to the samples, their processing, and the process followed during this processing. Such efficiencies and process improvements can result in an improvement in laboratory operations, in streamlining case processing, and reducing turnaround times (TAT) for patients. Testing conducted in an anatomical pathology laboratory setting shows that such a system reduces variability through its automated imaging and analysis based characterization of tissue biopsies, when compared to manual characterization performed by qualified observers.

Furthermore, the system 100 can be operated with minimal or no manual interaction. It can be designed to operate continuously without interruption or downtime. This is achieved by putting in place the necessary redundancy mechanisms to ensure that the system is always in operation at full or reduced capacity.

Best mode: In one embodiment, the system 100 comprises hardware such as robotic grippers (e.g., robotic arm (D), grippers 1046, and end effectors 1048), conveyors, funnels, and sensors, as well as software to control the hardware and orchestrate its operation to perform one or more steps involved in the grossing of tissue samples in an anatomical pathology laboratory. Samples inputted into the system are typically composed of a container such as a closed bottle filled with contents such as tissue biopsies and fluid. During processing, the system transfers the contents of the input samples, and more specifically the biopsies into output containers such as cassettes, ready for further processing; Fluid is automatically drained into a waste reservoir.

Input and output containers are labeled following standard pathology laboratory procedures, and allow associating each with a specific medical case and a specific patient. Furthermore, they allow associating a given input container with its corresponding output container.

Based on the information extracted from the label on the input or output container, information extracted or generated during the processing of the sample, information pre-defined or input into the system, or a combination of these, the system 100 can automatically determine the appropriate next step or destination in the workflow after grossing and the appropriate target rack. In this case, the system 100 will place the output sample in the correct target rack. In an exemplary embodiment, the system 100 contains two racks in the output area, one rack for output samples that require a shorter processing time (e.g. 90 minutes), and another rack for output samples that require a longer processing time (e.g. 275 minutes).

The system 100 can generate a gross report (e.g., the gross report of FIG. 20) using the data collected during sample processing, including data extracted from the labels on the input and output containers, as well as the data resulting from the image analysis of tissue biopsies contained in the input container (e.g. their count, size, and dimensions). This report can then be accessed by authorized laboratory personnel.

As shown in FIG. 22, the exemplary system 100 comprises an intake system 210 (e.g., intake system (A)), an imaging and analysis system 220 (e.g., label verification, backlight zone (L), computing infrastructure, and FIG. 21), a transfer system 230 (e.g., robotic arm (D), decapping module (E)), an output system 240 (e.g., processing rack (H), output chute (N)), a report generation software 300 (e.g., computing infrastructure, and FIG. 21), and a user interface 400 (e.g., HMI (B)).

The intake system 210 can be analogous to the intake system (A). For example, in FIG. 22 intake system 210 is designed to store one or more samples (e.g., specimen jars 1002) grouped in batches. Once processed, a sample is transferred to the next component in the system for further processing. Although the intake system (A) is described in connection with FIGS. 1-21 as comprising a rotary assembly 1026, other configurations are possible. In one embodiment, the intake system has a dedicated area to receive a single sample for example such as a slot or a drawer, easily accessible by the user. This area can be open or closed with a door. It can be fixed or mobile, e.g. a drawer that can slide outwards, to permit placing the sample more easily.

In another embodiment, the intake system has a dedicated area to receive a plurality of samples for example such as a slot or a drawer, easily accessible by the user. This area can be open or closed with a door. It can be fixed or mobile, e.g. a drawer that can slide outwards, to permit placing the sample more easily.

In another embodiment, the samples are grouped in batches for ease of loading and unloading by laboratory personnel. Each batch can be placed in its own tray (e.g., pallet 1009). Multiple trays can be placed in the input area while physical capacity permits.

In another embodiment, the system 100 optionally contains a dedicated area to store samples excluded from the grossing process (e.g., exclusion zone (I) and/or cassette exclusion zone (O)). In this case, a processed sample (e.g., a specimen jar 1002) is either transferred to the next component in the system for further processing if it meets the criteria or placed in their original position or in an exclusion zone such as a dedicated tray.

The imaging and analysis system 220 can be analogous to the imaging and analysis performed in the quality checks described in connection with FIGS. 1-21 above. For example, FIG. 22, comprises at least one or more sensors, such as a camera or an RFID reader, and is capable of performing some or all of the following operations: a) Sensing a marker, beacon or indicator of any kind to include barcodes and/or RFID tags of the input and output containers. b) Validating some or all of the information read from the input and output containers in (a) above. c) Reading labels containing text or other information of the input and output containers, and using techniques and algorithms such as Optical Character Recognition (OCR) to extract some or all of the information read from the labels. Such information can include unique identifiers, patient identifiers, date when the sample was collected, or other relevant information. d) Validating some or all of the information read from the input and output containers in (c) above. e) Checking that the input and output containers match based on some or all of the information collected in (a) or (c) above. f) Imaging the cap of the input container to detect biopsies attached to the cap. g) Running image processing techniques as well as object detection and segmentation models on one or more images produced in (f) above. h) Imaging the contents of input containers, which consist of biopsies in fluid, to detect and characterize the contents, for instance the count and dimensions of any contained biopsies. i) Running image processing techniques as well as object detection and segmentation models on one or more images produced in (h) above. Such models can or may not include an Artificial Intelligence (AI) component, and can leverage publicly available foundational Artificial Intelligence (AI) models. j) Imaging the contents of output containers which contain any biopsies transferred from their corresponding input containers. k) The system can also enrich some or all of the images taken during this process by adding metadata or tags extracted from the data resulting from label reading or image analysis done in the steps above. l) Validating the output containers, e.g. checking that the output containers are closed as expected. m) Imaging the emptied body of the input container to detect any biopsies left.

The data collected regarding the samples including data extracted from the labels on the input and output containers, as well as the data collected from the image analysis of the biopsies contained in the input container, including their count, size, and dimensions (e.g. length, width, diameter), can be used to generate a gross report. The latter can then be accessed by authorized laboratory personnel. The images and any other data collected during the above operations can be: a) Displayed raw or in a processed format on the User Interface 300. b) Stored locally. The system provides the necessary interfaces, such as shared drives or Application Programming Interfaces (APIs), to enable the sharing and access of this data by information systems in the laboratory where the system is deployed. c) Transferred to other local or remote systems such as a database, storage system, or another software system such as a Laboratory Information System (LIS).

The imaging and analysis system 220 can support the exclusion of samples that do not meet certain criteria. The criteria can be pre-defined in default settings and configuration of the system or input by the user through the User Interface 300 before the start of sample processing. An input sample can be excluded based on any of the following criteria: a) Invalid information collected from the input container or the corresponding output container. b) A mismatch between the input container and the corresponding output container. c) A missing input container or the corresponding output container. d) Presence of biopsies in an unexpected area, for example anywhere outside the body or on the cap of the input container, inside the emptied body of the input container, or outside the output container.

In one embodiment, the system automatically excludes any samples that do not meet the following criteria: Count: the sample must contain at least one biopsy and at most 10 biopsies. Size: all biopsies in the sample must have a size between 1 mm and 10 mm.

The transfer system 230 can in some respects be analogous to the robotic arm (D) and the decapping module (E)

described in connection with FIGS. 1-21. The transfer system 230 in FIG. 22, can be designed to automatically transfer any biopsies contained in fluid in an input container, such as a bottle (e.g., specimen jar 1002), to the corresponding output container, such as a cassette. Using a robotic rotary gripper (e.g., rotary gripper 1052), the cap (e.g., lid 1006) of the input container is removed to allow for the imaging of the cap and contents inside the body (e.g., the vessel 1004) of the input container. If the sample is validated successfully and isn't excluded based on criteria, the transfer system 230 proceeds with transferring the contents from the input container to the corresponding output container (e.g., cassette 1008). A second robotic rotary gripper (e.g., gripper 1046 of the robotic arm (D)) holding the open input container tilts the container to pour its contents, including any fluid and any biopsies, into an intermediary device such as a funnel, filter or a mesh, to avoid contents escape and to separate the biopsies from the fluid. The intermediary device is designed such that the biopsies are placed in the output container and the fluid drained in a dedicated waste reservoir or bucket. The imaging and analysis system 220 can take additional images of the inside of the emptied input container to detect remaining biopsies. If there are biopsies left, the transfer system 230 can refill the body of the input container with additional fluids and proceed with another transfer (e.g., wash down zone (K)). This can be repeated until all the biopsies are transferred successfully, or a pre-defined or configurable maximum number of retries is reached. Finally, the transfer system closes 230 the output container and places it in the output system.

The fluid waste reservoir can be connected to an external system to drain or recycle the collected fluid automatically. Alternatively, laboratory personnel can be required to empty it periodically. A sensor can be placed to detect the level of fluid in the container. A physical indicator such an LED or similar, can be placed on the system to indicate when the fluid waste reservoir must be emptied. The operation of the system is paused when the container is near full. Furthermore, a system warning can be displayed on the user interface 400 in FIG. 2 to prompt the user to empty the container.

The output system 240 in FIG. 22, is designed to store the output containers such as cassettes containing the biopsies. These output containers can be placed into one or more target containers such as buckets or racks (e.g., processing rack (H)), or grouped in batches in separate trays. The trays can be placed in racks for collection by laboratory personnel. The target containers such as buckets or racks, can be labeled to indicate which group of samples it receives.

In one embodiment, the output system 240 contains one rack that receives all output samples. In a second embodiment, the output system 240 contains a plurality of racks to receive all output samples. In a third embodiment, the output system 240 contains at least two racks intended to receive different groups of samples depending on information extracted from the labels of the samples (e.g. an identifier or the next destination for the sample), information resulting from the image analysis of the samples performed by the system (e.g. sample characteristics such as count, size, or other), information pre-defined or input to the system (e.g. a mapping between an identifier and the next destination for the sample), or any combination of these. The racks can be labeled to indicate the type of processing required next and/or the next destination for the output samples they contain.

In one embodiment, the output system contains two racks. A first rack for output samples requiring a shorter processing time (e.g. 90 minutes), and a second rack for output samples requiring a longer processing time (e.g. 275 minutes). In one embodiment, the processing time refers to the time the output samples are soaked in formalin or another fixative post grossing in an anatomical pathology laboratory setting.

The report generation system 300 in FIG. 22, collects some or all of the data generated by the system to generate a digital report (e.g., gross report of FIG. 20) that can be: a) Displayed in raw or processed format on the User Interface 300. b) Stored locally. c) Transferred to other local or remote systems such as a database, storage system, or another software system such as a Laboratory Information System (LIS). The report can be used for traceability or access by laboratory personnel or other authorized parties.

The user interface 400 in FIG. 22, displays information about the system and provides input methods to allow laboratory personnel to configure the system, maintain it, and/or control some or all of its operation. The user interface 400 can be analogous to the HMI (B) described in connection with FIGS. 1-21. Displayed information can include: a) Images and other raw or processed data generated by the system. b) Status of the system and its subsystems. c) Status of the samples being processed. d) Run in progress, history of previous runs, time estimate to complete one or more future runs. e) Metrics and aggregate data regarding the samples processed. f) Configuration and setting parameters of the system. Such information can be displayed or organized in various formats and layouts. Some of this information, input methods, and control buttons can be grouped together or split in various layouts and configurations.

Figure 23:
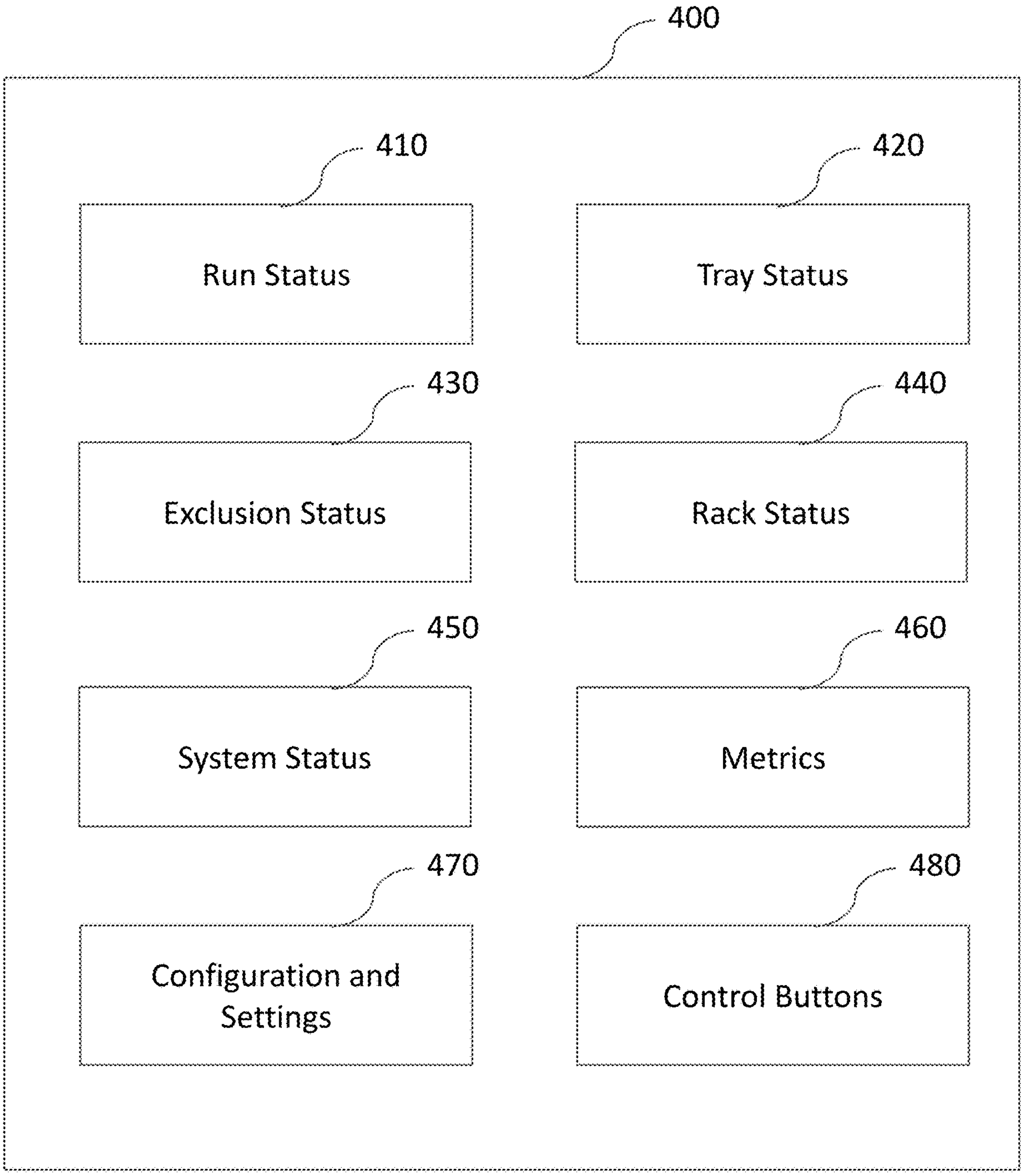
FIG. 23 shows an exemplary alternative embodiment of the user interface.

FIG. 23 shows an exemplary embodiment of the user interface 400 comprising, but not limited to, a run status 410, a tray status 420, an exclusion status 430, a rack status 440, a system status 450, metrics 460, configurations and setting 470, and control buttons 480. The user interface 400 is analogous to the HMI (B) described in connection with FIGS. 1-21.

The run status 410 in FIG. 23, includes information about the run, the progress of the run, the state of the run (e.g. in progress, paused, completed), a completion status (e.g. success, warning, or failure), the date and time of the start and completion of the run. In one embodiment, the system can also display images of the input sample and output sample being processed. Such images can be displayed one at a time or simultaneously and can include the following: a) Images of the input sample in the tray. b) Images of labels on the input or output containers. c) Images of the cap of the input sample. d) Images of the contents of the input sample. e) Images of the biopsies once transferred from the input container to the output container and while the output container is open.

The tray status 420 in FIG. 23, includes information about the trays present in the intake system and that are being processed, including the samples that have been processed, the samples being processed, and the samples to be processed. The tray status can display a digital mapping of the physical trays indicating the layout and position of the trays as well as the layout and position of the samples in each tray. Furthermore, it can provide an indication in text, color or both, of the presence of a tray or sample in the intake system. It can provide an indication in text, color or both, of the status of the processing for each tray and for each sample. In an exemplary embodiment of the system, green is used to indicate the presence of the sample in its expected position in the tray, white to indicate its position is empty, and red to indicate that a failure was encountered during the processing of the sample. In another embodiment, standard or common color coding is used to indicate the status of the processing of the trays and samples, a digital tray or sample is colored green to indicate successful processing, and red to indicate failure to process a tray or sample.

The exclusion status 430 in FIG. 23, includes information about any sample exclusions that occur during the processing of the trays during the run in progress. The rack status 440 in FIG. 23, displays information about the racks present in the output system, including the output samples they contain. The rack status can display a digital mapping of the physical racks indicating the layout and position of the racks as well as the layout and position of the output samples in each rack.

Furthermore, it can provide an indication, in text or color or both, of the status of each rack and each output sample. In one embodiment, standard or common color coding is used to indicate the status of the racks and output samples, a digital rack or output sample is colored green to indicate successful processing (e.g. all output samples are present in the rack at the end of tray processing or run), and red to indicate failure to complete the processing for a rack or output sample (e.g. some or all output samples are missing in the rack at the end of tray processing or run).

In another embodiment, the user interface 400 also displays the type of each rack based on the type of processing required next or the next destination for the output samples they contain. This is applicable for instance in the case where the system contains two racks, a first rack for samples requiring a shorter processing time (e.g. 90 minutes), and a second rack for output samples that require a longer processing time (e.g. 275 minutes).

The system status 450 in FIG. 23, displays information about the health of the system and its subsystems. In one embodiment, the system status is text or other indicator such as a user interface element (e.g. check mark) that can be color coded, that indicates when the system is operating as expected, when it signals warnings (e.g. maintenance or calibration needed), and errors or failures (e.g. failure to connect to a subsystem).

The metrics 460 in FIG. 23, display information regarding the trays, racks, input samples, and output samples processed using the system over a given period of time or since the start of the operation of the system. Additionally, the metrics can include statistics such as the number of samples processed successfully, excluded, or failed to process, as well the number of biopsies detected and their dimensions. They can also contain the history of previous runs, such as number of runs completed, their duration, as well as success and failure rates.

The configurations and settings 470 in FIG. 23, display information regarding any configuration or settings of the system, including means to input or change these. Such configuration and setting can include exclusion criteria (e.g. acceptable count and size range biopsies contained in a sample), run configuration (e.g. number or specification of trays to process) or scheduling (e.g. start date and time of the next run), calibration settings or schedule.

The control buttons 480 in FIG. 23, allow laboratory personnel to control some or all of the operation of the system, as well as its maintenance or calibration. These can include a go button start, pause, resume, and stop a run, a reset/calibration/maintenance button to reset/calibrate/maintain the system, and a change configuration and setting button to update the configuration and settings of the system.

Figure 24:
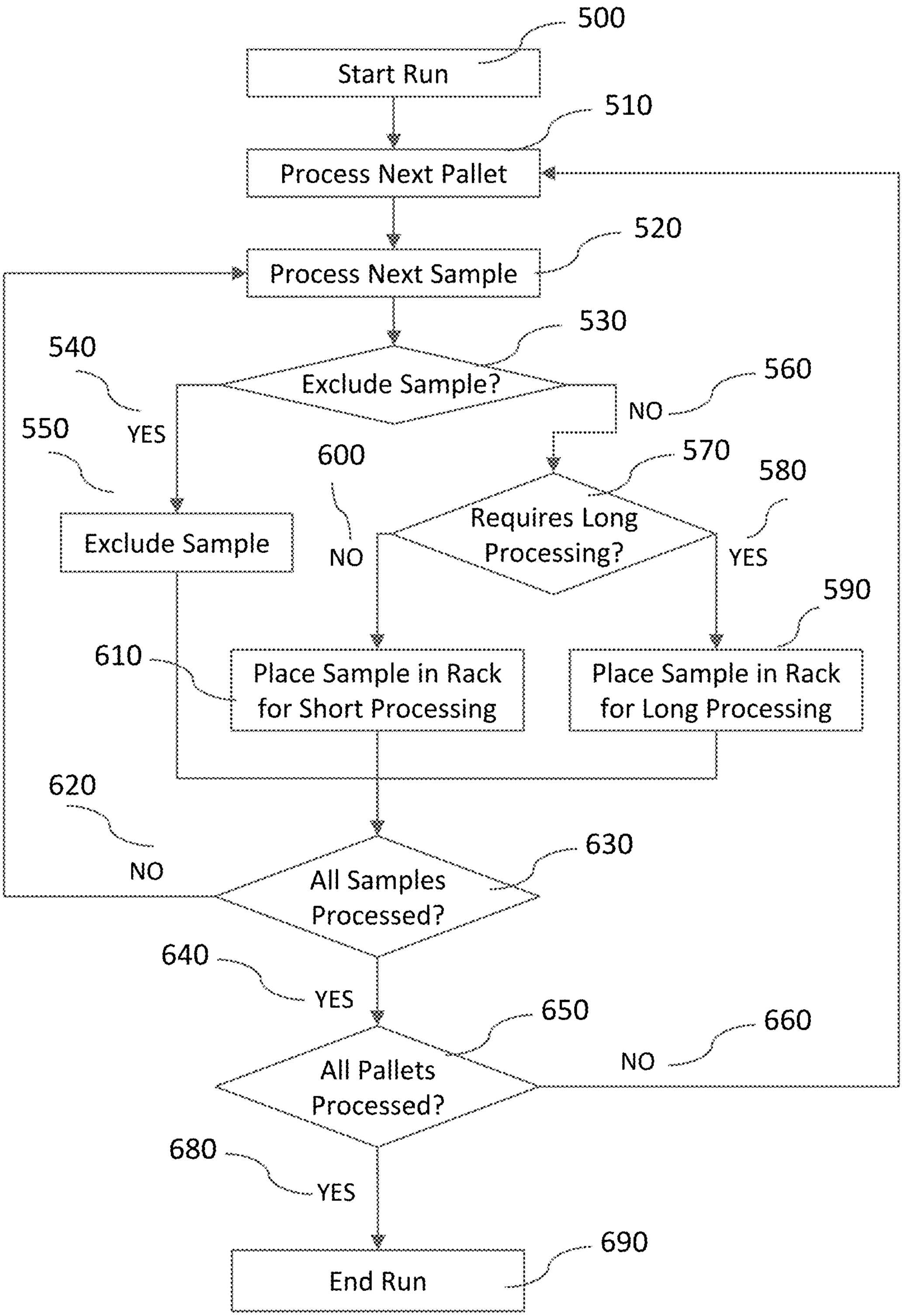
FIG. 24 shows a flow diagram of an example method for automated grossing of tissue sample

An example method for automated grossing of tissue samples in an anatomical pathology laboratory is shown in FIG. 24. In some embodiments, the method described by FIG. 24 is analogous to the workflow described in connection with FIGS. 1-21. The method of FIG. 24 outlines an exemplary automated end-to-end process the system is capable of executing in order to perform the grossing of one or more samples, loaded by laboratory personnel in batches of one or more samples. In an exemplary embodiment, the system is capable of handling up to 40 samples, with up to 10 samples placed in each of 4 trays loaded to the designated areas inside the intake system.

When the system 100 receives instruction to start a run 500 as shown in FIG. 24, it proceeds with the processing of the next available tray if any as per 510. It then processes the next available sample in the tray if any as per 520. It then checks if the sample is to be excluded in 530. If yes 540, it excludes the sample by placing the input and output containers in the exclusion zone. It then checks if all samples are processed 630. If no 560, it checks if the sample requires a long processing time 570. If yes 580, it places the output sample in the rack designated for long processing time and checks if all samples are processed 630. If no 600, it places the output sample in the rack designated for short processing time and checks if all samples are processed 630. If no 620, it continues with the processing of the next sample 520. If yes 640, it checks if all trays are processed 650. If no 660, it continues with the processing of the next tray 510. If yes 680, it ends the run 690.

Figure 25:
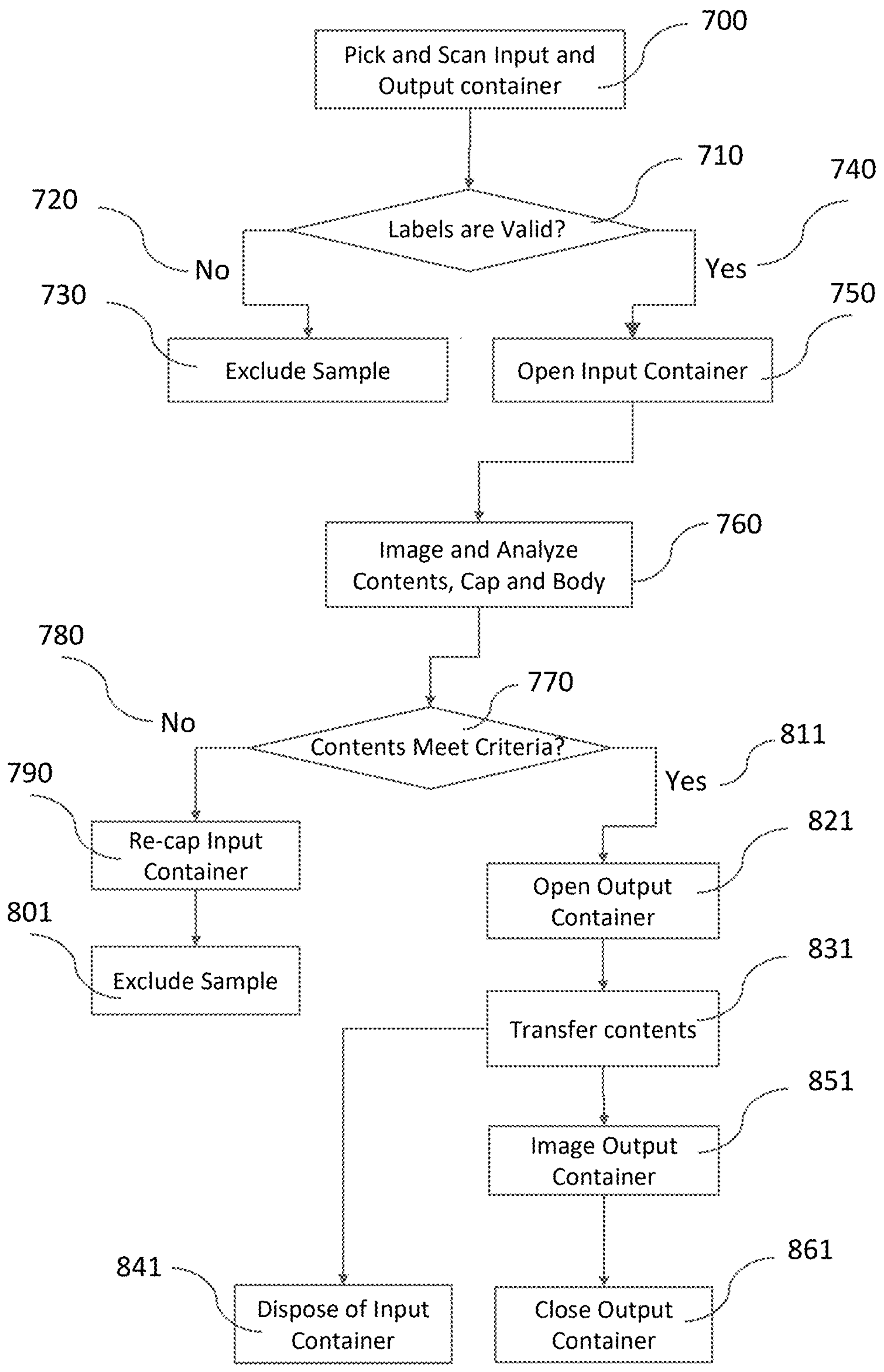
FIG. 25 shows another flow diagram example method for automated grossing of tissue sample.

FIG. 25 details the steps involved in the processing of a given sample, as per step 520 "Process Next Sample" in FIG. 24, are detailed in FIG. 25. In some embodiments, the method described by FIG. 25 is analogous to the workflow described in connection with FIGS. 1-21.

At the start of a run, the system performs step 700 and proceeds to pick the input container and its corresponding output container, and scans their labels. The system uses at least one robotic gripper and at least one camera to perform this step. However, it can also leverage additional grippers and cameras to parallelize this step 700.

The system then checks if the labels are valid 710 (e.g., the first quality check described in connection with FIGS. 1-21). The labels of the input and output containers must be valid and consistent with standards adopted by anatomical pathology laboratories for labeling samples. Additionally, the labels of the input and output containers must match based on the case identified extracted from their respective labels. If the labels are not valid 720, the sample is excluded 730. The system places the input and output containers in the exclusion zone. This can be done using one or more robotic grippers. If the labels are valid 740, the system proceeds to open the input container 750 (e.g., the decapping module (E)). It then images and analyzes the contents (e.g., backlight zone (L)), cap and body parts 760. This is done by the imaging and analysis system 220 in FIG. 22. First the cap is checked to ensure no biopsies are stuck on the cap (e.g., quality checks 2 and 3 described in connection with FIGS. 1-21). If there are stuck biopsies, the system puts back the cap on the body and closes the containers. If there are no stuck biopsies on the cap, the system images the contents of the container, that is any biopsies in fluid. It analyzes the images to determine the count and characteristics of any biopsies found including their size and dimensions.

The system then checks if the contents meet the criteria 770. If the contents do not meet the criteria 780, that is any exclusion criteria specified, it puts back the cap on the input container 790 and closes it using one or more robotic grippers. It then excludes the sample 801 by placing the input and output containers in the exclusion zone (e.g., cassette exclusion zone (O) and exclusion zone (I)). If the contents meet the criteria 811, the system opens the output container 821 using one or more robotic grippers. It then transfers the contents 831 inside the body of the input container to the output container. The tissue biopsies remain in the output container, fluids are disposed of during the transfer into a dedicated waste reservoir. It then disposes of the input container 841 including the cap and body, images the output container 851, and closes the output container 861.

Although intake system (A) is described as including a rotary assembly 1026 comprising one or more pallets 1009 that can be stacked in a vertical configuration, other embodiments are possible for intake system (A). For example, FIGS. 26-35 depict an example tray configuration for an intake system for specimen jars and cassettes.

Figure 26:
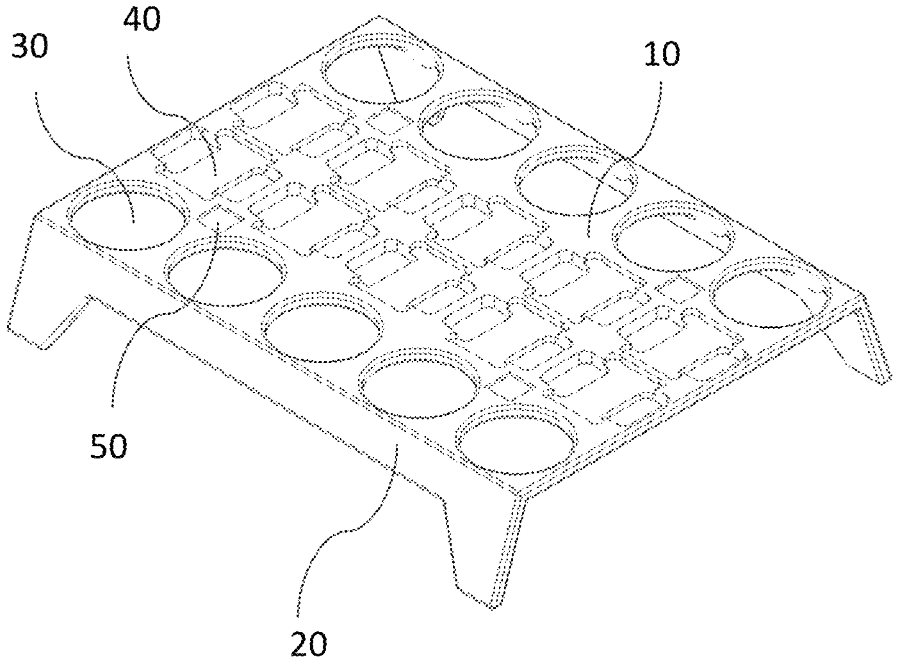
FIG. 26 shows an isometric view of an alternative embodiment of an intake system (A) in the form of a nestable tray.
Figure 30:
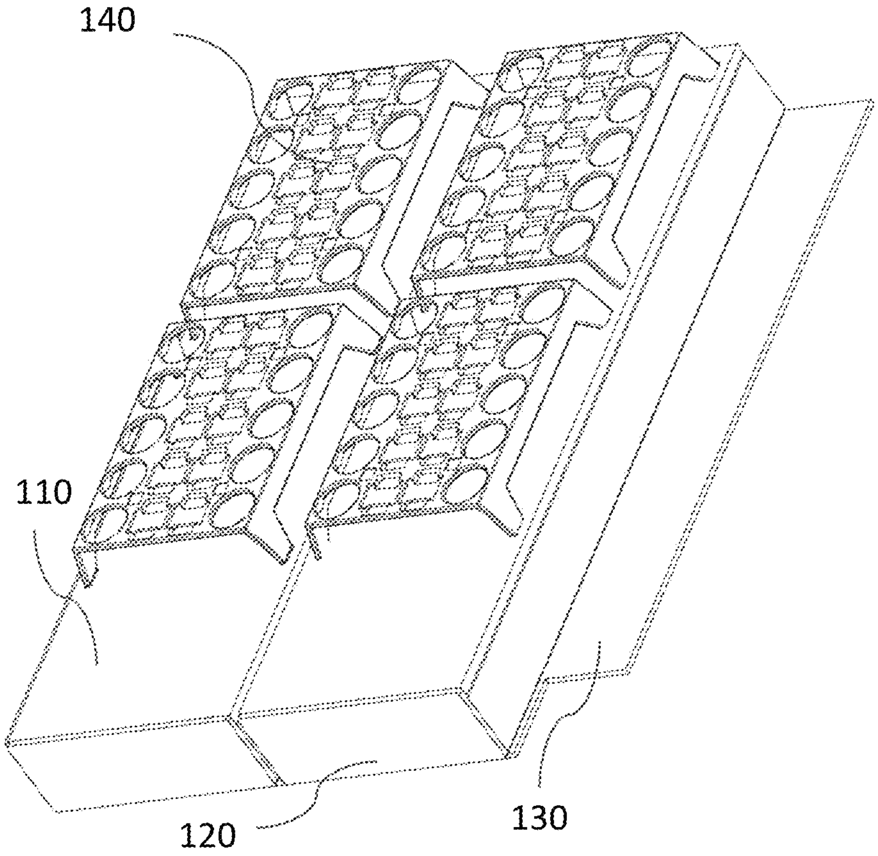
FIG. 30 shows an isometric view of an alternative embodiment of the intake system (A).

In a first embodiment, the system has a dedicated area to receive one pair of input (e.g., specimen jars 1002) and output containers (e.g., cassettes 1008) such as a slot or a drawer that can be easily accessible by the user. This area can be opened or closed with a door. It can be fixed or mobile, e.g. a drawer that can slide outwards, to permit placing the sample more easily. In a second embodiment, the intake system (A) has a dedicated area to receive multiple input and output container pairs such as a slot or a drawer, easily accessible by the user. This area can be open or closed with a door. It can be fixed or mobile, e.g. a drawer that can slide outwards, to permit placing the sample more easily. The pairs are grouped in batches for ease of loading and unloading by laboratory personnel. A dedicated tray, as shown in FIG. 26 is used to hold all the pairs in a given batch. In a third embodiment, the intake system (A) is capable of receiving multiple trays, as shown in FIG. 30, for ease of loading and unloading by laboratory personnel and an increased efficiency. Multiple trays can be placed in the input area while physical capacity permits.

Figure 34:
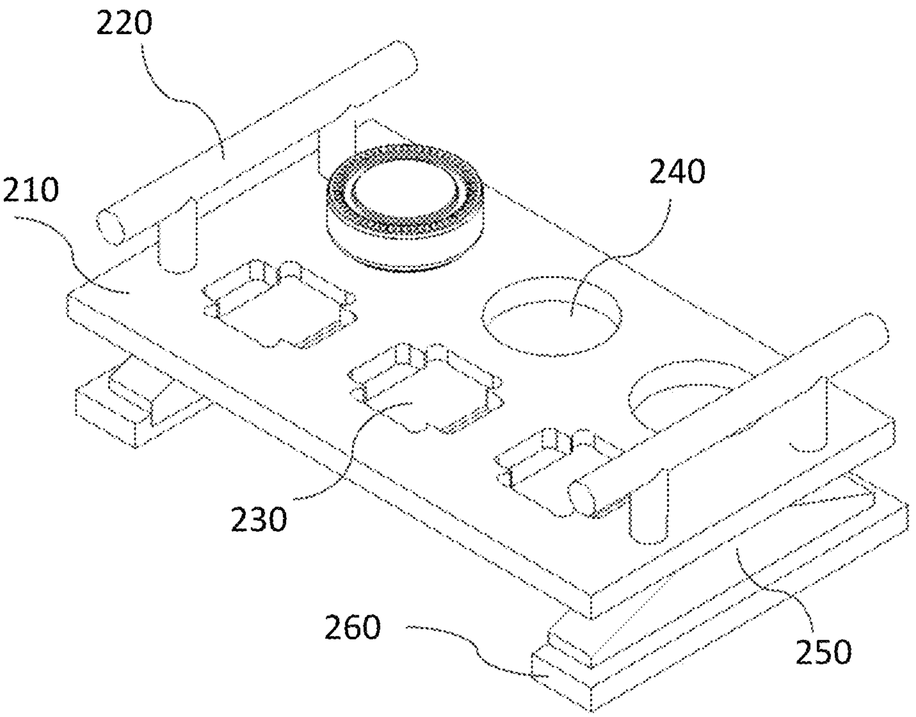
FIG. 34 shows an isometric view of an alternative embodiment of an exclusion tray.
Figure 35:
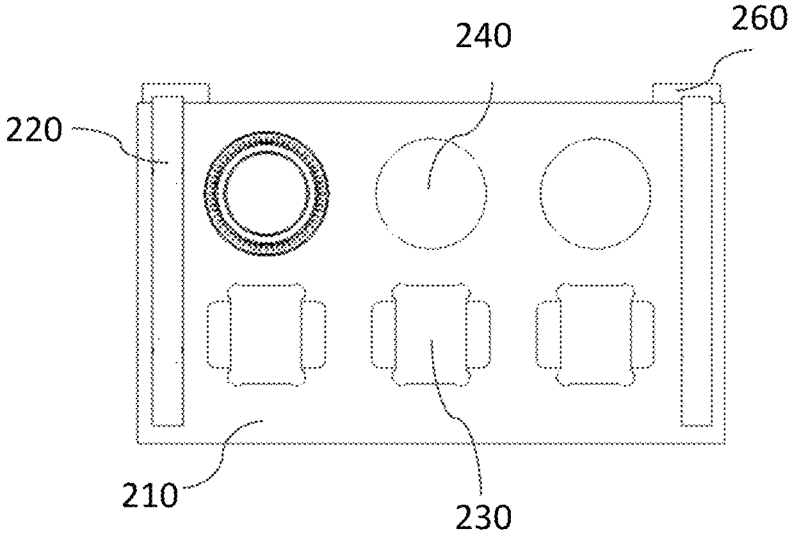
FIG. 35 shows a top view of the exclusion tray of FIG. 34.

Additionally, the system performs the necessary checks to detect the presence of the containers, validate them, determine their position, and optionally detect their types. Although the exclusion zones (I) and (O) as described in FIGS. 1-21 show different configurations, other embodiments, are possible. For example, FIGS. 34-35 depict an alternative embodiment of the dedicated exclusion area. FIG. 34 and FIG. 35, depict exclusion areas to receive one or more input or output containers that have been excluded from downstream processing, each sample consisting of an input container or any corresponding output container. The system can be capable of preparing the output container for a given input container. For instance, the system can be able to automatically select the right type of output containers to use based on information read from the input container, pre-defined or input via configuration or a user interface. It can also be capable of automatically printing and placing the label for the output container. The system can be equipped with additional hardware and software components to create the output container for a given input container. In some embodiments, such hardware can consist of a 3-D printer capable of printing output containers of a certain size, form, and shape, such as a small biopsy cassette. It can also include a tool to label the created output contained.

Figure 27:
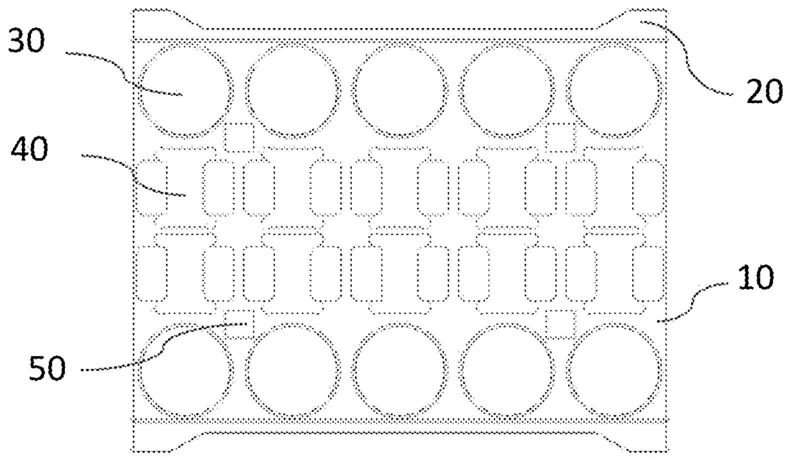
FIG. 27 shows a top view of the tray of FIG. 26.
Figure 28:
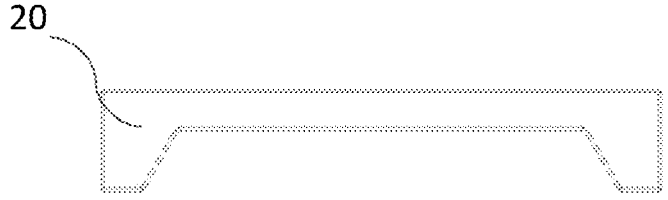
FIG. 28 shows a front view of the tray of FIG. 26.
Figure 29:
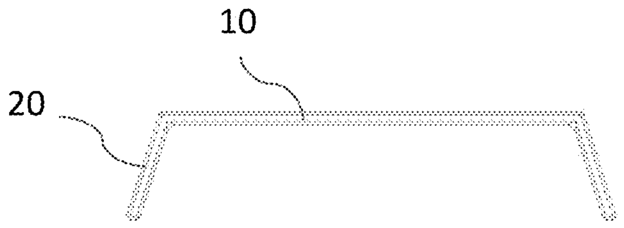
FIG. 29 shows a side view of the tray of FIG. 26.

In an exemplary embodiment, the intake system (A) includes a nestable tray designed to hold one or more pairs of input containers (e.g., specimen jars 1002), such as a biopsy bottle, with their corresponding output containers (e.g., a cassette 1008), such as a biopsy cassette. FIG. 26 shows an ISO view of such a nestable tray. FIG. 27 shows a top view of the tray of FIG. 26. FIG. 28 shows a front view of the tray of FIG. 26. FIG. 29 shows a side view of the tray of FIG. 26.

The components for the embodiment of the nestable tray shown in FIGS. 26-33 include: Body of the nestable tray 10. Sides and feet of the tray 20. In some embodiments, the feet are angled outward from the body of the tray, such that they provide support for the tray, and enable them to be easily nested with additional trays 10. Cut-out for the input container 30, a biopsy bottle. These cutouts are designed such as the biopsy bottle's lip, collar, or neck ring sits on top of the body 10 but the majority of the bottle hangs below the body of the tray through this cut-out. Wells for the output container 40, a cassette. In this embodiment, the rectangular, longitudinal pockets in the wells contain features that locate the cassettes within the tray, and the transverse cutouts create reliefs that allow for a pick-and-place gripper to access the cassettes. Square slot 50 for placing fiducial markers, or localization tags such that a camera will be able to understand where the tray is and how many specimen jars and cassettes are in it.

Figure 31:
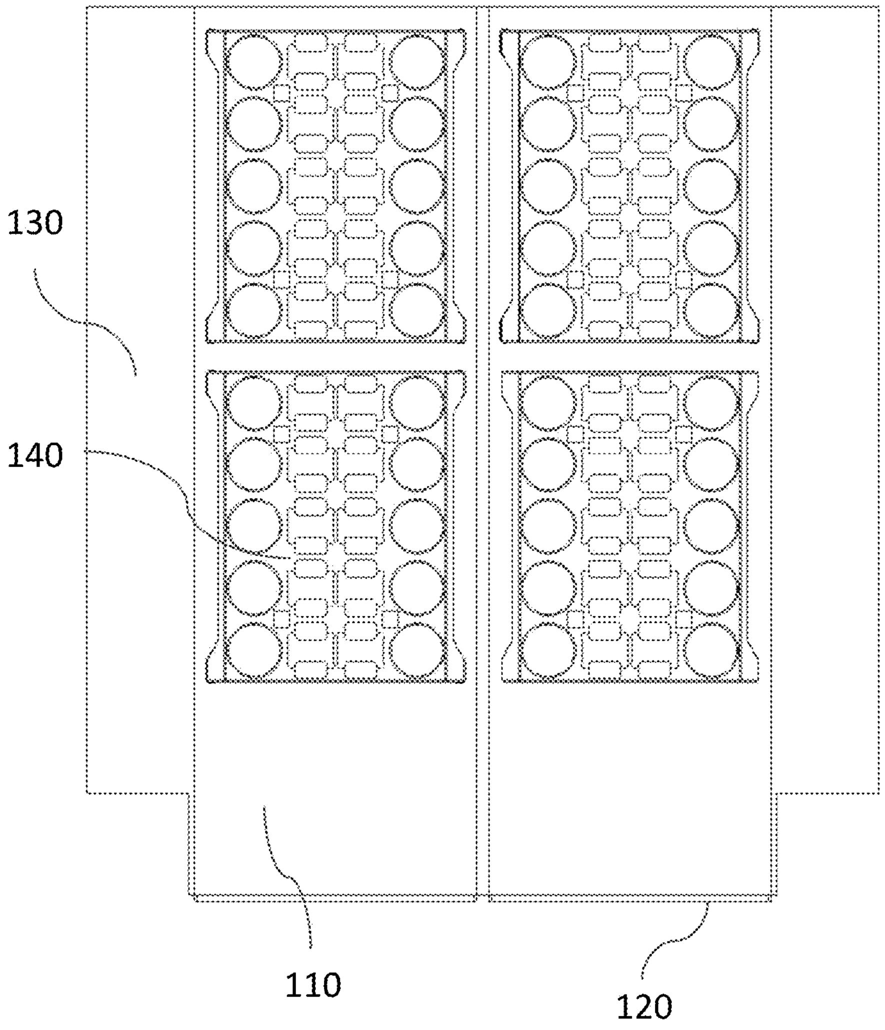
FIG. 31 shows a top view of the intake system of FIG. 30.
Figure 32:
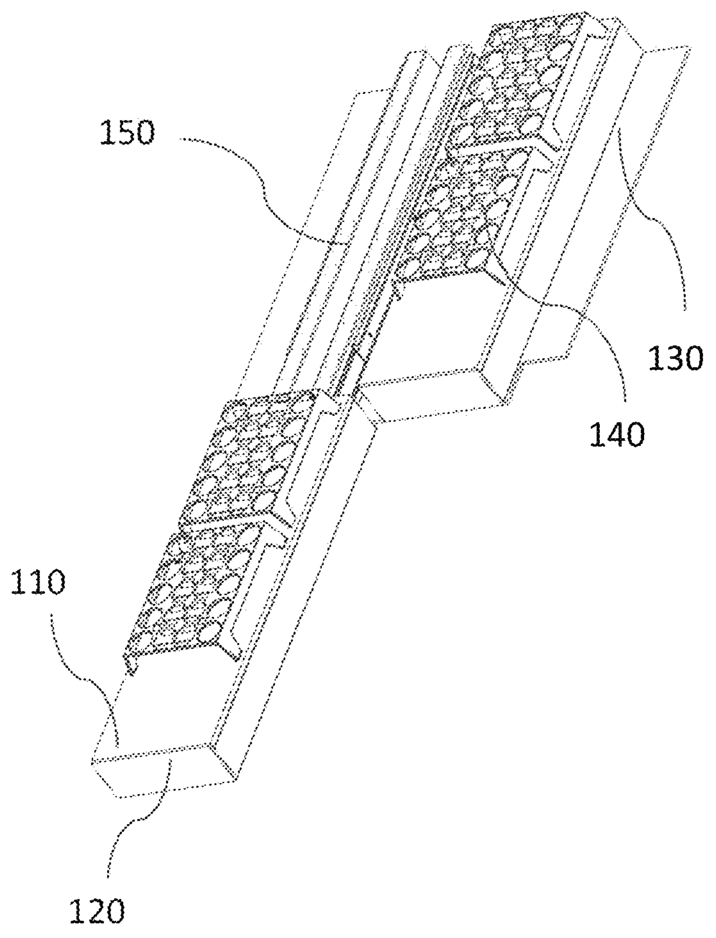
FIG. 32 shows an extended isometric view of the intake system of FIG. 30.
Figure 33:
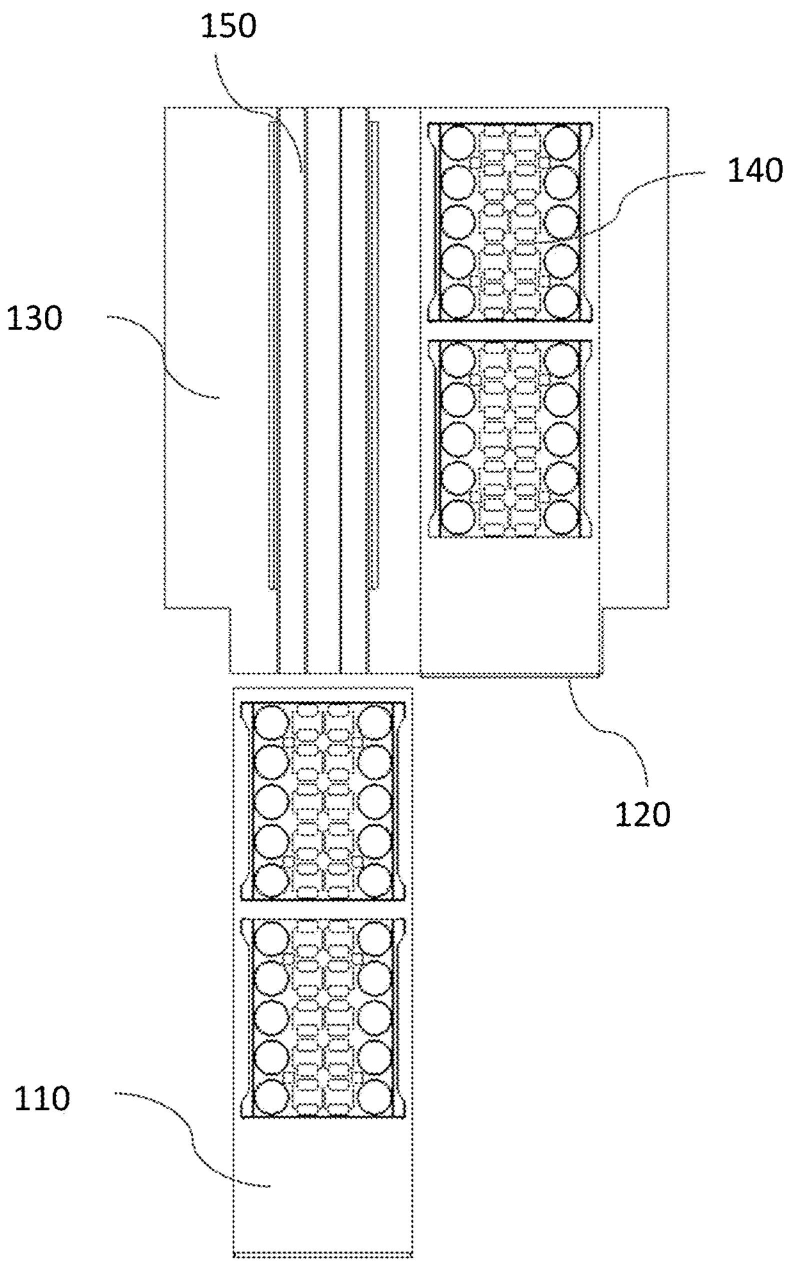
FIG. 33 shows an extended isometric top view of the intake system of FIG. 30.

In an alternative embodiment, the intake system (A) can host multiple nesting trays. FIG. 30 shows an isometric view of an alternative embodiment of the intake system (A). FIG. 31 shows a top view of the intake system of FIG. 30. FIG. 32 shows an extended isometric view of the intake system of FIG. 30. FIG. 33 shows an extended isometric top view of the intake system of FIG. 30. The components of the alternative embodiment of the intake system shown in FIGS. 30-33 include a platform 110 of the intake module that hosts the trays. In this embodiment, there are pockets cut into this platform at specific locations such that the tray feet can fit in the pockets and the tray can be located. A front body 120 of the platform can hide the drawer slides and structural elements underneath the platform. A base body 130 that can hold the intake module drawers and provide a mounting location for the structural elements of the drawer. A nestable tray 140 as described in FIGS. 26-29. Drawer slides 150 allow the platform to be extended, aiding the loading process. The alternative embodiment of the intake system (A) also includes a dedicated exclusion tray designed to hold one or more pairs of input containers, such as a biopsy bottle, with their corresponding output containers, such as a biopsy cassette. FIG. 34 shows an isometric view of an alternative embodiment of an exclusion tray. FIG. 35 shows a top view of the exclusion tray of FIG. 34. Below are the components of the exclusion tray shown in FIGS. 34-35. The body 210 of the exclusion tray. Handles 220 on the exclusion tray so that users are able to easily pick it up. Wells 230 for the output containers and cassettes. The rectangular, longitudinal pockets in the wells contain features that locate the cassettes within the tray, and the transverse cutouts create reliefs that allow for a pick-and-place gripper to access the cassettes. Cut-out 240 for the input container, a biopsy bottle. In this embodiment, these cutouts are designed such that the biopsy bottle's lip, collar, or neck ring sits on top of the body but the majority of the biopsy bottle hangs below the body of the tray through this cut-out. The exclusion tray feet 250. In this embodiment, the feet are the base of the exclusion tray and are sized to fit into 260. A base 260 with locating-features that allow the exclusion tray to be removed from the machine and reinserted into the machine at a designated location accurately, wherever the designated location is within the machine.

Although FIGS. 1-21 describe tissue transfer from the specimen jar 1002 with a vacuum module (F), other embodiments are possible. For example, FIGS. 36-39 depict such an alternative embodiment as an apparatus, such as a funnel, bounding box, or tunnel, to transfer the contents from one input container to one output container. The contents enter the apparatus through the input from the input container and travel through the apparatus to the output container. At the output, the contents exit the apparatus to enter the output container. The contents move inside the apparatus spontaneously as a result of the gravitational pull or aided. The input container is typically a small bottle containing biopsies in fluid (e.g., specimen jar 1002) and the output container is typically a small cassette (e.g., cassette 1008) that receives the biopsies without any fluid.

In one embodiment, the apparatus is open partially or fully at the top where it receives the contents of the input container as well as at the button where it outputs the contents into the output container. In a second embodiment, the apparatus is open partially or fully at the top where it receives the contents of the input container, and sealed at the bottom around the output container to prevent contents from escaping outside the output container during the transfer. In a third embodiment, the apparatus is sealed at the top around the input container to prevent contents from escaping outside the input container during the transfer, and open partially or fully at the bottom where it outputs the contents of the output container. Finally, in a fourth embodiment, the system is sealed both at the top and at the bottom around both the input and output containers to prevent contents from escaping outside the input or output container during the transfer.

The system can transfer the contents from input to output container through the apparatus using any of the following methods, but is not limited to these methods: a) Rinse using water or another safe fluid. b) Air blow. 3) Mechanical agitation such as scraping, picking or motion of the container or any of the other affected surfaces. 4) Mechanical picking of the biopsies using an appropriate end effector.

In come embodiments, a splash guard is mounted to a flush plate, which is then mounted to a funnel body. The splash guard serves to keep all of the fluid and biopsies directed down into the funnel. An inlet adapter is connected to the funnel body with a channel that directs water from the inlet to the flush plate. There are features on the flush plate that serve as nozzles to expel water around the perimeter of the funnel. This helps to flush any biopsies that might be attached to the funnel down through the bottom of the funnel. A funnel-to-output container interface, where the output container is typically a small cassette, is mounted to the bottom of the funnel body. This serves to direct biopsies into the output container located below the interface.

Figure 36:
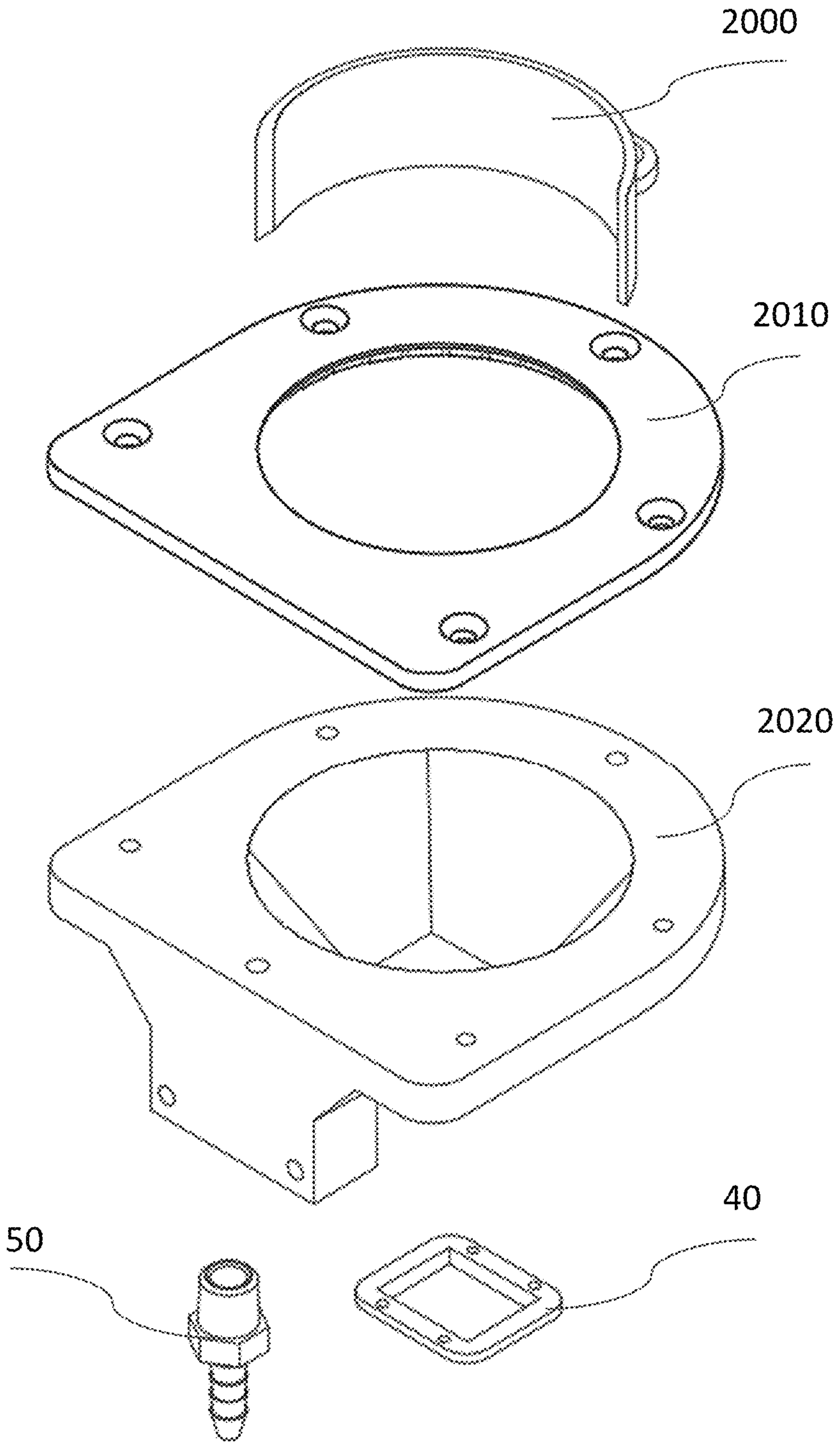
FIG. 36 shows an isometric exploded view of an alternative embodiment depicting a funnel system for automated sample transfer.
Figure 37:
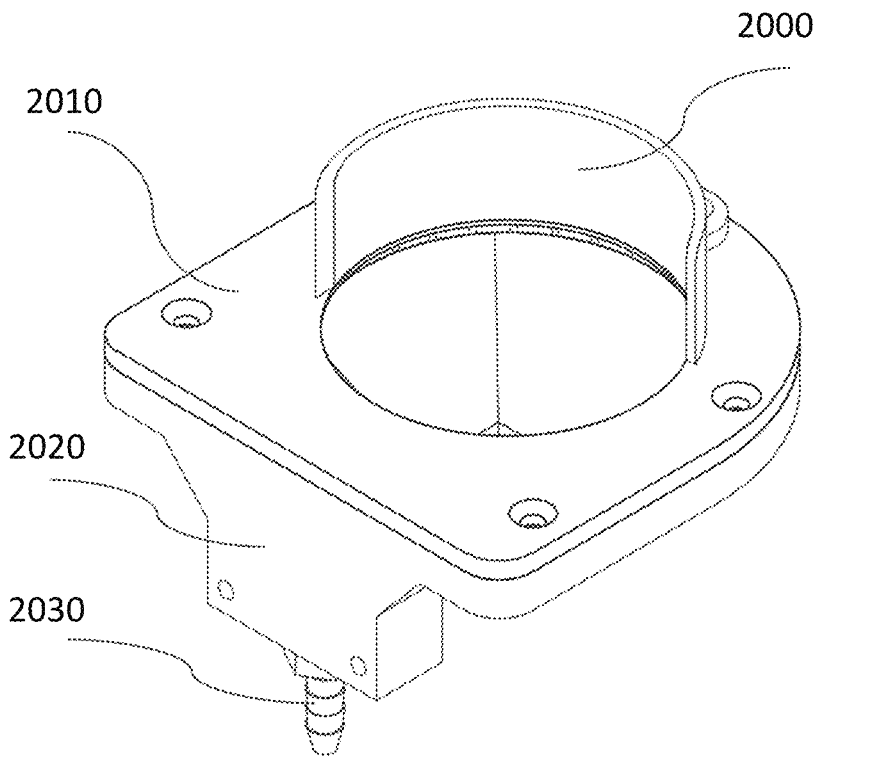
FIG. 37 shows a top-level view of the funnel system of FIG. 36.
Figure 38:
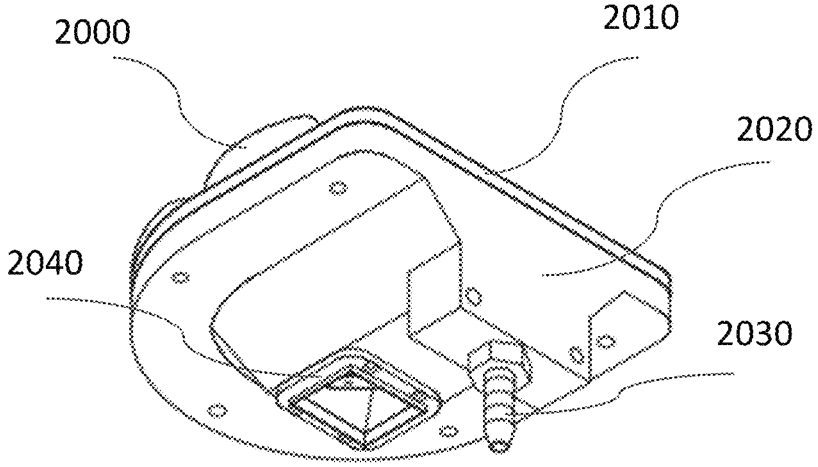
FIG. 38 shows a low-level view of the funnel system of FIG. 36.

FIG. 36 shows an isometric exploded view of one embodiment of the system, which includes the following components: splash guard 2000, which directs the contents, biopsies and fluid, into the entrance orifice of the funnel during the pour. This helps prevent the contents from pouring over the funnel and out of the apparatus. Flush plate 2010, which directs fluid from the pump system around the perimeter of the funnel to flush biopsies down the funnel. Funnel Body 2020, which directs biopsies originating from the input container pour down the cassette, which is placed below the funnel-to-output container interface, where the output container is typically a small cassette. This part also includes plumbing for the wash down. It pipes fluid up and into the void created when installing the Flush Plate 2010 onto the Funnel Body 2020 and the inlet adapter 2030 when installed to Funnel Body 2020. Additionally, surface coatings can be applied to the funnel body 2020 to aid the flow of fluids and transfer of biopsies from an input container to an output container. Funnel-to-Cassette Interface 2040, mounted to the bottom of the funnel to direct biopsies into the output container such as a small cassette. The outside dimension of the funnel-to-output container interface is smaller than the inside dimension of the cassette in length, height, and depth such that it fits into the output container and there is a seal between the funnel and output container. Inlet Adapter 2030, which allows for a robust connection between the tubing coming from the pump and the funnel assembly so that no water escapes during pumping. FIG. 37 shows a top-level view of the funnel system of FIG. 36 and its components described above. FIG. 38 shows a low-level view of the funnel system of FIG. 36 and its components described above.

Figure 39:
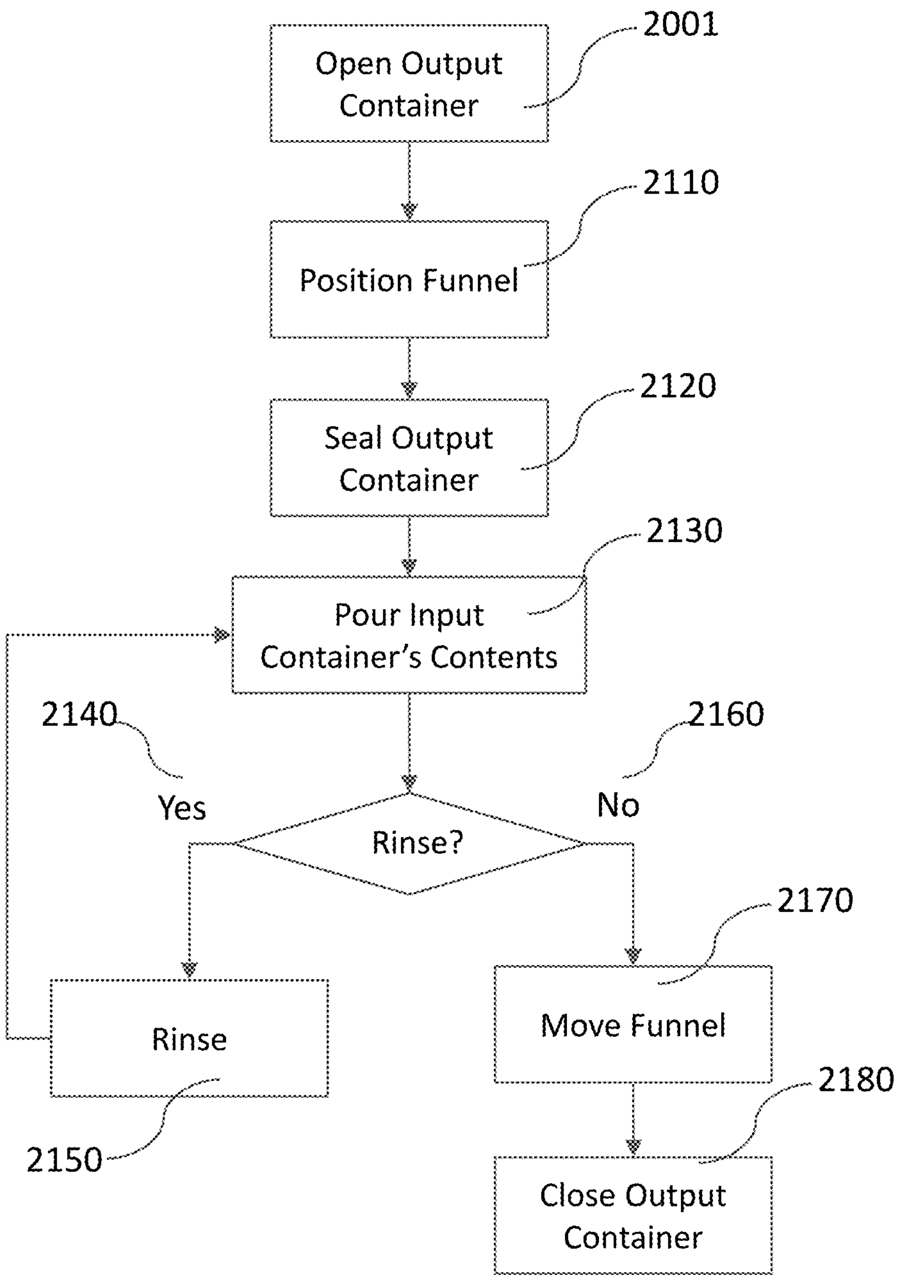
FIG. 39 depicts an example method of automated tissue sample grossing and transfer with the alternative embodiment apparatus of FIG. 36.

In another embodiment, the system includes an array of funnels to enable transferred biopsies from multiple input containers to multiple output containers simultaneously for an improved throughput. An alternative embodiment of a method for the automated transfer of tissue samples in an anatomical pathology laboratory is shown in FIG. 39. In some aspects, the steps are analogous to the methos described in FIGS. 1-25. It outlines an exemplary automated end-to-end process the system is capable of executing in order to perform such transfer with the apparatus described in connection with FIGS. 36-39.

In one embodiment, the system is capable of handling input samples consisting of bottles containing biopsies in fluid such as formalin or other fixative. The biopsies are tissue biopsies of any size that can fit inside the bottle while permitting the free movement of the biopsies in the fluid inside the bottle. Furthermore, the system is capable of separating the biopsies from the fluid while preventing the contents from escaping. The system is designed such that the biopsies are placed in the output container and the fluid drained in a dedicated waste reservoir or bucket. The output container is typically a cassette designed to hold tissue biopsies while the fluid can pass through its base and cap. Additionally, the hardware consists of an apparatus such as a funnel with an end that's shaped to fit the base of the output container. The funnel can adhere to the base and establish a seal that prevents the escape of tissue biopsies during the transfer of the contents from the input container to the output container.

In this exemplary embodiment, the system opens the output container 2001 positions the funnel (step 210 in FIG. 4) on top the base of the open output contained and ensures proper alignment. It is expected that the output container is open and meets the expected requirements in terms of shape and dimensions. However, the system can leverage sensors such as cameras, break-beam or other to determine whether the output container meets these expectations, and if not, it reports an error.

The system then seals the output container (step 2120) by pressing the funnel against the base of the output container; sufficient pressure is applied to ensure a proper seal without damaging the base of the output container. Sensors such as cameras and pressure sensors can be used to ensure that the funnel is positioned correctly. The system then proceeds to pour the contents of the input container. These contents consist of biopsies in fluid.

The system can also leverage sensors, imaging and computer vision techniques to detect if there are remaining biopsies inside the input container and if a rinse is required (step 2140 or 2160). If there are biopsies left and a rinse is needed (step 2140), the transfer system can rinse (step 2150) or refill the body of the input container with additional fluid and proceed with another transfer. If necessary, it can agitate the body with the added fluid to detach the biopsies from the body. If necessary, the system can place the cap of the input container on the body to close the input container before agitating it in order to prevent contents from escaping.

Similarly, the system can leverage sensors, imaging and computer vision techniques to detect if any biopsies are stuck inside the funnel and a rinse is needed. If there are stuck biopsies (step 2140), the system can rinse the funnel with additional fluid (step 2150) to ensure that the biopsies are moved from the body of the funnel and to the base of the output container.

This rinse step (step 2150) can be repeated until all biopsies are placed inside the output container; or alternatively, a maximum number of retries, pre-defined or input as a configuration of the system, is reached, in which case the system reports an error.

Once all biopsies are placed inside the output container and no further rinse is required (step 2160), the system moves the funnel away from the base of the output container. In one embodiment, the system can also use the funnel 2020 and flush plate 2010 to rinse the cap of the input container, upon detecting using sensors that there are biopsies stuck on the cap. The flush plate can be designed to direct rinsing fluid up and against the cap. In one embodiment, the system can be designed to recycle the fluid initially contained in the input container to perform the rinse step 2150.

Although FIGS. 1-21 describe a robotic arm (D) including gripper 1046 and end effector 1048 and decapping module (E) including stationary gripper 1054 and rotary gripper 1052 to move and manipulate the specimen jar 1002 and cassette 1008, other embodiments are possible. For example, FIGS. 40-45 depict end effectors and gripper sufficient to manipulate jars of differing sizes. For example, the system includes but is not limited to one or more end effectors to handle samples and can be part of a larger system or machine to enable the automated processing of one or more steps in a laboratory workflow for instance an accessioning or grossing machine. In one embodiment, the system comprises three types of end effectors and is capable of performing one or more operations as follows: a) Handle an input container such as a small biopsy bottle to pick it, place it, move it, open it, and close it between stations within a larger system or machine. b) Handle an output container such as a small cassette to pick it, place it, move it, open it, and close it between stations within a larger system or machine. c) Handle the input and output containers to transfer contents such as biopsies and fluid from the input container to the output container, and this within a larger system or machine.

Figure 40:
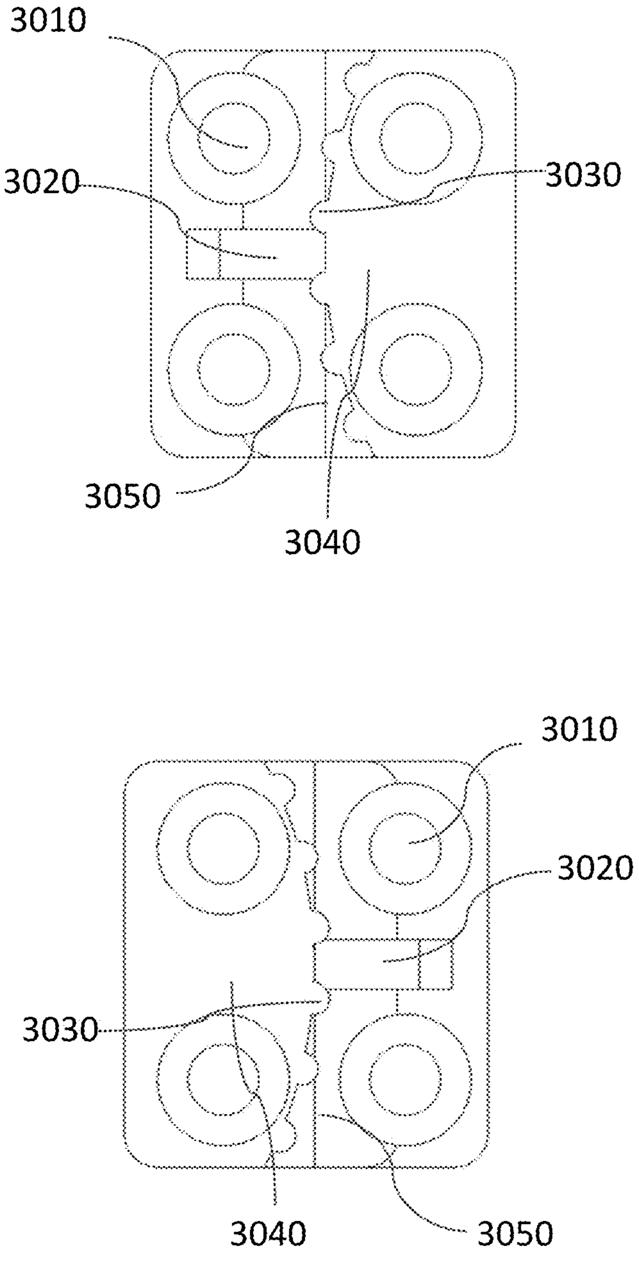
FIG. 40 depicts an alternative embodiment of an effector.
Figure 41:
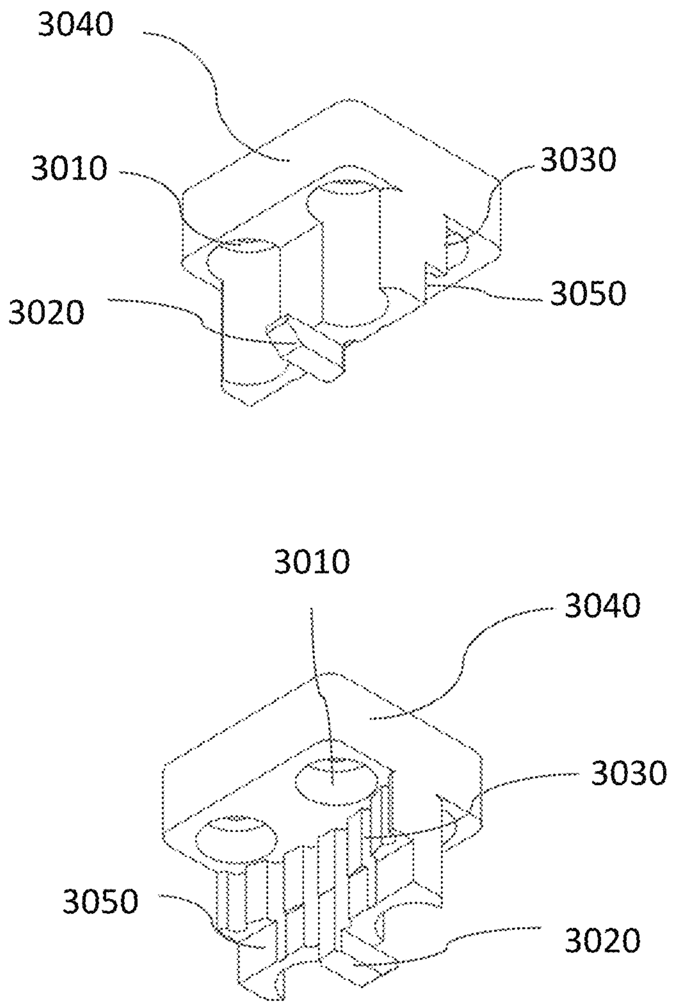
FIG. 41 depicts another alternative embodiment of an effector and its components.

FIG. 40 depicts an alternative embodiment of an effector. FIG. 41 depicts another alternative embodiment of an effector and its components. Holes 3010 to attach the end effector to the overhead gantry gripper. Overhang on the end effector 3020 used to catch the overhang on the cassettes in order to open them. Rounded interface 3030 with notches used to make contact with the specimen jar lid. This contact allows the grippers to successfully move the specimen jars around the machine, and applies friction to the lid, which enables successful decapping. Base of the end effector 3040 where the mounting holes and all features originate. Flat interface 3050 with notches used to make contact with the cassettes. This contact allows the grippers to successfully move the cassettes around the machine.

Figure 42:
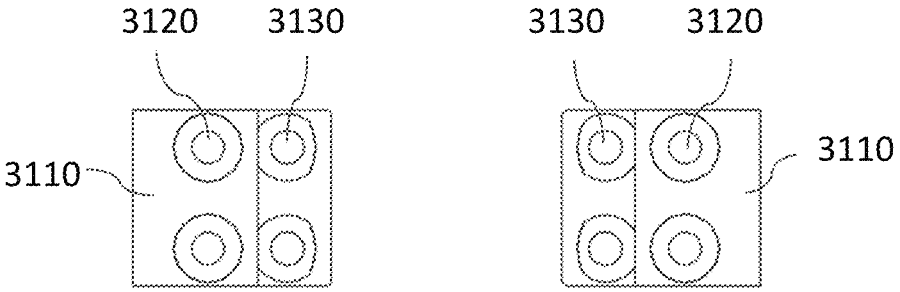
FIG. 42 depicts an alternative embodiment for a grossing end effector and its components.
Figure 43:
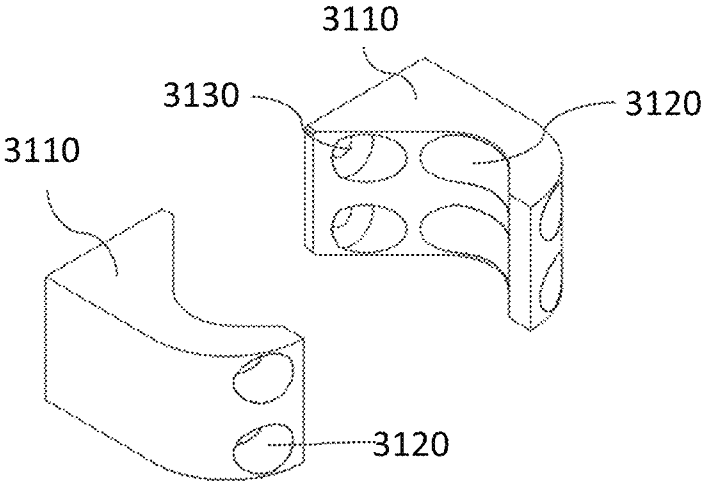
FIG. 43 depicts another alternative embodiment for a grossing end effector and its components.

FIG. 42 depicts an alternative embodiment for a grossing end effector and its components and FIG. 43 depicts another alternative embodiment for a grossing end effector and its components. Body of the end effector 3110 where all of the mourning holes and features originate. The body is curved such that it makes two points of contact with the specimen jar on each end effector. This enables the end effectors to have solid engagement with the specimen jar and move it around successfully in the machine. Holes 3120 to mount the end effector to the grossing module gripper. These holes go through a large amount of the curved body. Holes 3130 to mount the end effector to the grossing module gripper.

Figure 44:
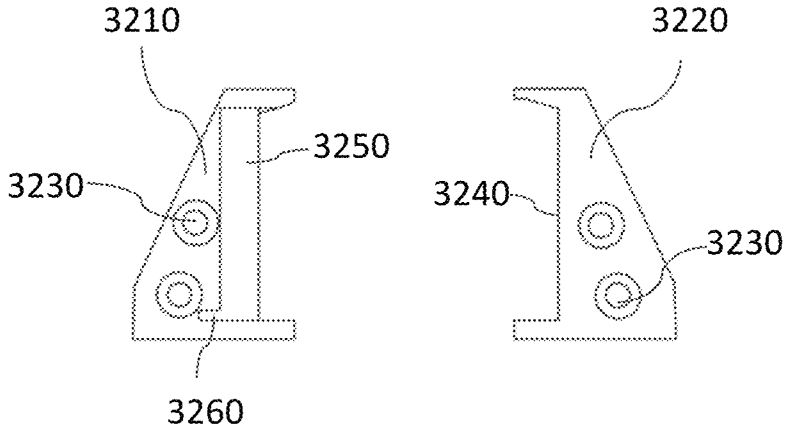
FIG. 44 shows an alternative embodiment for an end effector and its components.
Figure 45:
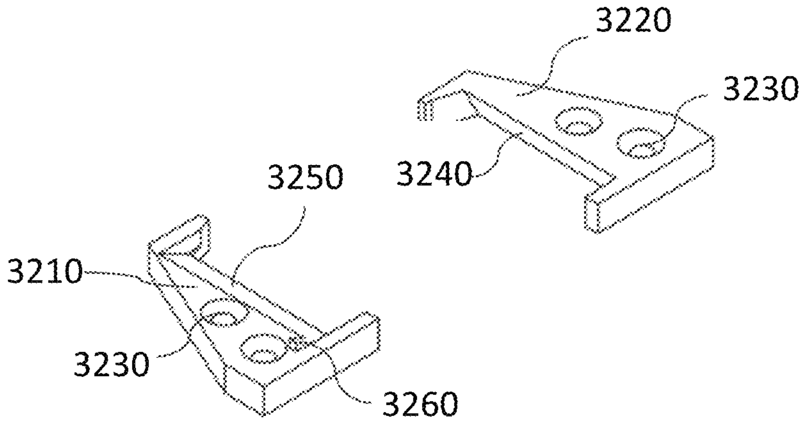
FIG. 45 shows another alternative embodiment for an end effector and its components.

FIG. 44 shows an alternative embodiment for an end effector and its components and FIG. 45 shows another alternative embodiment for an end effector and its components. Body of the left end effector 3210, where all features and holes on the left end effector originate. Body of the right end effector 3220, where all features and holes on the right end effector originate. Holes 3230 to mount the end effector to the cassette gripper. Downward slanted interface 3240 on the right end effector used to grip the slanted face of the cassette. Upward slanted interface 3250 on the left end effector. This is used for the cassette lid to rest on in a slanted fashion when the cassette lid is open. Notch on the left end effector 3260. This is used to support the cassette lid when it is open and resting in a slanted fashion on the end effector.

FIGS. 46-49 depict example flow diagrams showing an example method for imaging and analysis of tissue samples to automatically characterize tissue biopsies and perform quality checks during grossing in an anatomical pathology laboratory as described in connection with FIGS. 1-25. For example, FIGS. 46-49 are example flow diagrams that show the methods for the quality checks performed in connection with FIGS. 1-25. The system includes hardware components such as cameras, and software components such as computer vision software, image processing algorithms and Artificial Intelligence (AI) based models for computer vision. It is capable of taking one or more images of the input tissue samples as well as their contents or parts, analyzing these images to characterize any tissue biopsies contained, and performing the necessary quality checks based on predefined or input configuration. Such quality checks help trace the biopsies when handled automatically by robotic hardware in a laboratory setting. They can also help validate the biopsies against laboratory protocols. In one embodiment, the system automatically images and characterizes small biopsies contained in fluid without the need for manual handling typically done using tweezers which can damage the texture of the tissue especially when small.

In one embodiment, the system comprises hardware such as one or more cameras, lighting, and sensors, as well as software to control the hardware and orchestrate its operation to perform one or more steps involved in the imaging and characterization of tissue samples in an anatomical pathology laboratory. Samples input (e.g., specimen jars 1002) to the system are typically composed of a container such as a bottle filled with contents such as tissue biopsies and fluid. During processing, the system takes images of the input samples, their contents and parts.

Input (e.g., specimen jars 1002) and/or output containers (e.g. cassettes 1008) are labeled following standard pathology laboratory procedures, and allow associating each with a specific medical case and a specific patient. Furthermore, they allow associating a given input container with its corresponding output container.

Based on the information extracted from the label on the input or output container, the system can store that information so that it can be forwarded and reused by other systems to automatically determine the type of tissue processing required next and the appropriate target destination of the samples. In some embodiments, the information extracted from a labeled specimen jar 1009 is used to print a cassette as described in connection with cassette printer (C). The images and any other data collected by the system can be: a) Stored locally or displayed on the User Interface raw or in a processed format. The system provides the necessary interfaces, such as shared drives or Application Programming Interfaces (APIs), to enable the sharing and access of this data by information systems in the laboratory where the system is deployed. b) Transferred to other local or remote systems such as a database, storage system, or another software system such as a Laboratory Information System (LIS).

Furthermore, the system can generate a report using the data collected during sample processing, including data extracted from the labels on the input and output containers, as well as the data resulting from the image analysis of tissue biopsies contained in the input container (e.g. their count, size, and dimensions). This report can then be accessed by authorized laboratory personnel or stored on a local or remote system for future use.

Figure 46:
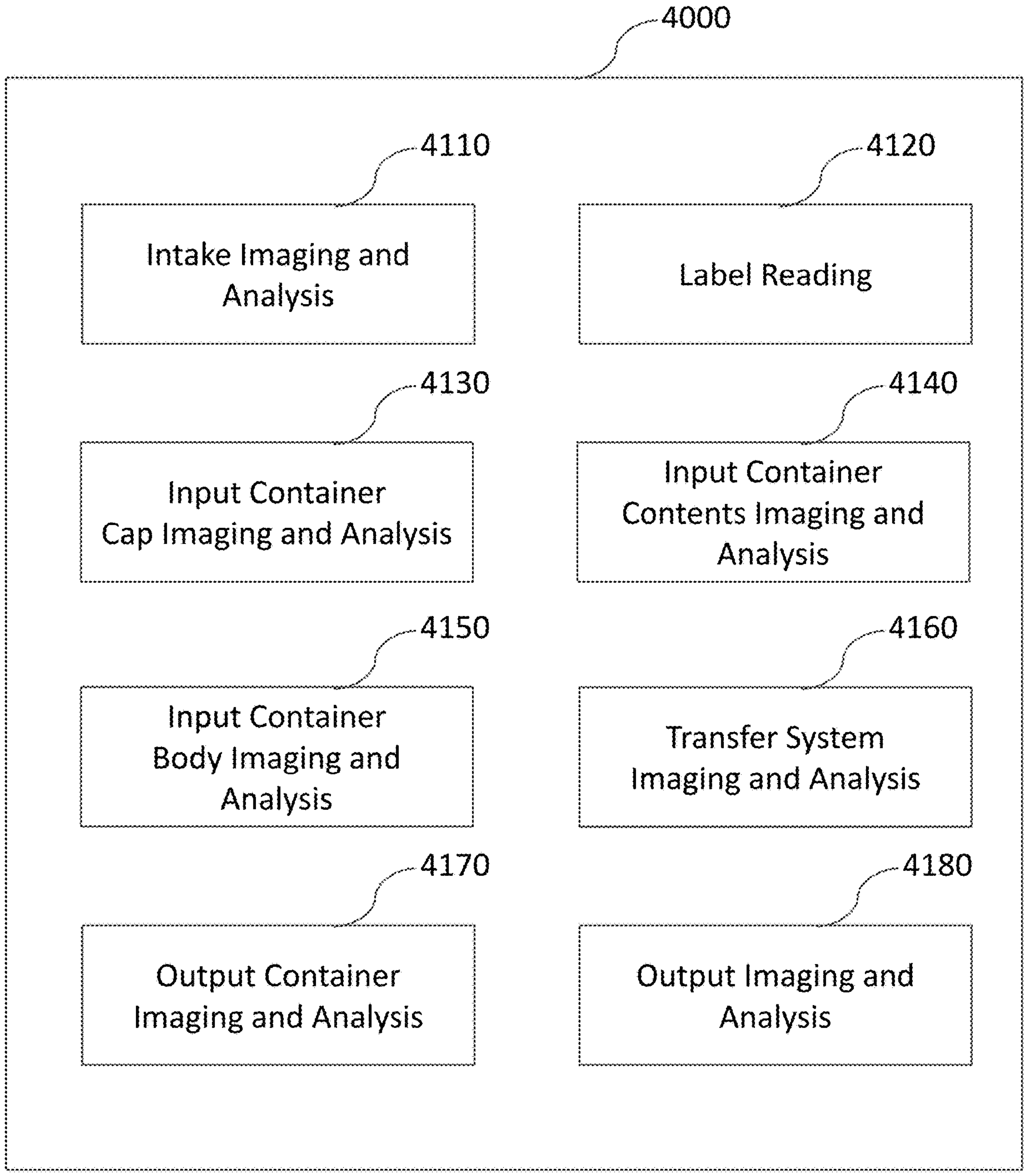
FIG. 46 an example schematic for imaging and analysis.

FIG. 46 an example schematic for imaging and analysis. In one embodiment as shown in FIG. 46, the system 4000 contains multiple components including but not limited to the following: Intake Imaging and Analysis 4110 which has one or more cameras and optionally a lighting system to take one or more images of an intake area, where one or more input and output sample pairs are placed, and analyze the images. Label Reading 4120 which has one or more cameras and optionally a lighting system to take one or more images of an input or an output container placed optimally and analyze them (e.g., quality check 1 of FIGS. 1-21). Input Container Cap Imaging and Analysis 4130 which has one or more cameras and optionally a lighting system to take one or more images of the cap of the input container placed optimally and analyze them (e.g., quality check 3 FIGS. 1-21). Input Container Contents Imaging and Analysis 4140 which has one or more cameras and optionally a lighting system to take one or more images of the contents of the input container placed optimally and analyze them (e.g., quality check 2 of FIGS. 1-21). Input Container Body Imaging and Analysis 4150 which has one or more cameras and optionally a lighting system to take one or more images of the body of the input container placed optimally and analyze them. Transfer System Imaging and Analysis 4160 which has one or more cameras and optionally a lighting system to take one or more images of the transfer system placed optimally. The transfer system can be a funnel or chamber used to transfer contents in a closed environment from an input container to output container to prevent contents from escaping and analyze them. Output Container Imaging and Analysis 4170 which has one or more cameras and optionally a lighting system to take one or more images of the lid, body, and contents of the output container placed optimally and analyze them (e.g., quality check 4 of FIGS. 1-21). Output Imaging and Analysis 4180 which has one or more cameras and optionally a lighting system to take one or more images of the output area, where one or more output samples are placed, and analyze the images (e.g., quality check 5 of FIGS. 1-21).

In some embodiments, the system can comprise color or monochrome cameras with varying focal lengths to maximize contrast and resolution for the detection of contents such as biopsies, beacons, or indicators. In one embodiment, the system comprises the following cameras (e.g., cameras and lights (e.g., 1057, 1056, 1062, 1060, 1088, 1090, 1092): a) Intake camera: RGB camera optionally lit by white light from behind the camera when ambient light is insufficient. Used to take images of the intake area. b) Barcode camera: Pan-visible monochrome camera lit by white light from behind the camera. Used to take images of the labels of the input and output containers. c) Cap camera: RGB camera lit by white light from behind the camera. Used to take images of the underside of the cap of the input container. d) Body camera: RGB camera lit by white light under the body of the input container or cup. The camera looks down into the open cup. Used to take images of the contents inside the cup for instance biopsies in fluid. Also used to check if the cup has been fully emptied from all contents. e) Output container camera: RGB camera optionally lit by white light from behind the camera when ambient light is insufficient. Used to take images of the contents inside the output container for instance biopsies. f) Exclusion camera (optional): RGB camera optionally lit by white light from behind the camera when ambient light is insufficient. Used to take images of the exclusion area where certain input and output containers, that do not meet the specified criteria, are placed. Finally, the system can be configured to perform calibration procedures to correct for any drifts affecting the positions of the different components, such as cameras and lights, to ensure proper setup and operation over time.

The Intake Imaging and Analysis 4120 comprises one or more cameras and optionally a lighting system to take one or more images of the intake area and extract information using techniques and algorithms such as feature detection and object detection. Such information can include the presence of items in the area, as well as the count, identifiers and positions of these items.

In a first embodiment, the intake area contains one or more samples placed directly on the surface, each sample consisting of an input container. The intake area can be equipped with one or more optical fiducial markers, labels, barcodes, or other visible markers. The system takes one or more images of the intake area. It analyzes the images, detects the markers, and uses their position to determine the presence and position of the input containers in the image and in the physical space.

In a second embodiment, the intake area contains one or more samples placed directly on the surface, each sample consisting of an input container and its corresponding output container. The intake area can be equipped with one or more optical fiducial markers, labels, barcodes, or other visible markers. The system takes one or more images of the intake area. It analyzes the images and detects the markers, and uses their position to determine the presence and position of the input and output containers in the image and in the physical space.

In a third embodiment, the intake area contains one or more pallets each containing one or more samples, each sample consisting of an input container. The intake pallets can be equipped with one or more optical fiducial markers, labels, barcodes, or other visible markers. The system takes one or more images of the intake pallets. It analyzes the images, detects the markers, and uses their position to determine the presence and position of pallets, as well as the input containers they contain, in the image and in the physical space.

In a fourth embodiment, the intake area contains one or more pallets (e.g., pallets 1009), each containing one or more samples, each sample consisting of an input container and its corresponding output container. The intake pallets can be equipped with one or more optical fiducial markers, labels, barcodes, or other visible markers. The system takes one or more images of the intake pallets. It analyzes the images, detects the markers, and uses their position to determine the presence and position of pallets, as well as the input and output containers they contain, in the image and in the physical space.

The Label Reading 120 in FIG. 1, comprises one or more cameras and optionally a lighting system to take one or more images of the label on an input or output container placed optimally and extract some or all of the information read, e.g. barcodes and text, using techniques and algorithms such as Optical Character Recognition (OCR). Such information can include unique identifiers, patient identifiers, date when the sample was collected, or other relevant information.

The system can have a mechanism to automatically move the container or the cameras to allow imaging the labels from different angles if needed, for example using a robotic gripper (e.g., robotic arm (D)) or a spinning tray (e.g., decapping module (E)) to reposition the container, or fitting the camera on a robotic arm or a gantry system to control its position. Furthermore, the system can use a lighting system, and if needed adjust its position, intensity, or other configuration. It can also take different images, e.g. grayscale, RGB.

In one embodiment, the system uses one camera and lighting system capable of imaging and reading the labels on a round container such as a sample bottle. In another embodiment, multiple images of the label are taken sequentially by the camera as the container is automatically rotated to allow imaging from different angles and ensure full coverage of the areas that can have a label. In an alternative embodiment, the camera moves to capture images of the container from all the relevant angles. The images are then processed together to read the label.

In another embodiment, the system uses a plurality of cameras and one lighting system capable of imaging and reading the labels on a round container such as a sample bottle. Multiple images of the label are taken concurrently by at least two or more cameras from different angles to ensure full coverage of the sides of the entire container (e.g., quality check 1). The container or camera can be moved to allow imaging of all the areas that can have a label. The images are then processed together to read the label.

Figure 47:
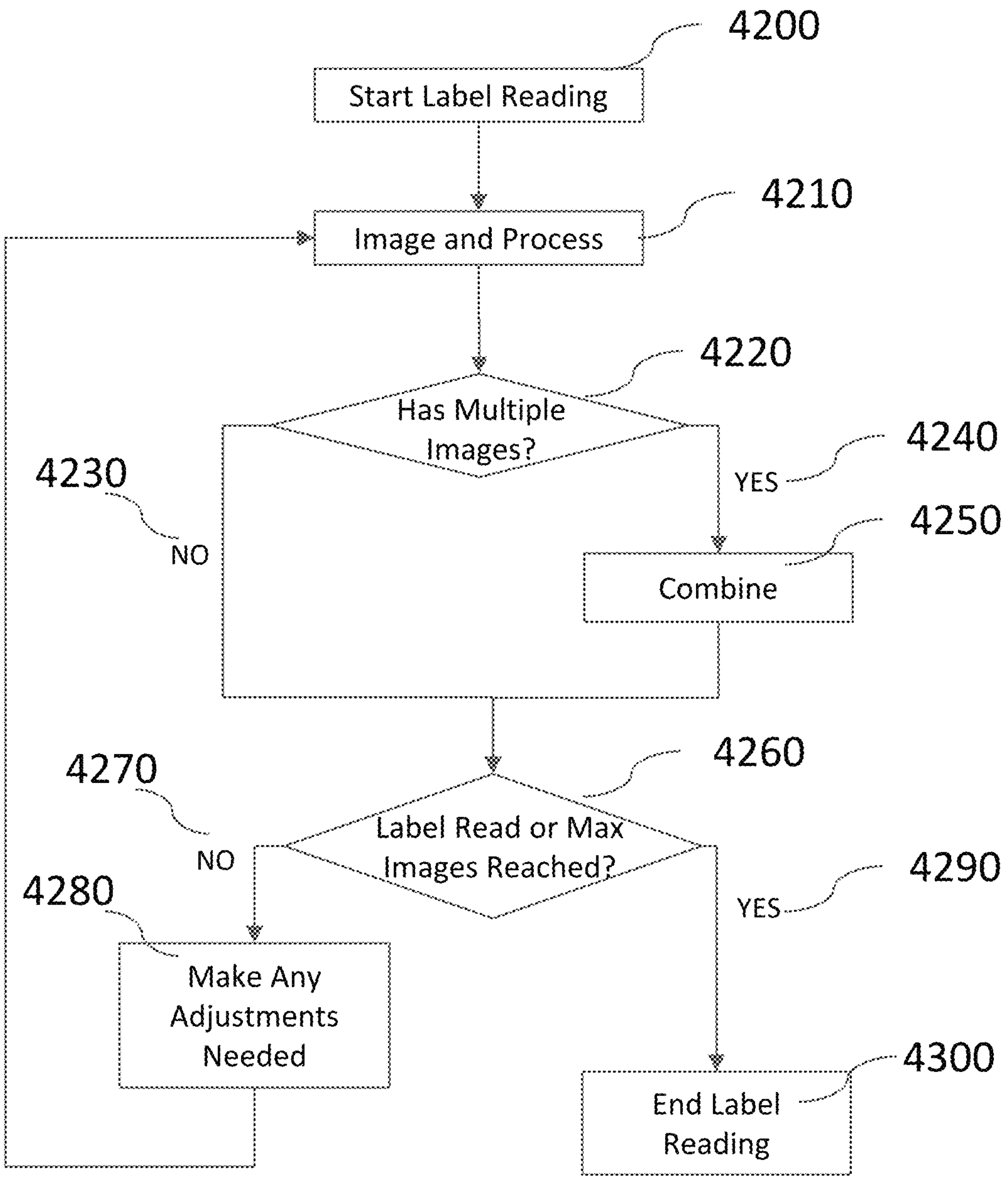
FIG. 47 shows an example method for label reading.

FIG. 47 shows an example method for label reading. The system is instructed, through an API, user interface or other control medium, to start label reading 4200 of an object placed in a designated area in front of at least one camera covering that area. The system can be configured to automatically detect the presence of an object in front of the cameras covering the area.

It then takes an image of the label and processes it 4210. This processing includes, but is not limited to, running image processing techniques and algorithms such as Optical Character Recognition (OCR). Extract some or all of the information read, e.g. barcodes and text, using techniques and algorithms such as Optical Character Recognition (OCR). Such information can include unique identifiers, patient identifiers, date when the sample was collected, or other relevant information. It then checks if there are multiple images 4220. If No 4230, it moves to step 4260. If yes 4250, it combines the results of the processing of all images. The system can also combine some or all of the image, e.g. by stitching, overlaying, or concatenating them, to obtain a higher quality image for processing. In step 4260, the system checks if the label was successfully read or if the maximum number of taken images is reached. In an alternative embodiment, the system always takes a fixed number of images to cover all the areas of the object regardless of whether a label was successfully read during previous iterations or not. If no 4270, it makes any adjustments needed 4280. Such adjustments can depend on pre-defined or input configuration. They can include but are not limited to the following: a) The position of the container by rotating it or moving it. b) The position of one or more cameras by moving it around the container. c) The lighting by adjusting its position, intensity, or other configuration. d) The reduction of specular glare by incorporating lens filtration such as polarization filtration.

If yes 4290, it produces the results of the label reading and ends label reading 4300. Such results can include a barcode such as a data matrix or a QR code, printed or handwritten text, images, or a combination of all. In one embodiment, the system is configured to optimally read the labels of input and output containers of biopsy samples using one pan-visible monochrome camera lit by white light from behind the camera, where the input container is a small biopsy bottle and the output container is a small biopsy cassette. The system can accommodate any container size or shape as long as the label can fit in the camera's field of view. Furthermore, the system performs validation checks to ensure each label is valid and that both labels match based on a certain criteria affecting some or all of the information read from the labels, for instance a case number or a patient ID.

The system is capable of automatically imaging and analyzing a sample container, its parts, or contents using one or more cameras and optionally one or more lights (e.g., Quality checks 2 and 3).

In another embodiment, the system takes an image of the cap of the input container and analyzes it to detect any biopsies that might be attached to it, using an RGB camera lit by white light from behind the camera. It then takes an image of the contents inside the body of the input container, or cup, and analyzes it to detect and characterize any biopsies inside, using an RGB camera lit by white light under the body of the input container. The system then takes an image of the inside of the emptied cup and analyzes it to detect any biopsies that might be left inside, using an RGB camera optionally lit by white light from behind the camera. Finally, the system takes an image of the inside of the open output container using an RGB camera optionally lit by white light from behind the camera when ambient light is insufficient.

Figure 48:
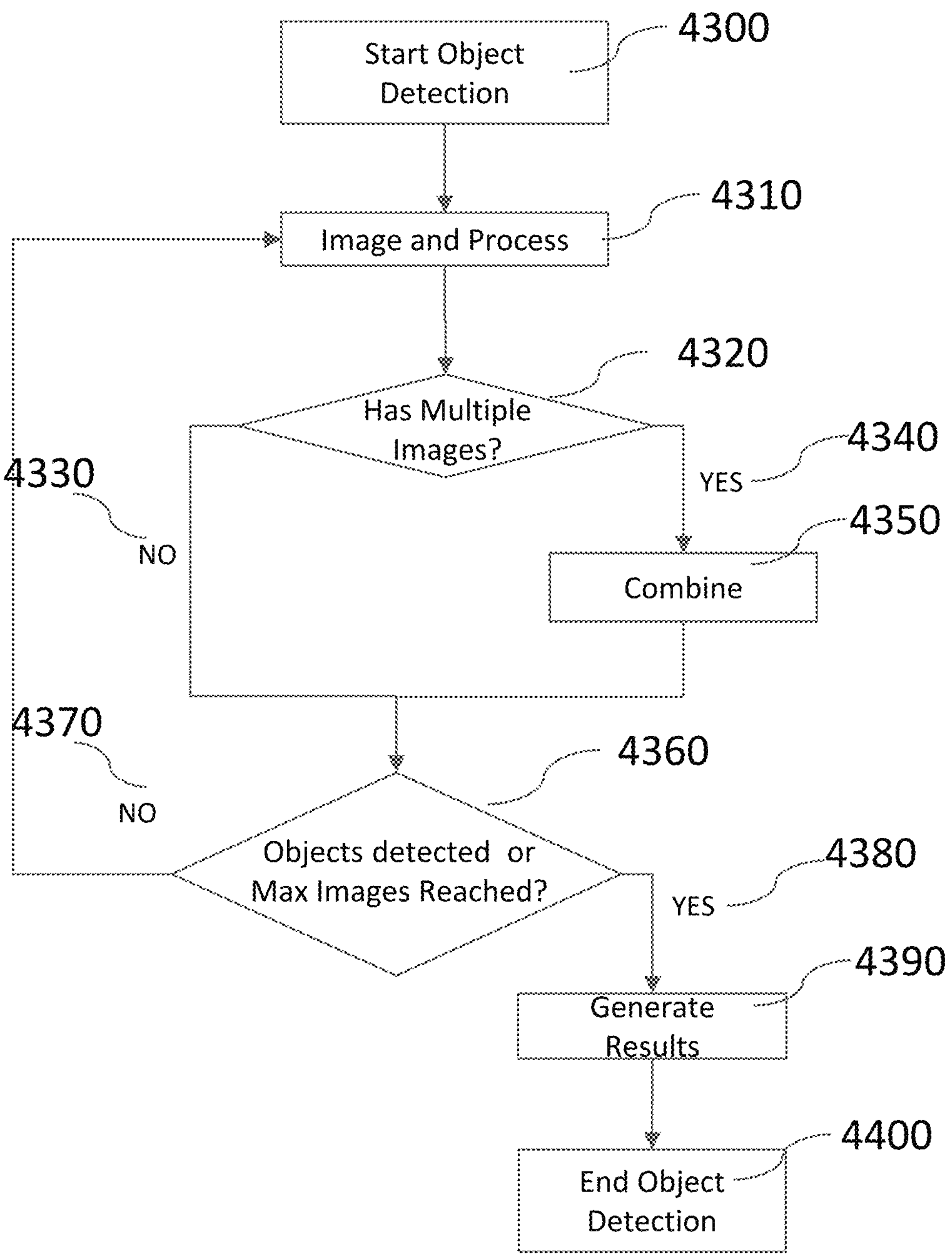
FIG. 48 shows an example process for detecting and characterizing objects in a tissue biopsy.

FIG. 48 shows an example process for detecting and characterizing objects, in this case tissue biopsies in fluid, inside the body of the input container. The system is instructed, through an API, user interface or other control medium, to start the object detection 4300 of an item placed in a designated area in front of at least one camera covering that area. The system can be configured to automatically detect the presence of an object in front of the cameras covering the area.

It then takes an image of the item and processes it 4310. This processing includes, but is not limited to, running image processing techniques as well as object detection and segmentation models on one or multiple images produced. Such models can or can not include an Artificial Intelligence (AI) component, and can leverage publicly available foundational Artificial Intelligence (AI) models trained on a specific data set of images.

It then checks if there are multiple images 4320. If No 4330, it moves to step 4360. If yes 4350, it combines the results of the processing of all images. The system can also combine some or all of the image, e.g. by stitching, overlaying, or concatenating them, to obtain a higher quality image for processing.

In step 4360, the system checks if the objects were detected successfully or if the maximum number of taken images is reached. In an alternative embodiment, the system always takes a fixed number of images, typically 8 images, to cover all the areas of the item regardless of whether the objects were successfully detected during previous iterations or not.

If yes 4380, it generates the results of the object detection 4390. This can involve applying any rules pre-defined or input via configuration for instance to filter out detected objects that do not meet a criteria e.g. a minimum or maximum number, size, width, length, or other criteria. This can also include contouring and annotating the objects detected in the original images taken and generating new images of the contents with the contours and annotations overlaid on the original images. The contouring and annotations can be applied to all or a subset of the detected biopsies. Finally, it ends the object detection 4400. Such results can include some or all of the information regarding objects detected. In another embodiment, this information can include but is not limited to the following: a) Count of the objects detected; b) Characteristics of each object detected such as the maximum length, area, rectangular length, width, height, centroid (X, Y), center (X, Y), radius; c) The contours as objects d) Output images with contours and annotations; e) Additional metadata such as Signal to Noise Ratio (SNR), processing time, path to output image.

The images and any other data collected during the above process can be: a) Stored locally. The system provides the necessary interfaces, such as shared drives or Application Programming Interfaces (APIs), to enable the sharing and access of this data by information systems in the laboratory where the system is deployed. b) Transferred to other local or remote systems such as a database, storage system, or another software system such as a Laboratory Information System (LIS).

The system can optionally make any adjustments needed depending on pre-defined or input configuration. Such adjustments can include but are not limited to the following: a) The position of the item being imaged by rotating it or moving it. b) The position of one or more cameras by moving it around the container. c) The lighting by adjusting its position, intensity, or other configuration.

The system can have a mechanism to automatically move the item being imaged or the cameras to allow imaging the item from different positions or angles or a combination of both if needed, for example using a robotic gripper or a spinning tray to reposition the container, or fitting the camera on a robotic arm or a gantry system to control its position. Furthermore, the system can use a lighting system, and if needed adjust its position, intensity, or other configuration. It can also take different pictures, e.g. grayscale, RGB.

A similar process to the one described in FIG. 48 is used to detect if any biopsies are attached to the cap or body of the input container. The system also uses a similar process to detect the presence of biopsy in unexpected areas of the system, for example any intermediary devices transferring the contents of the input container to the output container for example, a funnel, chamber, or any other surfaces where the biopsies could travel to. Based on the result of the imaging and analysis of the input container, output container, and any other intermediary surfaces or devices used to transfer the biopsies, the system performs the necessary checks to ensure that all biopsies container in the input containers have been successfully images, characterized, and transferred to the output container.

Figure 49:
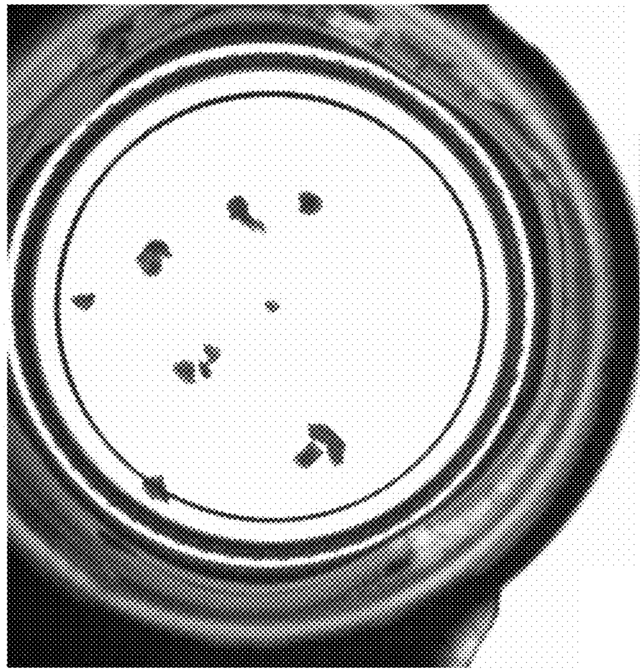
FIG. 49 shows an exemplary image, taken by the system, of the body of the input container with small tissue biopsies in fluid.
Figure 50:
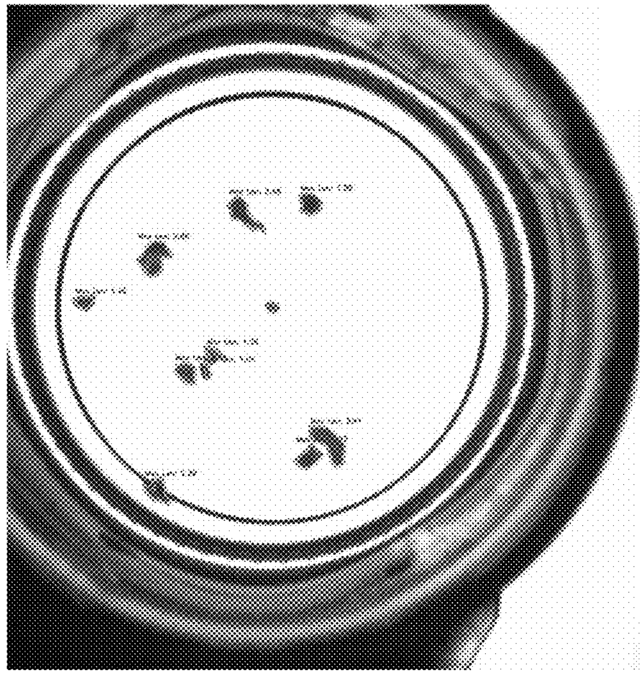
FIG. 50 shows the original image in FIG. 49, with the contours and annotations overlaid on top.

FIG. 49 shows an exemplary image, taken by the system, of the body of the input container with small tissue biopsies in fluid. FIG. 50 shows the original image in FIG. 49, with the contours and annotations overlaid on top. The biopsies can be contoured in a different color, and each biopsy is annotated with its maximum length as determined by the system. Other annotations can also be displayed if desired.

The system analyzes this image to detect the biopsies. It can take additional images when the contents are in a different position. By combining different images, the system is able to refine the results of the analysis for instance when biopsies are visibly adjacent, clumped together, too translucid, or positioned such as they fully blend with the body of the input container or anything printed on it.

The Output Imaging and Analysis 4180 comprises one or more cameras and optionally a lighting system to take one or more images of the output area and extract information using techniques and algorithms such as feature detection and object detection. Such information can include the presence of items in the area, as well as the count, identifiers and positions of these items.

In a first embodiment, the output area contains one or more samples placed directly on the surface, each sample consisting of an output container. The output area can be equipped with one or more optical fiducial markers, labels, barcodes, or other visible markers. The system takes one or more images of the output area. It analyzes the images, detects the markers, and uses their position to determine the presence and position of the output containers in the image and in the physical space. Finally, the system detects when the output area is full.

In a second embodiment, the output area contains one or more racks or other types of containers (such as buckets, or trays) each containing one or more samples, each sample consisting of an output container. The racks can be equipped with one or more optical fiducial markers, labels, barcodes, or other visible markers. The system takes one or more images of the racks. It analyzes the images, detects the markers, and uses their position to determine the presence and position of the racks as well as the output containers they contain, in the image and in the physical space. Finally, the system detects when the racks are full.

In a third embodiment, the output area contains at least two racks or other types of containers (such as buckets, or trays) each containing one or more samples, each sample consisting of an output container. The racks are equipped with one or more optical fiducial markers, labels, barcodes, or other visible markers. The system takes one or more images of the racks. It analyzes the images, detects the markers, and uses their position to determine the presence, position, and type of the racks as well as the output containers they contain, in the image and in the physical space. The system places output containers in the correct rack based on the type detected. Finally, the system detects when the racks are full.

In a fourth embodiment, the output area contains one or more pallets each containing one or more samples, each sample consisting of an input container and its corresponding output containers. The output pallets can be equipped with one or more optical fiducial markers, labels, barcodes, or other visible markers. The system takes one or more images of the output pallets. It analyzes the images, detects the markers, and uses their position to determine the presence and position of pallets, as well as the input and output containers they contain, in the image and in the physical space.

Figure 51:
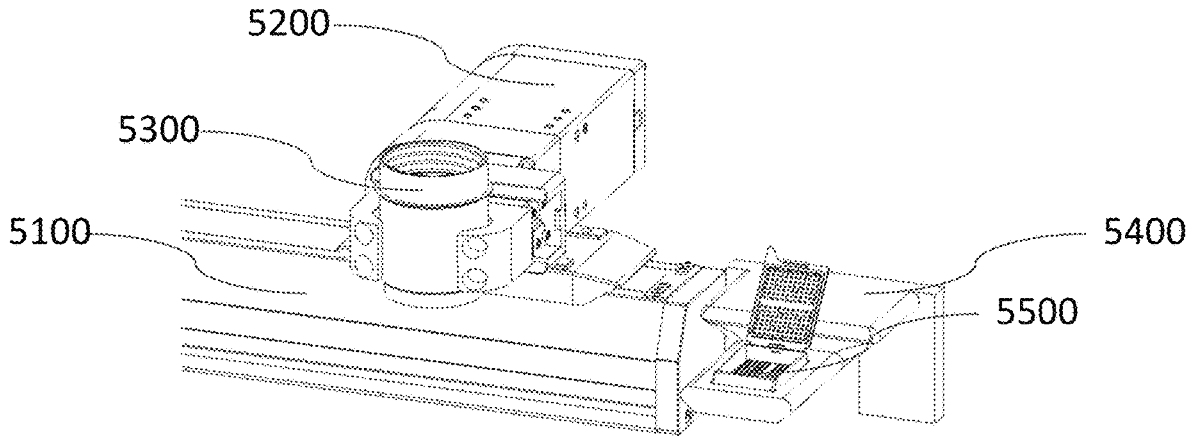
FIG. 51 depicts an alternative embodiment for contactless pouring of a tissue sample from a specimen jar.
Figure 52:
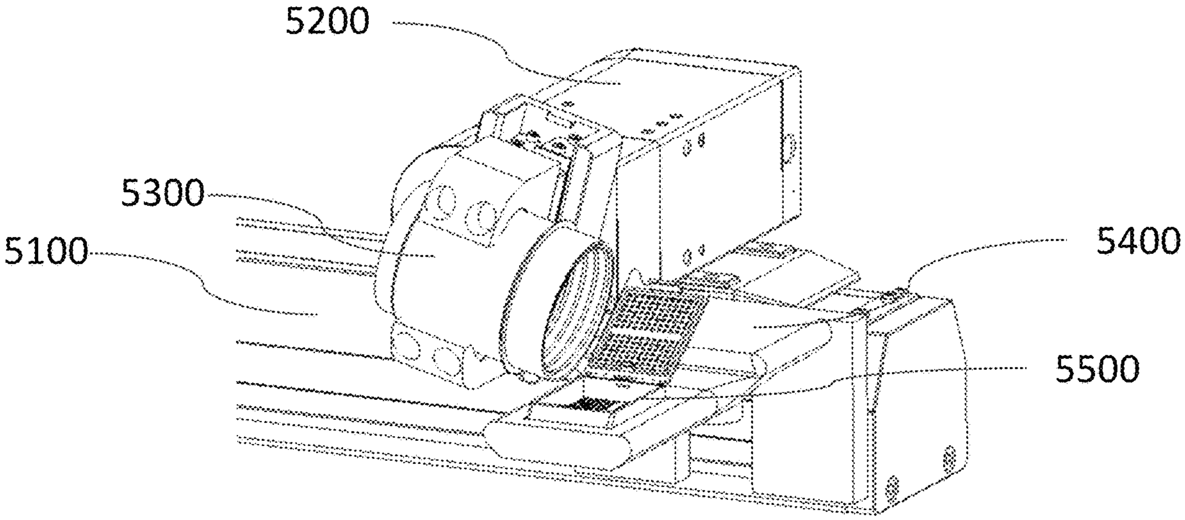
FIG. 52 depicts another view of the alternative embodiment of FIG. 51 for contactless pouring of a tissue sample from a specimen jar.
Figure 53:
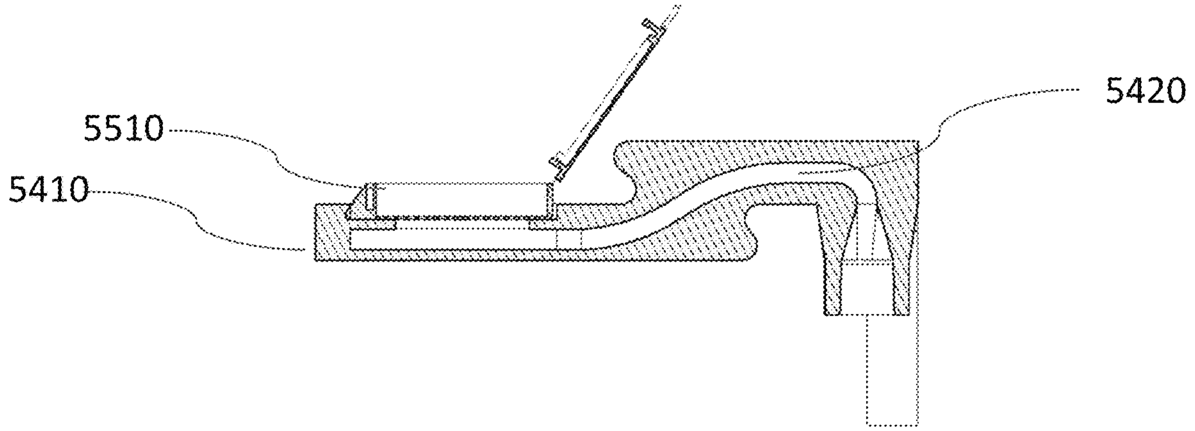
FIG. 53 depicts a section view of the alternative embodiment of FIG. 51 for contactless pouring of a tissue sample from a specimen jar.

Although FIGS. 1-21 describe a robotic arm (D) including gripper 1046 and end effector 1048 and decapping module (E) including stationary gripper 1054 and rotary gripper 1052 to move and manipulate the specimen jar 1002 and cassette 1008 to transfer a tissue sample, other configurations and embodiments are possible. FIGS. 51-53 depict an actuated axis and rotary gripper configuration for contactless pouring.

In one embodiment, the system uses a software controlled pour coupled with negative pressure applied to the porous back of the output container to transfer the contents from one input container to one output container without the use of a transfer apparatus, such as a funnel, bounding box, or tunnel. The input container is typically a small bottle containing biopsies in fluid and the output container is typically a small cassette that receives the biopsies while letting fluid pass through a porous surface.

This transfer system can include a rotary robotic gripper that collects a de-capped input container at an intake position and then moves along an actuated axis towards the output container. The output container can be held by a platform that has a negative pressure region that abuts to the porous bottom of the output container. The interface between the platform and the output container can use a gasket or other type of sealant. Once properly positioned, the robotic gripper rotates to initiate the pour—at the same time negative pressure is applied to the porous bottom of the output container. The gripper can be actuated along an axis during the pour to distribute the contents of the input container across the porous surface of the output container. While the robotic gripper is rotating, various speeds and positions of the rotary gripper can be used to control flow rate of pour.

All liquid and tissue contained in the input container is transferred to the output container. The poured liquid passes through the porous bottom of the output container while the tissue biopsies remain in the output container.

FIG. 51 depicts an alternative embodiment for contactless pouring of a tissue sample from a specimen jar. As shown in FIG. 51, the exemplary system comprises an actuated axis 5100, with a rotary gripper 5200 that is holding decapped input container 5300 some distance from a platform 5400 that holds the output container 5500.

FIG. 52 depicts another view of the alternative embodiment of FIG. 51 for contactless pouring of a tissue sample from a specimen jar. As shown in FIG. 52, the actuated axis 5100, has positioned a rotary gripper 5200 that is holding a decapped input container 5300 in a pour position some distance from a platform 5400 that holds the output container 5500.

FIG. 53 depicts a section view of the alternative embodiment of FIG. 51 for contactless pouring of a tissue sample from a specimen jar. FIG. 53. shows a section view of the platform 5410 with an internal channel 5420 allowing for the liquid that has passed through the porous surface of the output container 5510 to travel away from the output container. In an additional embodiment, the system includes an array of contactless sample transfer apparatuses to enable transferred biopsies from multiple input containers to multiple output containers simultaneously for an improved throughput.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An automated tissue grossing system comprising:

a computer;

an intake system, comprising a retrieval point; and a robotic arm movably coupled to a linear track positioned on a horizontal surface of the tissue grossing system and adjacent to the retrieval point, wherein the robotic arm comprises a gripper sized to grip a specimen jar positioned at the retrieval point, wherein the specimen jar contains a tissue sample in a fluid;

a decapping module comprising a stationary gripper sized to grip a body portion of the specimen jar and a rotary gripper sized to grip a lid portion of the specimen jar; and an integrated grossing platform positioned on the horizontal surface of the tissue grossing system, wherein the integrated grossing platform comprises:

a cassette retention feature recessed within the integrated grossing platform and sized to fit a perforated tissue cassette, wherein the cassette retention feature provides an opening continuous through the integrated grossing platform and a lower portion of the horizontal surface of the tissue grossing system;

a vacuum system positioned under the cassette retention feature and coupled to the lower portion of the horizontal surface of the tissue grossing system, wherein the computer executes instructions causing the vacuum system to generate a negative pressure environment under the cassette retention feature and activate concurrently with the robotic arm a controlled multi-axis pouring motion to synchronize a vacuum flow with a pour rate of the tissue sample and the fluid from the specimen jar to the perforated tissue cassette; and a backlight module comprising a light source integrated into the horizontal surface of the tissue grossing system, such that the light source illuminates an interior of the specimen jar from a bottom portion of the specimen jar.

2. The system of claim 1, further comprising:

a camera fixed above the light source and oriented orthogonally to the specimen jar, wherein the gripper of the robotic arm transfers the specimen jar to a position over the light source.

3. The system of claim 2, wherein the camera is configured to capture a high contrast image of the interior of the body portion of the specimen jar responsive to the light source sufficiently illuminating the interior of the specimen jar from the bottom portion of the body portion of the specimen jar.

4. The system of claim 3, wherein the robotic arm is operable to move the specimen jar from the backlight module to the vacuum system when an onboard processor determines that, based on the high contrast image, the tissue sample contained in the specimen jar is suitable for processing.

5. The system of claim 4, wherein the tissue sample is suitable for processing if the tissue sample is sized to fit in the perforated tissue cassette.

6. The system of claim 1, wherein the tissue sample comprises one or more tissue fragments, and the integrated grossing platform further comprises a fine mesh insert positioned in the cassette retention feature, wherein the fine mesh insert is sized to capture one or more tissue fragments of clinically relevant size during the transfer of the tissue sample from the specimen jar to the perforated tissue cassette.

7. The system of claim 1, further comprising a cassette printer configured to position a label on the perforated tissue cassette, thereby producing a labeled perforated tissue cassette, wherein the robotic arm is configured to select the labeled cassette and position it in the cassette retention feature of the vacuum system.

8. The system of claim 7, wherein the robotic arm comprises at least three rotational axis and one translational axis operable to position the specimen jar above the perforated tissue cassette seated in the cassette retention feature of the integrated grossing platform and execute the controlled multi-axis pouring motion, wherein the robotic arm:

tilts the specimen jar at a predetermined angle along a pitch axis, translates the specimen jar laterally along an X-axis while maintaining a consistent pour rate, and modulates a tilt angle and rotational acceleration to facilitate a flow of the fluid while preventing tissue retention within the specimen jar, and pour the fluid and the tissue sample from the specimen jar into the perforated tissue cassette seated in the cassette retention feature.

9. The system of claim 1, wherein the intake system further comprises:

a rotary assembly coupled to a base and a top; and a motor assembly housed in the base, wherein the motor assembly incrementally advances the rotary assembly such that the specimen jar is accessible from the retrieval point of the intake system.

10. The system of claim 9, wherein the rotary assembly comprises a plurality of pallets, wherein each pallet of the plurality of pallets comprises a plurality of units circumferentially arranged about the rotary assembly.

11. The system of claim 10, wherein the plurality of pallets are stacked vertically about a vertical axis of the rotary assembly and between the base and the top.

12. The system of claim 10, wherein each unit of the plurality of units are sized to hold the body portion of the specimen jar.

13. The system of claim 10, wherein the motor assembly incrementally advances one or more of the plurality of pallets of the rotary assembly such that one or more of the plurality of units are accessible from the retrieval point of the intake system.

14. The system of claim 10, wherein the one or more of the plurality of units comprises a slot sized to hold the perforated tissue cassette.

15. The system of claim 1, wherein the intake system further comprises a dedicated area to receive one or more specimen jars, wherein the retrieval point is located in the dedicated area.

16. The system of claim 15, wherein the intake system further comprises one or more trays positioned in the dedicated area, wherein each tray comprises a plurality of cut-outs, each sized to hold the body portion of the specimen jar.

17. The system of claim 15, wherein the dedicated area is accessible from a user on a first side and the robotic arm from a second side.

18. The system of claim 1, wherein the integrated grossing platform further comprises a camera fixed above the integrated grossing platform and oriented orthogonally to the cassette retention feature recessed within the integrated grossing platform.

19. The system of claim 18, wherein the integrated grossing platform further comprises a light source fixed adjacent to the camera that is fixed above the integrated grossing platform, wherein the light source is positioned to illuminate the integrated grossing platform.

20. The system of claim 1, wherein the light source integrated into the horizontal surface of the tissue grossing system is a UV spectrum light.

21. The system of claim 1, wherein the light source integrated into the horizontal surface of the tissue grossing system is a white light.

22. The system of claim 3, wherein the robotic arm is operable to remove the specimen jar from the backlight module when an onboard processor detects that, based on the high contrast image, residual tissue remains in the specimen jar.

* * * * *